(12) United States Patent
Ihnfeldt et al.

(10) Patent No.: US 11,728,074 B2
(45) Date of Patent: Aug. 15, 2023

(54) MAGNETOCALORIC ALLOYS USEFUL FOR MAGNETIC REFRIGERATION APPLICATIONS

(71) Applicants: General Engineering & Research, L.L.C., San Diego, CA (US); The Regents of the University of California, Oakland, CA (US)

(72) Inventors: Robin Ihnfeldt, San Diego, CA (US); Eunjeong Kim, San Diego, CA (US); Sungho Jin, San Diego, CA (US); Renkun Chen, San Diego, CA (US); Xia Xu, Oro Valley, AZ (US)

(73) Assignees: General Engineering & Research, L.L.C., San Diego, CA (US); The Regents of the University of California, Oakland, CA (US)

( * ) Notice: Subject to any disclaimer, the term of this patent is extended or adjusted under 35 U.S.C. 154(b) by 422 days.

(21) Appl. No.: 16/969,858

(22) PCT Filed: Feb. 20, 2019

(86) PCT No.: PCT/US2019/018818
§ 371 (c)(1),
(2) Date: Aug. 13, 2020

(87) PCT Pub. No.: WO2019/164982
PCT Pub. Date: Aug. 29, 2019

(65) Prior Publication Data
US 2021/0065941 A1  Mar. 4, 2021

Related U.S. Application Data

(60) Provisional application No. 62/693,719, filed on Jul. 3, 2018, provisional application No. 62/634,078, filed on Feb. 22, 2018.

(51) Int. Cl.
*H01F 1/01* (2006.01)
*H01F 1/058* (2006.01)
(Continued)

(52) U.S. Cl.
CPC ............ *H01F 1/015* (2013.01); *C22C 28/00* (2013.01); *F25B 21/00* (2013.01); *H01F 1/058* (2013.01);
(Continued)

(58) Field of Classification Search
CPC ...................................................... H01F 1/015
See application file for complete search history.

(56) References Cited

U.S. PATENT DOCUMENTS 6,022,486 A * 2/2000 Tokai .................... F02G 1/0445
165/4
2019/0352747 A1* 11/2019 Ihnfeldt .................. F25B 21/00

FOREIGN PATENT DOCUMENTS

CN 102828129 A 12/2012
CN 106601399 A 4/2017
(Continued)

OTHER PUBLICATIONS

Lyaskovska, Natalya, et al. "Crystal structures of the compounds RAl0.5-xSi0.5+x (R=La, Ce, Pr, Nd, Sm, Gd), R3Al4Si6 (R=La, Pr), and RAlSi2 (R=Pr, Nd)." Journal of alloys and compounds 367.1-2 (2004): 180-184. (Year: 2004).*
(Continued)

*Primary Examiner* — Keith D. Hendricks
*Assistant Examiner* — Joshua S Carpenter
(74) *Attorney, Agent, or Firm* — Knobbe, Martens, Olson & Bear, LLP

(57) ABSTRACT

This invention relates to magnetocaloric materials comprising alloys useful for magnetic refrigeration applications. In some embodiments, the disclosed alloys may be Cerium,
(Continued)

Neodymium, and/or Gadolinium based compositions that are fairly inexpensive, and in some cases exhibit only $2^{nd}$ order magnetic phase transitions near their curie temperature, thus there are limited thermal and structural hysteresis losses. This makes these compositions attractive candidates for use in magnetic refrigeration applications. Surprisingly, the performance of the disclosed materials is similar or better to many of the known expensive rare-earth based magnetocaloric materials.

18 Claims, 20 Drawing Sheets

(51) Int. Cl.
  *C22C 28/00*  (2006.01)
  *F25B 21/00*  (2006.01)
(52) U.S. Cl.
  CPC .... *C22C 2202/02* (2013.01); *F25B 2321/002* (2013.01)

(56) References Cited

FOREIGN PATENT DOCUMENTS

| | | |
|---|---|---|
| EP | 0517179 | 5/1995 |
| JP | 2002-356748 A | 12/2002 |
| JP | 2006-310361 A | 11/2006 |
| WO | WO 2018/129476 | 7/2018 |

OTHER PUBLICATIONS

Office Action issued in corresponding Japanese Patent Application No. 2020-544433 dated May 31, 2022.

Chiraiac, H et al., "Structure and Magnetic Properties of Some Bulk Amorphous Materials," Journal of Non-Crystalline Solids, vol. 250-252, pp. 751-756. Aug. 1, 1999.

Flandorfer, H. et al., "The Systems Ce—Al—(Si, Ge): Phase Equilibria and Physical Properties," Journal of Solid State Chemistry, vol. 137, No. 2, pp. 191-205. May 1, 1998.

General Engineering and Research, News Article, Jul. 12, 2017; pp. 1-2.

Grobner, J. et al., "Thermodynamics Aspects of the Constitution, Grain Refining, and Solidification Enthalpies of Al—Ce—Si Allowys," Metallurgical and Materials Transactions A, vol. 35A, No. 11. Nov. 1, 2004; abstract; p. 3.

Ihnfeldt, R. et al., "Low Cost High Performance Magnetocaloric Materials for Sub 50K Refrigeration Applications," UC San Diego, Jacobs School of Engineering, Jul. 12, 2017; slides 7-8, 12.

Kamiya et al., "Hydrogen Liquefaction by Magnetic Refrigeration," Cryocoolers, 14, 637 (2007).

Nikitin, S. et al., "Magnetic Anisotropy and Magnetic Properties of RTSi (R5Gd, Y; T5Mn, Fe)," Journal of Alloys and Compounds, vol. 280, No. 1-2. Oct. 23, 1998.

Plaza, E.J.R. et al., "Magnetocaloric Effect: Overcoming the Magnetic Limit," J. of Magnetism and Magnetic Mat., 321, 446 (2009).

Provenzano, V. et al., "Reduction of Hysteresis Losses in the Magnetic Refrigerant $Gd_5Ge_2Si_2$ by the Addition of Iron", Nature, 429, 853, 2004.

Raghavan, V., "Al—Ce—Si (Aluminum-Cernium-Silicon)," Journal of Phase Equilibaria and Diffusion, vol. 28, No. 5, pp. 456-458. 2007; p. 458.

Shen, B.G. et al., "Recent Progress in Exploring Magnetocaloric Materials," Adv. Mater., 21, 4545 (2009).

Supplementary Search Report received in European Application No. 19757315, dated Mar. 3, 2021.

* cited by examiner

MAGNETOCALORIC ALLOYS USEFUL FOR MAGNETIC REFRIGERATION APPLICATIONS

CROSS-REFERENCE TO RELATED APPLICATIONS

This application claims priority to International Application No. PCT/US2019/018818 filed on Feb. 20, 2019 entitled "Magnetocaloric Alloys Useful for Magnetic Refrigeration Applications," which claims priority to U.S. Provisional Patent Application No. 62/634,078 filed on Feb. 22, 2018 entitled "Magnetocaloric Alloys Useful for Magnetic Refrigeration Applications", and U.S. Provisional Patent Application No. 62/693,719 filed on Jul. 3, 2018 entitled "Magnetocaloric Alloys Useful for Magnetic Refrigeration Applications" the contents of each of which are incorporated herein by reference in their entireties.

GOVERNMENT LICENSE RIGHTS

This invention was made with government support under DE-SC0015932 awarded by the Department of Energy. The Government has certain rights in this invention.

BACKGROUND

The present disclosure generally relates to magnetocaloric materials comprising alloys useful for magnetic refrigeration applications. In some embodiments, the disclosed alloys exhibit only 2nd order magnetic phase transitions, with limited thermal or structural hysteresis losses. This makes them attractive candidates for use in magnetic refrigeration applications. Additionally, embodiments of the disclosed compositions are lower cost and higher performance than prior art materials.

DESCRIPTION OF THE RELATED ART

Magnetic Refrigeration utilizes the magnetocaloric effect (MCE), which is the temperature variation of a magnetic material after exposure to a magnetic field. A more detailed description of the magnetocaloric effect is described by Plaza and Campoy, *J. of Magnetism and Magnetic Mat.*, 321, 446 (2009). A critical challenge of developing low cost magnetic refrigerators is the cost and availability of MCE materials, which are typically rare-earth and very expensive. The magnetocaloric effect (MCE) is an intrinsic property of a magnetic solid which has been successfully utilized for a variety of applications. The thermal response of the MCE material to the application or removal of a magnetic field is typically maximized when the material is near its magnetic ordering temperature. Thus, the materials considered for magnetic refrigeration devices must exhibit a magnetic phase transition temperature near the temperature region of interest, i.e. for hydrogen liquefaction ~20° K, for nitrogen liquefaction ~80° K, etc. Some of the most common MCE materials include $RNi_2$ (R=Gd, Dy and Ho) and $RAl_2$ (R=Er, Ho, Dy and $Dy_{0.5}Ho_{0.5}$, $Dy_xEr_{1-x}$ and GdPd), all of which are rare-earth and expensive, according to B. G. Shen, J. R. Sun, F. X. Hu, H. W. Zhang, and Z. H. Cheng, *Adv. Mater.*, 21, 4545 (2009). Kamiya et al., *Cryocoolers*, 14, 637 (2007), successfully demonstrated a small scale hydrogen liquefaction magnetic refrigerator with efficiency approaching 90% of the Carnot efficiency, however, 280 g of the rare-earth MCE material, dysprosium (bulk price ~$350/kg for 99% purity) gadolinium (bulk price ~$55/kg for 99.9% purity) aluminum garnet, was needed to achieve a maximum cooling power of 14.6 W. These starting materials must further undergo significant processing to obtain the desired MCE properties which can increase the materials cost by 10-100×. Clearly, the capital cost of a magnetic refrigeration system capable of >400 W of cooling power using the traditional rare-earth based MCE materials would far exceed its economic feasibility.

One of the major hurdles inhibiting the development of magnetic refrigeration technologies is the lack of commercially available low cost magnetocaloric materials that will actually function, for a long period of time, in a magnetic refrigeration environment such as the active magnetic regenerator (AMR) which is in development by several entities. While there has been extensive research discovering new materials with magnetocaloric properties, the majority of these material compositions will require substantial engineering to be compatible with AMR technologies. Materials such as GdSiGe or LaFeSi based alloys have sparked interest due to their giant magnetocaloric effect, however, this effect is due to a first order phase transition which has significant magnetic and thermal hysteresis and also exhibits structural changes, as described by Shen, J. R Sun, F. X. Hu, H. W. Zhang, and Z. H. Cheng, Adv. Mater., 21, 4545, 2009 and V. Provenzano, A. J. Shapiro, and R. D. Shull, Nature, 429, 853, 2004. The hysteresis reduces the reversibility of the MCE such that during high frequency magnetization and demagnetization, which is required for high efficiency AMRs, the magnitude of the MCE is drastically reduced. Methods to suppress thermal and magnetic hysteresis are possible, but require additional materials and processing and also act to suppress the MCE. Additionally, the structural changes typically manifest as volume expansion and contraction of the material, causing cracking during the magnetization and demagnetization cycles which quickly reduces the MCE response and lowers the thermal conductivity, making these materials incompatible in AMRs. While methods to improve mechanical stability of MCE materials with first order transitions can be employed, this will also require significant additional materials and processing which will increase cost. Further, scalable manufacturing of many MCE materials has yet to be demonstrated.

SUMMARY

In some embodiments, a magnetocaloric material may comprise $(A_xB_{1-x}) Si_{1-y-z} (D_y E_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$.

In some embodiments of the magnetocaloric material, y+z=0.1. In some embodiments of the magnetocaloric material, y+z=0.2. In some embodiments of the magnetocaloric material, y+z=0.3. In some embodiments of the magnetocaloric material, y=0.1 and z=0. In some embodiments of the magnetocaloric material, y=0.2 and z=0. In some embodiments of the magnetocaloric material, y=0.3 and z=0. In some embodiments of the magnetocaloric material, y=0.05 and z=0.1. In some embodiments of the magnetocaloric material, y=0.05 and z=0.2. In some embodiments of the magnetocaloric material, y=0.05 and z=0.15.

In some embodiments, the magnetocaloric material comprises $(A_x B_{1-x})Si_{0.8}Mn_{0.2}$ wherein A and B are selected from the group consisting of Ce, Nd, or Gd, wherein x is in the range of about 0 to about 1.0. In some embodiments, the material is $Ce_{1.0}Si_{0.8}Mn_{0.2}$, $Nd_{1.0}Si_{0.8}Mn_{0.2}$, $Gd_{1.0}Si_{0.8}Mn_{0.2}$, $Ce_{0.1}Nd_{0.9}Si_{0.8}Mn_{0.2}$, $Ce_{0.2}Nd_{0.8}Si_{0.8}Mn_{0.2}$, $Ce_{0.3}Nd_{0.7}Si_{0.8}Mn_{0.2}$, $Ce_{0.4}Nd_{0.6}Si_{0.8}Mn_{0.2}$, $Ce_{0.5}Nd_{0.5}Si_{0.8}Mn_{0.2}$, $Ce_{0.6}Nd_{0.4}Si_{0.8}Mn_{0.2}$, $Ce_{0.7}Nd_{0.3}Si_{0.8}Mn_{0.2}$, $Ce_{0.8}Nd_{0.2}Si_{0.8}Mn_{0.2}$, $Ce_{0.9}Nd_{0.1}Si_{0.8}Mn_{0.2}$, $Gd_{0.1}Nd_{0.9}Si_{0.8}Mn_{0.2}$, $Gd_{0.2}Nd_{0.8}Si_{0.8}Mn_{0.2}$, $Gd_{0.3}Nd_{0.7}Si_{0.8}Mn_{0.2}$, $Gd_{0.4}Nd_{0.6}Si_{0.8}Mn_{0.2}$, $Gd_{0.5}Nd_{0.5}Si_{0.8}Mn_{0.2}$, $Gd_{0.6}Nd_{0.4}Si_{0.8}Mn_{0.2}$, $Gd_{0.7}Nd_{0.3}Si_{0.8}Mn_{0.2}$, $Gd_{0.8}Nd_{0.2}Si_{0.8}Mn_{0.2}$, $Gd_{0.9}Nd_{0.1}Si_{0.8}Mn_{0.2}$, $Ce_{0.1}Gd_{0.9}Si_{0.8}Mn_{0.2}$, $Ce_{0.2}Gd_{0.8}Si_{0.8}Mn_{0.2}$, $Ce_{0.3}Gd_{0.7}Si_{0.8}Mn_{0.2}$, $Ce_{0.4}Gd_{0.6}Si_{0.8}Mn_{0.2}$, $Ce_{0.5}Gd_{0.5}Si_{0.8}Mn_{0.2}$, $Ce_{0.6}Gd_{0.4}Si_{0.8}Mn_{0.2}$, $Ce_{0.7}Gd_{0.3}Si_{0.8}Mn_{0.2}$, $Ce_{0.8}Gd_{0.2}Si_{0.8}Mn_{0.2}$, $Ce_{0.9}Gd_{0.1}Si_{0.8}Mn_{0.2}$.

In some embodiments, the magnetocaloric material comprises $(A_xB_{1-x})Si_{0.8}Cr_{0.2}$ wherein A and B are selected from the group consisting of Ce, Nd, or Gd, wherein x is in the range of about 0 to about 1.0. In some embodiments, the material is $Ce_{1.0}Si_{0.8}Cr_{0.2}$, $Nd_{1.0}Si_{0.8}Cr_{0.2}$, $Gd_{1.0}Si_{0.8}Cr_{0.2}$, $Ce_{0.1}Nd_{0.9}Si_{0.8}Cr_{0.2}$, $Ce_{0.2}Nd_{0.8}Si_{0.8}Cr_{0.2}$, $Ce_{0.3}Nd_{0.7}Si_{0.8}Cr_{0.2}$, $Ce_{0.4}Nd_{0.6}Si_{0.8}Cr_{0.2}$, $Ce_{0.5}Nd_{0.5}Si_{0.8}Cr_{0.2}$, $Ce_{0.6}Nd_{0.4}Si_{0.8}Cr_{0.2}$, $Ce_{0.7}Nd_{0.3}Si_{0.8}Cr_{0.2}$, $Ce_{0.8}Nd_{0.2}Si_{0.8}Cr_{0.2}$, $Ce_{0.9}Nd_{0.1}Si_{0.8}Cr_{0.2}$, $Gd_{0.1}Nd_{0.9}Si_{0.8}Cr_{0.2}$, $Gd_{0.2}Nd_{0.8}Si_{0.8}Cr_{0.2}$, $Gd_{0.3}Nd_{0.7}Si_{0.8}Cr_{0.2}$, $Gd_{0.4}Nd_{0.6}Si_{0.8}Cr_{0.2}$, $Gd_{0.5}Nd_{0.5}Si_{0.8}Cr_{0.2}$, $Gd_{0.6}Nd_{0.4}Si_{0.8}Cr_{0.2}$, $Gd_{0.7}Nd_{0.3}Si_{0.8}Cr_{0.2}$, $Gd_{0.8}Nd_{0.2}Si_{0.8}Cr_{0.2}$, $Gd_{0.9}Nd_{0.1}Si_{0.8}Cr_{0.2}$, $Ce_{0.1}Gd_{0.9}Si_{0.8}Cr_{0.2}$, $Ce_{0.2}Gd_{0.5}Si_{0.8}Cr_{0.2}$, $Ce_{0.3}Gd_{0.7}Si_{0.8}Cr_{0.2}$, $Ce_{0.4}Gd_{0.6}Si_{0.8}Cr_{0.2}$, $Ce_{0.5}Gd_{0.5}Si_{0.8}Cr_{0.2}$, $Ce_{0.6}Gd_{0.4}Si_{0.8}Cr_{0.2}$, $Ce_{0.7}Gd_{0.3}Si_{0.8}Cr_{0.2}$, $Ce_{0.8}Gd_{0.2}Si_{0.8}Cr_{0.2}$, $Ce_{0.9}Gd_{0.1}Si_{0.8}Cr_{0.2}$.

In some embodiments, the magnetocaloric material comprises $(A_xB_{1-x})Si_{0.8}Mn_{0.1}Cr_{0.1}$ wherein A and B are selected from the group consisting of Ce, Nd, or Gd, wherein x is in the range of about 0 to about 1.0. In some embodiments, the material is $Ce_{1.0}Si_{0.8}Mn_{0.1}Cr_{0.1}$, $Nd_{1.0}Si_{0.8}Mn_{0.1}Cr_{0.1}$, $Gd_{1.0}Si_{0.8}Mn_{0.1}Cr_{0.1}$, $Ce_{0.1}Nd_{0.9}Si_{0.8}Mn_{0.1}Cr_{0.1}$, $Ce_{0.2}Nd_{0.8}Si_{0.8}Mn_{0.1}Cr_{0.1}$, $Ce_{0.3}Nd_{0.7}Si_{0.8}Mn_{0.1}Cr_{0.1}$, $Ce_{0.4}Nd_{0.6}Si_{0.8}Mn_{0.1}Cr_{0.1}$, $Ce_{0.5}Nd_{0.5}Si_{0.8}Mn_{0.1}Cr_{0.1}$, $Ce_{0.6}Nd_{0.4}Si_{0.8}Mn_{0.1}Cr_{0.1}$, $Ce_{0.7}Nd_{0.3}Si_{0.8}Mn_{0.1}Cr_{0.1}$, $Ce_{0.8}Nd_{0.2}Si_{0.8}Mn_{0.1}Cr_{0.1}$, $Ce_{0.9}Nd_{0.1}Si_{0.8}Mn_{0.1}Cr_{0.1}$, $Gd_{0.1}Nd_{0.9}Si_{0.8}Mn_{0.1}Cr_{0.1}$, $Gd_{0.2}Nd_{0.8}Si_{0.8}Mn_{0.1}Cr_{0.1}$, $Gd_{0.3}Nd_{0.7}Si_{0.8}Mn_{0.1}Cr_{0.1}$, $Gd_{0.4}Nd_{0.6}Si_{0.8}Mn_{0.1}Cr_{0.1}$, $Gd_{0.5}Nd_{0.5}Si_{0.8}Mn_{0.1}Cr_{0.1}$, $Gd_{0.6}Nd_{0.4}Si_{0.8}Mn_{0.1}Cr_{0.1}$, $Gd_{0.7}Nd_{0.3}Si_{0.8}Mn_{0.1}Cr_{0.1}$, $Gd_{0.8}Nd_{0.2}Si_{0.8}Mn_{0.1}Cr_{0.1}$, $Gd_{0.9}Nd_{0.1}Si_{0.8}Mn_{0.1}Cr_{0.1}$, $Ce_{0.1}Gd_{0.9}Si_{0.8}Mn_{0.1}Cr_{0.1}$, $Ce_{0.2}Gd_{0.5}Si_{0.8}Mn_{0.1}Cr_{0.1}$, $Ce_{0.3}Gd_{0.7}Si_{0.8}Mn_{0.1}Cr_{0.1}$, $Ce_{0.4}Gd_{0.6}Si_{0.8}Mn_{0.1}Cr_{0.1}$, $Ce_{0.5}Gd_{0.5}Si_{0.8}Mn_{0.1}Cr_{0.1}$, $Ce_{0.6}Gd_{0.4}Si_{0.8}Mn_{0.1}Cr_{0.1}$, $Ce_{0.7}Gd_{0.3}Si_{0.8}Mn_{0.1}Cr_{0.1}$, $Ce_{0.8}Gd_{0.2}Si_{0.8}Mn_{0.1}Cr_{0.1}$, $Ce_{0.9}Gd_{0.1}Si_{0.8}Mn_{0.1}Cr_{0.1}$.

In some embodiments, the magnetocaloric material comprises $(A_xB_{1-x})Si_{0.8}Mn_{0.05}Cr_{0.15}$ wherein A and B are selected from the group consisting of Ce, Nd, or Gd, wherein x is in the range of about 0 to about 1.0. In some embodiments, the material is $Ce_{1.0}Si_{0.8}Mn_{0.05}Cr_{0.15}$, $Nd_{1.0}Si_{0.8}Mn_{0.05}Cr_{0.15}$, $Gd_{1.0}Si_{0.8}Mn_{0.05}Cr_{0.15}$, $Ce_{0.1}Nd_{0.9}Si_{0.8}Mn_{0.05}Cr_{0.15}$, $Ce_{0.2}Nd_{0.8}Si_{0.8}Mn_{0.05}Cr_{0.15}$, $Ce_{0.3}Nd_{0.7}Si_{0.8}Mn_{0.05}Cr_{0.15}$, $Ce_{0.4}Nd_{0.6}Si_{0.8}Mn_{0.05}Cr_{0.15}$, $Ce_{0.5}Nd_{0.5}Si_{0.8}Mn_{0.05}Cr_{0.15}$, $Ce_{0.6}Nd_{0.4}Si_{0.8}Mn_{0.05}Cr_{0.15}$, $Ce_{0.7}Nd_{0.3}Si_{0.8}Mn_{0.05}Cr_{0.15}$, $Ce_{0.8}Nd_{0.2}Si_{0.8}Mn_{0.05}Cr_{0.15}$, $Ce_{0.9}Nd_{0.1}Si_{0.8}Mn_{0.05}Cr_{0.15}$, $Gd_{0.1}Nd_{0.9}Si_{0.8}Mn_{0.05}Cr_{0.15}$, $Gd_{0.2}Nd_{0.8}Si_{0.8}Mn_{0.05}Cr_{0.15}$, $Gd_{0.3}Nd_{0.7}Si_{0.8}Mn_{0.05}Cr_{0.15}$, $Gd_{0.4}Nd_{0.6}Si_{0.8}Mn_{0.05}Cr_{0.15}$, $Gd_{0.5}Nd_{0.5}Si_{0.9}Mn_{0.05}Cr_{0.15}$, $Gd_{0.6}Nd_{0.4}Si_{0.8}Mn_{0.05}Cr_{0.15}$, $Gd_{0.7}Nd_{0.3}Si_{0.8}Mn_{0.05}Cr_{0.15}$, $Gd_{0.8}Nd_{0.2}Si_{0.8}Mn_{0.05}Cr_{0.15}$, $Gd_{0.9}Nd_{0.1}Si_{0.8}Mn_{0.05}Cr_{0.15}$, $Ce_{0.1}Gd_{0.9}Si_{0.8}Mn_{0.05}Cr_{0.15}$, $Ce_{0.2}Gd_{0.8}Si_{0.8}Mn_{0.05}Cr_{0.15}$, $Ce_{0.3}Gd_{0.7}Si_{0.8}Mn_{0.05}Cr_{0.15}$, $Ce_{0.4}Gd_{0.6}Si_{0.8}Mn_{0.05}Cr_{0.15}$, $Ce_{0.5}Gd_{0.5}Si_{0.8}Mn_{0.05}Cr_{0.15}$, $Ce_{0.6}Gd_{0.4}Si_{0.8}Mn_{0.05}Cr_{0.15}$, $Ce_{0.7}Gd_{0.3}Si_{0.8}Mn_{0.05}Cr_{0.15}$, $Ce_{0.8}Gd_{0.2}Si_{0.8}Mn_{0.05}Cr_{0.15}$, $Ce_{0.9}Gd_{0.1}Si_{0.8}Mn_{0.05}Cr_{0.15}$.

In some embodiments, the magnetocaloric material comprises $(A_xB_{1-x})Si_{0.8}Mn_{0.15}Cr_{0.05}$ wherein A and B are selected from the group consisting of Ce, Nd, or Gd, wherein x is in the range of about 0 to about 1.0. In some embodiments, the material is $Ce_{1.0}Si_{0.8}Mn_{0.15}Cr_{0.05}$, $Nd_{1.0}Si_{0.8}Mn_{0.15}Cr_{0.05}$, $Gd_{1.0}Si_{0.8}Mn_{0.15}Cr_{0.05}$, $Ce_{0.1}Nd_{0.9}Si_{0.8}Mn_{0.15}Cr_{0.05}$, $Ce_{0.2}Nd_{0.8}Si_{0.8}Mn_{0.15}Cr_{0.05}$, $Ce_{0.3}Nd_{0.7}Si_{0.7}Mn_{0.15}Cr_{0.05}$, $Ce_{0.4}Nd_{0.6}Si_{0.7}Mn_{0.15}Cr_{0.05}$, $Ce_{0.5}Nd_{0.4}Si_{0.8}Mn_{0.15}Cr_{0.05}$, $Ce_{0.6}Nd_{0.4}Si_{0.8}Mn_{0.15}Cr_{0.05}$, $Ce_{0.7}Nd_{0.3}Si_{0.8}Mn_{0.15}Cr_{0.05}$, $Ce_{0.5}Nd_{0.2}Si_{0.8}Mn_{0.15}Cr_{0.05}$, $Ce_{0.9}Nd_{0.1}Si_{0.8}Mn_{0.15}Cr_{0.05}$, $Gd_{0.1}Nd_{0.9}Si_{0.8}Mn_{0.15}Cr_{0.05}$, $Gd_{0.2}Nd_{0.5}Si_{0.8}Mn_{0.15}Cr_{0.05}$, $Gd_{0.3}Nd_{0.7}Si_{0.8}Mn_{0.15}Cr_{0.05}$, $Gd_{0.4}Nd_{0.6}Si_{0.8}Mn_{0.15}Cr_{0.05}$, $Gd_{0.8}Nd_{0.5}Si_{0.7}Mn_{0.15}Cr_{0.05}$, $Gd_{0.6}Nd_{0.4}Si_{0.8}Mn_{0.15}Cr_{0.05}$, $Gd_{0.7}Nd_{0.3}Si_{0.8}Mn_{0.15}Cr_{0.05}$, $Gd_{0.8}Nd_{0.2}Si_{0.8}Mn_{0.15}Cr_{0.05}$, $Gd_{0.9}Nd_{0.1}Si_{0.8}Mn_{0.15}Cr_{0.05}$, $Ce_{0.1}Gd_{0.9}Si_{0.8}Mn_{0.15}Cr_{0.05}$, $Ce_{0.2}Gd_{0.8}Si_{0.8}Mn_{0.15}Cr_{0.05}$, $Ce_{0.3}Gd_{0.7}Si_{0.8}Mn_{0.15}Cr_{0.05}$, $Ce_{0.4}Gd_{0.6}Si_{0.8}Mn_{0.15}Cr_{0.05}$, $Ce_{0.5}Gd_{0.5}Si_{0.8}Mn_{0.15}Cr_{0.05}$, $Ce_{0.6}Gd_{0.4}Si_{0.8}Mn_{0.15}Cr_{0.05}$, $Ce_{0.7}Gd_{0.3}Si_{0.8}Mn_{0.15}Cr_{0.05}$, $Ce_{0.8}Gd_{0.2}Si_{0.8}Mn_{0.15}Cr_{0.05}$, $Ce_{0.9}Gd_{0.1}Si_{0.8}Mn_{0.15}Cr_{0.05}$.

In some embodiments, the magnetocaloric material comprises $(A_xB_{1-x})Si_{0.8}Cr_{0.1}E_{0.1}$ wherein A and B are selected from the group consisting of Ce, Nd, or Gd, wherein E is selected from the group consisting of Fe, Al, Ni, Co, Cu, or Zn, wherein x is in the range of about 0 to about 1.0. In some embodiments the material is $Ce_{1.0}Si_{0.8}Cr_{0.1}Fe_{0.1}$, $Nd_{1.0}Si_{0.8}Cr_{0.1}Fe_{0.1}$, $Gd_{1.0}Si_{0.8}Cr_{0.1}Fe_{0.1}$, $Ce_{0.1}Nd_{0.9}Si_{0.8}Cr_{0.1}Fe_{0.1}$, $Ce_{0.2}Nd_{0.8}Si_{0.8}Cr_{0.1}Fe_{0.1}$, $Ce_{0.3}Nd_{0.7}Si_{0.8}Cr_{0.1}Fe_{0.1}$, $Ce_{0.4}Nd_{0.6}Si_{0.8}Cr_{0.1}Fe_{0.1}$, $Ce_{0.5}Nd_{0.5}Si_{0.8}Cr_{0.1}Fe_{0.1}$, $Ce_{0.6}Nd_{0.4}Si_{0.8}Cr_{0.1}Fe_{0.1}$, $Ce_{0.7}Nd_{0.3}Si_{0.8}Cr_{0.1}Fe_{0.1}$, $Ce_{0.8}Nd_{0.2}Si_{0.8}Ce_{0.1}Fe_{0.1}$, $Ce_{0.9}Nd_{0.1}Si_{0.8}Cr_{0.1}Fe_{0.1}$, $Gd_{0.1}Nd_{0.9}Si_{0.8}Cr_{0.1}Fe_{0.1}$, $Gd_{0.2}Nd_{0.8}Si_{0.8}Cr_{0.1}Fe_{0.1}$, $Gd_{0.3}Nd_{0.7}Si_{0.8}Cr_{0.1}Fe_{0.1}$, $Gd_{0.4}Nd_{0.6}Si_{0.8}Cr_{0.1}Fe_{0.1}$, $Gd_{0.5}Nd_{0.8}Si_{0.8}Cr_{0.1}Fe_{0.1}$, $Gd_{0.6}Nd_{0.4}Si_{0.8}Cr_{0.1}Fe_{0.1}$, $Gd_{0.7}Nd_{0.3}Si_{0.8}Cr_{0.1}Fe_{0.1}$, $Gd_{0.8}Nd_{0.2}Si_{0.8}Ce_{0.1}Fe_{0.1}$, $Gd_{0.9}Nd_{0.1}Si_{0.8}Cr_{0.1}Fe_{0.1}$, $Ce_{0.1}Gd_{0.9}Si_{0.8}Cr_{0.1}Fe_{0.1}$, $Ce_{0.2}Gd_{0.8}Si_{0.8}Cr_{0.1}Fe_{0.1}$, $Ce_{0.3}Gd_{0.7}Si_{0.8}Cr_{0.1}Fe_{0.1}$, $Ce_{0.4}Gd_{0.6}Si_{0.8}Cr_{0.1}Fe_{0.1}$, $Ce_{0.5}Gd_{0.5}Si_{0.8}Cr_{0.1}Fe_{0.1}$, $Ce_{0.6}Gd_{0.4}Si_{0.8}Cr_{0.1}Fe_{0.1}$, $Ce_{0.7}Gd_{0.3}Si_{0.8}Cr_{0.1}Fe_{0.1}$, $Ce_{0.8}Gd_{0.2}Si_{0.8}Ce_{0.1}Fe_{0.1}$, $Ce_{0.9}Gd_{0.1}Si_{0.8}Cr_{0.1}Fe_{0.1}$, $Ce_{1.0}Si_{0.8}Cr_{0.1}Al_{0.1}$, $Nd_{1.0}Si_{0.8}Cr_{0.1}Al_{0.1}$, $Gd_{1.0}Si_{0.8}Cr_{0.1}Al_{0.1}$, $Ce_{0.1}Nd_{0.9}Si_{0.8}Cr_{0.1}Al_{0.1}$, $Ce_{0.2}Nd_{0.8}Si_{0.8}Cr_{0.1}Al_{0.1}$, $Ce_{0.3}Nd_{0.7}Si_{0.8}Cr_{0.1}Al_{0.1}$, $Ce_{0.4}Nd_{0.6}Si_{0.8}Cr_{0.1}Al_{0.1}$, $Ce_{0.5}Nd_{0.8}Si_{0.8}Cr_{0.1}Al_{0.1}$, $Ce_{0.6}Nd_{0.4}Si_{0.8}Cr_{0.1}Al_{0.1}$, $Ce_{0.7}Nd_{0.3}Si_{0.8}Cr_{0.1}Al_{0.1}$, $Ce_{0.8}Nd_{0.2}Si_{0.8}Ce_{0.1}Al_{0.1}$, $Ce_{0.9}Nd_{0.1}Si_{0.8}Cr_{0.1}Al_{0.1}$, $Gd_{0.1}Nd_{0.9}Si_{0.8}Cr_{0.1}Al_{0.1}$, $Gd_{0.2}Nd_{0.8}Si_{0.8}Cr_{0.1}Al_{0.1}$, $Gd_{0.3}Nd_{0.7}Si_{0.8}Cr_{0.1}Al_{0.1}$, $Gd_{0.4}Nd_{0.6}Si_{0.8}Cr_{0.1}Al_{0.1}$, $Gd_{0.5}Nd_{0.8}Si_{0.8}Cr_{0.1}Al_{0.1}$, $Gd_{0.6}Nd_{0.4}Si_{0.8}Cr_{0.1}Al_{0.1}$, $Gd_{0.7}Nd_{0.3}Si_{0.8}Cr_{0.1}Al_{0.1}$, $Gd_{0.8}Nd_{0.2}Si_{0.8}Ce_{0.1}Al_{0.1}$, $Gd_{0.9}Nd_{0.1}Si_{0.8}Cr_{0.1}Al_{0.1}$, $Ce_{0.1}Gd_{0.9}Si_{0.8}Cr_{0.1}Al_{0.1}$, $Ce_{0.2}Gd_{0.8}Si_{0.8}Cr_{0.1}Al_{0.1}$, $Ce_{0.3}Gd_{0.7}Si_{0.8}Cr_{0.1}Al_{0.1}$, $Ce_{0.4}Gd_{0.6}Si_{0.8}Cr_{0.1}Al_{0.1}$, $Ce_{0.5}Gd_{0.5}Si_{0.8}Cr_{0.1}Al_{0.1}$, $Ce_{0.6}Gd_{0.4}Si_{0.8}Cr_{0.1}Al_{0.1}$, $Ce_{0.7}Gd_{0.3}Si_{0.8}Cr_{0.1}Al_{0.1}$, $Ce_{0.8}Gd_{0.2}Si_{0.8}Ce_{0.1}Al_{0.1}$, $Ce_{0.9}Gd_{0.1}Si_{0.8}Cr_{0.1}Ale_{0.1}$, $Ce_{1.0}Si_{0.8}Cr_{0.1}Ni_{0.1}$, $Nd_{1.0}Si_{0.8}Cr_{0.1}Ni_{0.1}$, $Gd_{1.0}Si_{0.8}Cr_{0.1}Ni_{0.1}$, $Ce_{0.1}Nd_{0.9}Si_{0.8}Cr_{0.1}Ni_{0.1}$, $Ce_{0.2}Nd_{0.8}Si_{0.8}Cr_{0.1}Ni_{0.1}$, $Ce_{0.3}Nd_{0.7}Si_{0.8}Cr_{0.1}Ni_{0.1}$, $Ce_{0.4}Nd_{0.6}Si_{0.8}Cr_{0.1}Ni_{0.1}$, $Ce_{0.5}Nd_{0.5}Si_{0.8}Cr_{0.1}Ni_{0.1}$,
$Ce_{0.7}Nd_{0.3}Si_{0.8}Cr_{0.1}Ni_{0.1}$,
$Ce_{0.9}Nd_{0.1}Si_{0.8}Cr_{0.1}Ni_{0.1}$,
$Gd_{0.2}Nd_{0.8}Si_{0.8}Cr_{0.1}Ni_{0.1}$,
$Gd_{0.4}Nd_{0.6}Si_{0.8}Cr_{0.1}Ni_{0.1}$,
$Gd_{0.6}Nd_{0.4}Si_{0.8}Cr_{0.1}Ni_{0.1}$,
$Gd_{0.8}Nd_{0.2}Si_{0.8}Ce_{0.1}Ni_{0.1}$,
$Ce_{0.1}Gd_{0.5}Si_{0.8}Cr_{0.1}Ni_{0.1}$,
$Ce_{0.3}Gd_{0.7}Si_{0.8}Cr_{0.1}Ni_{0.1}$,
$Ce_{0.5}Gd_{0.5}Si_{0.8}Cr_{0.1}Ni_{0.1}$,
$Ce_{0.7}Gd_{0.3}Si_{0.8}Cr_{0.1}Ni_{0.1}$,
$Ce_{0.9}Gd_{0.1}Si_{0.8}Cr_{0.1}Ni_{0.1}$,
$Nd_{1.0}Si_{0.8}Cr_{0.1}Co_{0.1}$,
$Ce_{0.1}Nd_{0.9}Si_{0.8}Cr_{0.1}Co_{0.1}$,
$Ce_{0.3}Nd_{0.7}Si_{0.8}Cr_{0.1}Co_{0.1}$,
$Ce_{0.5}Nd_{0.8}Si_{0.8}Cr_{0.1}Co_{0.1}$,
$Ce_{0.7}Nd_{0.3}Si_{0.8}Cr_{0.1}Co_{0.1}$,
$Ce_{0.9}Nd_{0.1}Si_{0.8}Cr_{0.1}Co_{0.1}$,
$Gd_{0.2}Nd_{0.8}Si_{0.8}Cr_{0.1}Co_{0.1}$,
$Gd_{0.4}Nd_{0.6}Si_{0.8}Cr_{0.1}Co_{0.1}$,
$Gd_{0.6}Nd_{0.4}Si_{0.8}Cr_{0.1}Co_{0.1}$,
$Gd_{0.8}Nd_{0.2}Si_{0.8}Ce_{0.1}Co_{0.1}$,
$Ce_{0.1}Gd_{0.5}Si_{0.8}Cr_{0.1}Co_{0.1}$,
$Ce_{0.3}Gd_{0.7}Si_{0.8}Cr_{0.1}Co_{0.1}$,
$Ce_{0.5}Gd_{0.5}Si_{0.8}Cr_{0.1}Co_{0.1}$,
$Ce_{0.7}Gd_{0.3}Si_{0.8}Cr_{0.1}Co_{0.1}$,
$Ce_{0.9}Gd_{0.1}Si_{0.8}Cr_{0.1}Co_{0.1}$,
$Nd_{1.0}Si_{0.8}Cr_{0.1}Cu_{0.1}$,
$Ce_{0.1}Nd_{0.9}Si_{0.8}Cr_{0.1}Cu_{0.1}$,
$Ce_{0.3}Nd_{0.7}Si_{0.8}Cr_{0.1}Cu_{0.1}$,
$Ce_{0.5}Nd_{0.8}Si_{0.8}Cr_{0.1}Cu_{0.1}$,
$Ce_{0.7}Nd_{0.3}Si_{0.8}Cr_{0.1}Cu_{0.1}$,
$Ce_{0.9}Nd_{0.1}Si_{0.8}Cr_{0.1}Cu_{0.1}$,
$Gd_{0.2}Nd_{0.8}Si_{0.8}Cr_{0.1}Cu_{0.1}$,
$Gd_{0.4}Nd_{0.6}Si_{0.8}Cr_{0.1}Cu_{0.1}$,
$Gd_{0.6}Nd_{0.4}Si_{0.8}Cr_{0.1}Cu_{0.1}$,
$Gd_{0.8}Nd_{0.2}Si_{0.8}Ce_{0.1}Cu_{0.1}$,
$Ce_{0.1}Gd_{0.9}Si_{0.8}Cr_{0.1}Cu_{0.1}$,
$Ce_{0.3}Gd_{0.7}Si_{0.8}Cr_{0.1}Cu_{0.1}$,
$Ce_{0.5}Gd_{0.5}Si_{0.8}Cr_{0.1}Cu_{0.1}$,
$Ce_{0.7}Gd_{0.3}Si_{0.8}Cr_{0.1}Cu_{0.1}$,
$Ce_{0.9}Gd_{0.1}Si_{0.8}Cr_{0.1}Cu_{0.1}$,
$Nd_{1.0}Si_{0.8}Cr_{0.1}Zn_{0.1}$,
$Ce_{0.1}Nd_{0.9}Si_{0.8}Cr_{0.1}Zn_{0.1}$,
$Ce_{0.3}Nd_{0.7}Si_{0.8}Cr_{0.1}Zn_{0.1}$,
$Ce_{0.5}Nd_{0.8}Si_{0.8}Cr_{0.1}Zn_{0.1}$,
$Ce_{0.7}Nd_{0.3}Si_{0.8}Cr_{0.1}Zn_{0.1}$,
$Ce_{0.9}Nd_{0.1}Si_{0.8}Cr_{0.1}Zn_{0.1}$,
$Gd_{0.2}Nd_{0.8}Si_{0.8}Cr_{0.1}Zn_{0.1}$,
$Gd_{0.4}Nd_{0.6}Si_{0.8}Cr_{0.1}Zn_{0.1}$,
$Gd_{0.6}Nd_{0.4}Si_{0.8}Cr_{0.1}Zn_{0.1}$,
$Gd_{0.8}Nd_{0.2}Si_{0.8}Ce_{0.1}Zn_{0.1}$,
$Ce_{0.1}Gd_{0.9}Si_{0.8}Cr_{0.1}Zn_{0.1}$,
$Ce_{0.3}Gd_{0.7}Si_{0.8}Cr_{0.1}Zn_{0.1}$,
$Ce_{0.5}Gd_{0.5}Si_{0.8}Cr_{0.1}Zn_{0.1}$,
$Ce_{0.7}Gd_{0.3}Si_{0.8}Cr_{0.1}Zn_{0.1}$,
$Ce_{0.9}Gd_{0.1}Si_{0.8}Cr_{0.1}Zn_{0.1}$.

$Ce_{0.6}Nd_{0.4}Si_{0.8}Cr_{0.1}Ni_{0.1}$,
$Ce_{0.8}Nd_{0.2}Si_{0.8}Ce_{0.1}Ni_{0.1}$,
$Gd_{0.1}Nd_{0.9}Si_{0.8}Cr_{0.1}$, $Ni_{0.1}$,
$Gd_{0.3}Nd_{0.7}Si_{0.8}Cr_{0.1}Ni_{0.1}$,
$Gd_{0.5}Nd_{0.8}Si_{0.8}Cr_{0.1}Ni_{0.1}$,
$Gd_{0.7}Nd_{0.3}Si_{0.8}Cr_{0.1}Ni_{0.1}$,
$Gd_{0.9}Nd_{0.1}Si_{0.8}Cr_{0.1}Ni_{0.1}$,
$Ce_{0.2}Gd_{0.8}Si_{0.8}Cr_{0.1}Ni_{0.1}$,
$Ce_{0.4}Gd_{0.6}Si_{0.8}Cr_{0.1}Ni_{0.1}$,
$Ce_{0.6}Gd_{0.4}Si_{0.8}Cr_{0.1}Ni_{0.1}$,
$Ce_{0.8}Gd_{0.2}Si_{0.8}Ce_{0.1}Ni_{0.1}$,
$Ce_{1.0}Si_{0.8}Cr_{0.1}Co_{0.1}$,
$Gd_{1.0}Si_{0.8}Cr_{0.1}Co_{0.1}$,
$Ce_{0.2}Nd_{0.8}Si_{0.8}Cr_{0.1}Co_{0.1}$,
$Ce_{0.4}Nd_{0.6}Si_{0.8}Cr_{0.1}Co_{0.1}$,
$Ce_{0.6}Nd_{0.4}Si_{0.8}Cr_{0.1}Co_{0.1}$,
$Ce_{0.8}Nd_{0.2}Si_{0.8}Ce_{0.1}Co_{0.1}$,
$Gd_{0.1}Nd_{0.9}Si_{0.8}Cr_{0.1}Co_{0.1}$,
$Gd_{0.3}Nd_{0.7}Si_{0.8}Cr_{0.1}Co_{0.1}$,
$Gd_{0.8}Nd_{0.2}Si_{0.8}Cr_{0.1}Co_{0.1}$,
$Gd_{0.7}Nd_{0.3}Si_{0.8}Cr_{0.1}Co_{0.1}$,
$Gd_{0.9}Nd_{0.1}Si_{0.8}Cr_{0.1}Co_{0.1}$,
$Ce_{0.2}Gd_{0.5}Si_{0.8}Cr_{0.1}Co_{0.1}$,
$Ce_{0.4}Gd_{0.6}Si_{0.8}Cr_{0.1}Co_{0.1}$,
$Ce_{0.6}Gd_{0.4}Si_{0.8}Cr_{0.1}Co_{0.1}$,
$Ce_{0.8}Gd_{0.2}Si_{0.8}Ce_{0.1}Co_{0.1}$,
$Ce_{1.0}Si_{0.8}Cr_{0.1}Cu_{0.1}$,
$Gd_{1.0}Si_{0.8}Cr_{0.1}Cu_{0.1}$,
$Ce_{0.2}Nd_{0.8}Si_{0.8}Cr_{0.1}Cu_{0.1}$,
$Ce_{0.4}Nd_{0.6}Si_{0.8}Cr_{0.1}Cu_{0.1}$,
$Ce_{0.6}Nd_{0.4}Si_{0.8}Cr_{0.1}Cu_{0.1}$,
$Ce_{0.8}Nd_{0.2}Si_{0.8}Ce_{0.1}Cu_{0.1}$,
$Gd_{0.1}Nd_{0.9}Si_{0.8}Cr_{0.1}Cu_{0.1}$,
$Gd_{0.3}Nd_{0.7}Si_{0.8}Cr_{0.1}Cu_{0.1}$,
$Gd_{0.5}Nd_{0.8}Si_{0.8}Cr_{0.1}Cu_{0.1}$,
$Gd_{0.7}Nd_{0.3}Si_{0.8}Cr_{0.1}Cu_{0.1}$,
$Gd_{0.9}Nd_{0.1}Si_{0.8}Cr_{0.1}Cu_{0.1}$,
$Ce_{0.2}Gd_{0.5}Si_{0.8}Cr_{0.1}Cu_{0.1}$,
$Ce_{0.4}Gd_{0.6}Si_{0.8}Cr_{0.1}Cu_{0.1}$,
$Ce_{0.6}Gd_{0.4}Si_{0.8}Cr_{0.1}Cu_{0.1}$,
$Ce_{0.8}Gd_{0.2}Si_{0.8}Ce_{0.1}Cu_{0.1}$,
$Ce_{1.0}Si_{0.8}Cr_{0.1}Zn_{0.1}$,
$Gd_{1.0}Si_{0.8}Cr_{0.1}Zn_{0.1}$,
$Ce_{0.2}Nd_{0.8}Si_{0.8}Cr_{0.1}Zn_{0.1}$,
$Ce_{0.4}Nd_{0.6}Si_{0.8}Cr_{0.1}Zn_{0.1}$,
$Ce_{0.6}Nd_{0.4}Si_{0.8}Cr_{0.1}Zn_{0.1}$,
$Ce_{0.8}Nd_{0.2}Si_{0.8}Ce_{0.1}Zn_{0.1}$,
$Gd_{0.1}Nd_{0.9}Si_{0.8}Cr_{0.1}Zn_{0.1}$,
$Gd_{0.3}Nd_{0.7}Si_{0.8}Cr_{0.1}Zn_{0.1}$,
$Gd_{0.5}Nd_{0.8}Si_{0.8}Cr_{0.1}Zn_{0.1}$,
$Gd_{0.7}Nd_{0.3}Si_{0.8}Cr_{0.1}Zn_{0.1}$,
$Gd_{0.9}Nd_{0.1}Si_{0.8}Cr_{0.8}Zn_{0.1}$,
$Ce_{0.2}Gd_{0.5}Si_{0.8}Cr_{0.1}Zn_{0.1}$,
$Ce_{0.4}Gd_{0.6}Si_{0.8}Cr_{0.1}Zn_{0.1}$,
$Ce_{0.6}Gd_{0.4}Si_{0.8}Cr_{0.1}Zn_{0.1}$,
$Ce_{0.8}Gd_{0.2}Si_{0.8}Ce_{0.1}Zn_{0.1}$.

In some embodiments, a magnetocaloric material may comprise Ce $Si_y Al_{1-y}$ wherein y is greater than 0 and less than 1. In some embodiments, the material is $Ce_{1.0}Si_{0.9}Al_{0.1}$, $Ce_{1.0}Si_{0.8}Al_{0.8}$, $Ce_{1.0}Si_{0.7}Al_{0.3}$, $Ce_{1.0}Si_{0.6}Al_{0.4}$, $Ce_{1.0}Si_{0.5}Al_{0.5}$, $Ce_{1.0}Si_{0.4}Al_{0.6}$, $Ce_{1.0}Si_{0.3}Al_{0.7}$, $Ce_{1.0}Si_{0.2}Al_{0.8}$, $Ce_{1.0}Si_{0.1}Al_{0.9}$, or any combination thereof.

Another embodiment is a magnetic refrigerator comprising the magnetocaloric material. In some embodiments, a magnetic refrigerator comprises a magnetocaloric material, wherein the magnetocaloric material comprises $(A_xB_{1-x})$ $Si_{1-y-z}$ $(D_y, E_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$. In some embodiments, a magnetic refrigerator comprises a magnetocaloric material, wherein the magnetocaloric material comprises Ce $Si_y Al_{1-y}$ wherein y is greater than 0 and less than 1.

Another embodiment is a method of manufacturing a heat pump, comprising fabricating at least one part of the heat pump from a magnetocaloric material. In some embodiments, a method of manufacturing a heat pump comprises fabricating at least one part of the heat pump from a magnetocaloric material, wherein the magnetocaloric material comprises $(A_xB_{1-x})$ $Si_{1-y-z}$ $(D_y, E_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$. In some embodiments, a method of manufacturing a heat pump comprises fabricating at least one part of the heat pump from a magnetocaloric material, wherein the magnetocaloric material comprises Ce $Si_y Al_{1-y}$ wherein y is greater than 0 and less than 1.

Some embodiments relate to magnetocaloric materials comprising alloys useful for magnetic refrigeration applications. In some embodiments, the disclosed alloys may be Cerium, Neodymium, and/or Gadolinium based compositions that are fairly inexpensive, and in some cases exhibit only $2^{nd}$ order magnetic phase transitions near their curie temperature, thus there are limited thermal and structural hysteresis losses. This makes these compositions attractive candidates for use in magnetic refrigeration applications. Surprisingly, the performance of the disclosed materials is similar or better to many of the known expensive rare-earth based magnetocaloric materials.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the embodiments which follow.

DETAILED DESCRIPTION

Figure 1:
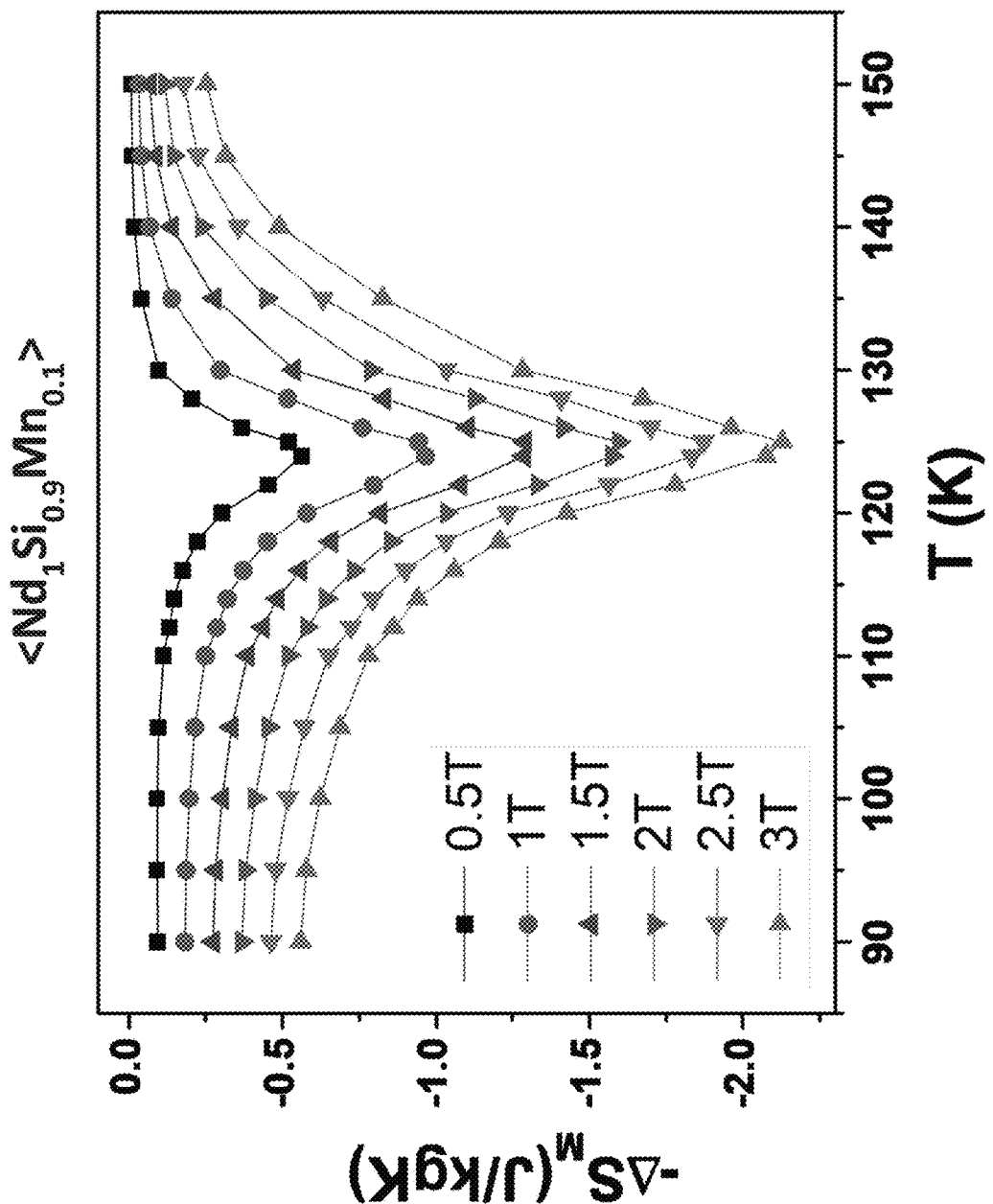
FIG. 1 illustrates the change in entropy versus temperature for a $Nd_{1.0}Si_{0.9}Mn_{0.1}$ alloy.

The magnetocaloric effect (MCE) is a phenomenon in which the temperature change of a suitable material is caused by exposing the material to a changing magnetic field. The magnetocaloric effect can be quantified with the equation below:

$$\Delta T_{ad} = -\int_{H_0}^{H_1} \left(\frac{T}{C(T,H)}\right)_H \left(\frac{\partial M(T,H)}{\partial T}\right)_H dH$$

where T is the temperature, H is the applied magnetic field, C is the heat capacity of the working magnet (refrigerant) and M is the magnetization of the refrigerant. The temperature change in the material is caused by a change in the entropy of the material.

As used herein, the term "magnetocaloric effect" includes any phenomenon in which the temperature change of a material is caused by exposing the material to a changing magnetic field.

The magnetocaloric effect exhibited by most magnetocaloric materials is as follows: the temperature of the magnetocaloric material increases when the magnetic field is moved near or in contact with the magnetocaloric material, and wherein the temperature of the magnetocaloric material decreases when the magnetic field is moved away from the magnetocaloric material. Materials which undergo a magnetocaloric effect with application and removal of a magnetic field include, but are not limited to, Gadolinium based alloys. In some embodiments, the magnetocaloric material exhibits a magnetocaloric effect, wherein the temperature of the magnetocaloric material increases when the magnetic field is moved near or in contact with the magnetocaloric material, and wherein the temperature of the magnetocaloric material decreases when the magnetic field is moved away from the magnetocaloric material.

However, some magnetocaloric materials exhibit an inverse magnetocaloric effect, wherein the temperature of the magnetocaloric material decreases when the magnetic field is moved near or in contact with the magnetocaloric material, and wherein the temperature of the magnetocaloric material increases when the magnetic field is moved away from the magnetocaloric material. Materials which undergo an inverse magnetocaloric effect with application and removal of a magnetic field include, but are not limited to, Heusler alloys, which include, but are not limited to, NiMn based alloys. In some embodiments, the magnetocaloric material exhibits an inverse magnetocaloric effect, wherein the temperature of the magnetocaloric material decreases when the magnetic field is moved near or in contact with the magnetocaloric material, and wherein the temperature of the magnetocaloric material increases when the magnetic field is moved away from the magnetocaloric material.

The present disclosure relates to magnetocaloric alloys with 2nd order magnetic phase transitions. Some embodiments may provide a magnetocaloric material comprising $(A_xB_{1-x})Si_{1-y-z}(Mn_yCr_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$.

Surprisingly, it was discovered that replacing Si with different elements such as Cr, Mn, Fe, Al, Ni, Co, Cu, or Zn, alters the magnetocaloric properties ($\Delta S$ and/or curie temperature) and also improves the resistance to oxidation in air at room temperature. In some embodiments of the magnetocaloric material, y+z=0.1. In some embodiments of the magnetocaloric material, y+z=0.2. In some embodiments of the magnetocaloric material, y+z=0.3. In some embodiments, the optimal performance is achieved when y+z=0.2. In some embodiments of the magnetocaloric material, y+z=0.2. In some embodiments, replacing even small amounts of Silicon with Chromium significantly improves the materials resistance to oxidation. In some embodiments of the magnetocaloric material, y+z=0.1. In some embodiments of the magnetocaloric material, y+z=0.2. In some embodiments of the magnetocaloric material, y+z=0.3. In some embodiments of the magnetocaloric material, y=0.1 and z=0. In some embodiments of the magnetocaloric material, y=0.2 and z=0. In some embodiments of the magnetocaloric material, y=0.3 and z=0. In some embodiments of the magnetocaloric material, y=0.05 and z=0.1. In some embodiments of the magnetocaloric material, y=0.05 and z=0.05. In some embodiments of the magnetocaloric material, y=0.05 and z=0.15.

In some embodiments, the magnetocaloric material comprises $(A_xB_{1-x})Si_{0.8}Mn_{0.2}$ wherein A and B are selected from the group consisting of Ce, Nd, or Gd, wherein x is in the range of about 0 to about 1.0. In some embodiments, the material is $Ce_{1.0}Si_{0.8}Mn_{0.2}$, $Nd_{1.0}Si_{0.8}Mn_{0.2}$, $Gd_{1.0}Si_{0.8}Mn_{0.2}$, $Ce_{0.1}Nd_{0.9}Si_{0.8}Mn_{0.2}$, $Ce_{0.2}Nd_{0.8}Si_{0.8}Mn_{0.2}$, $Ce_{0.3}Nd_{0.7}Si_{0.8}Mn_{0.2}$, $Ce_{0.4}Nd_{0.6}Si_{0.8}Mn_{0.2}$, $Ce_{0.5}Nd_{0.5}Si_{0.8}Mn_{0.2}$, $Ce_{0.6}Nd_{0.4}Si_{0.8}Mn_{0.2}$, $Ce_{0.7}Nd_{0.3}Si_{0.8}Mn_{0.2}$, $Ce_{0.8}Nd_{0.2}Si_{0.8}Mn_{0.2}$, $Ce_{0.9}Nd_{0.1}Si_{0.8}Mn_{0.2}$, $Gd_{0.1}Nd_{0.9}Si_{0.8}Mn_{0.2}$, $Gd_{0.2}Nd_{0.8}Si_{0.8}Mn_{0.2}$, $Gd_{0.3}Nd_{0.7}Si_{0.8}Mn_{0.2}$, $Gd_{0.4}Nd_{0.6}Si_{0.8}Mn_{0.2}$, $Gd_{0.5}Nd_{0.5}Si_{0.8}Mn_{0.2}$, $Gd_{0.6}Nd_{0.4}Si_{0.8}Mn_{0.2}$, $Gd_{0.7}Nd_{0.3}Si_{0.8}Mn_{0.2}$, $Gd_{0.8}Nd_{0.2}Si_{0.8}Mn_{0.2}$, $Gd_{0.9}Nd_{0.1}Si_{0.8}Mn_{0.2}$, $Ce_{0.1}Gd_{0.9}Si_{0.8}Mn_{0.2}$, $Ce_{0.2}Gd_{0.8}Si_{0.8}Mn_{0.2}$, $Ce_{0.3}Gd_{0.7}Si_{0.8}Mn_{0.2}$, $Ce_{0.4}Gd_{0.6}Si_{0.8}Mn_{0.2}$, $Ce_{0.5}Gd_{0.5}Si_{0.8}Mn_{0.2}$, $Ce_{0.6}Gd_{0.4}Si_{0.8}Mn_{0.2}$, $Ce_{0.7}Gd_{0.3}Si_{0.8}Mn_{0.2}$, $Ce_{0.8}Gd_{0.2}Si_{0.8}Mn_{0.2}$, $Ce_{0.9}Gd_{0.1}Si_{0.8}Mn_{0.2}$.

In some embodiments, the magnetocaloric material comprises $(A_xB_{1-x})Si_{0.8}Cr_{0.2}$ wherein A and B are selected from the group consisting of Ce, Nd, or Gd, wherein x is in the range of about 0 to about 1.0. In some embodiments, the material is $Ce_{1.0}Si_{0.8}Cr_{0.2}$, $Nd_{1.0}Si_{0.8}Cr_{0.2}$, $Gd_{1.0}Si_{0.8}Cr_{0.2}$, $Ce_{0.1}Nd_{0.9}Si_{0.8}Cr_{0.2}$, $Ce_{0.2}Nd_{0.8}Si_{0.8}Cr_{0.2}$, $Ce_{0.3}Nd_{0.7}Si_{0.8}Cr_{0.2}$, $Ce_{0.4}Nd_{0.6}Si_{0.8}Cr_{0.2}$, $Ce_{0.5}Nd_{0.5}Si_{0.8}Cr_{0.2}$, $Ce_{0.6}Nd_{0.4}Si_{0.8}Cr_{0.2}$, $Ce_{0.7}Nd_{0.3}Si_{0.8}Cr_{0.2}$, $Ce_{0.8}Nd_{0.2}Si_{0.8}Cr_{0.2}$, $Ce_{0.9}Nd_{0.1}Si_{0.8}Cr_{0.2}$, $Gd_{0.1}Nd_{0.9}Si_{0.8}Cr_{0.2}$, $Gd_{0.2}Nd_{0.8}Si_{0.8}Cr_{0.2}$, $Gd_{0.3}Nd_{0.7}Si_{0.8}Cr_{0.2}$, $Gd_{0.4}Nd_{0.6}Si_{0.8}Cr_{0.2}$, $Gd_{0.5}Nd_{0.5}Si_{0.8}Cr_{0.2}$, $Gd_{0.6}Nd_{0.4}Si_{0.8}Cr_{0.2}$, $Gd_{0.7}Nd_{0.3}Si_{0.8}Cr_{0.2}$, $Gd_{0.8}Nd_{0.2}Si_{0.8}Cr_{0.2}$, $Gd_{0.9}Nd_{0.1}Si_{0.8}Cr_{0.2}$, $Ce_{0.1}Gd_{0.9}Si_{0.8}Cr_{0.2}$, $Ce_{0.2}Gd_{0.5}Si_{0.8}Cr_{0.2}$, $Ce_{0.3}Gd_{0.7}Si_{0.8}Cr_{0.2}$, $Ce_{0.4}Gd_{0.6}Si_{0.8}Cr_{0.2}$, $Ce_{0.5}Gd_{0.5}Si_{0.8}Cr_{0.2}$, $Ce_{0.6}Gd_{0.4}Si_{0.8}Cr_{0.2}$, $Ce_{0.7}Gd_{0.3}Si_{0.8}Cr_{0.2}$, $Ce_{0.8}Gd_{0.2}Si_{0.8}Cr_{0.2}$, $Ce_{0.9}Gd_{0.1}Si_{0.8}Cr_{0.2}$.

In some embodiments, the magnetocaloric material comprises $(A_xB_{1-x})Si_{0.8}Mn_{0.1}Cr_{0.1}$ wherein A and B are selected from the group consisting of Ce, Nd, or Gd, wherein x is in the range of about 0 to about 1.0. In some embodiments, the material is $Ce_{1.0}Si_{0.8}Mn_{0.1}Cr_{0.1}$, $Nd_{1.0}Si_{0.8}Mn_{0.1}Cr_{0.1}$, $Gd_{1.0}Si_{0.8}Mn_{0.1}Cr_{0.1}$, $Ce_{0.1}Nd_{0.9}Si_{0.8}Mn_{0.1}Cr_{0.1}$, $Ce_{0.2}Nd_{0.8}Si_{0.8}Mn_{0.1}Cr_{0.1}$, $Ce_{0.3}Nd_{0.7}Si_{0.8}Mn_{0.1}Cr_{0.1}$, $Ce_{0.4}Nd_{0.6}Si_{0.8}Mn_{0.1}Cr_{0.1}$, $Ce_{0.5}Nd_{0.5}Si_{0.8}Mn_{0.1}Cr_{0.1}$, $Ce_{0.6}Nd_{0.4}Si_{0.8}Mn_{0.1}Cr_{0.1}$, $Ce_{0.7}Nd_{0.3}Si_{0.8}Mn_{0.1}Cr_{0.1}$, $Ce_{0.8}Nd_{0.2}Si_{0.8}Mn_{0.1}Cr_{0.1}$, $Ce_{0.9}Nd_{0.1}Si_{0.8}Mn_{0.1}Cr_{0.1}$, $Gd_{0.1}Nd_{0.9}Si_{0.8}Mn_{0.1}Cr_{0.1}$, $Gd_{0.2}Nd_{0.8}Si_{0.8}Mn_{0.1}Cr_{0.1}$, $Gd_{0.3}Nd_{0.7}Si_{0.8}Mn_{0.1}Cr_{0.1}$, $Gd_{0.4}Nd_{0.6}Si_{0.8}Mn_{0.1}Cr_{0.1}$, $Gd_{0.5}Nd_{0.5}Si_{0.8}Mn_{0.1}Cr_{0.1}$, $Gd_{0.6}Nd_{0.4}Si_{0.8}Mn_{0.1}Cr_{0.1}$, $Gd_{0.7}Nd_{0.3}Si_{0.8}Mn_{0.1}Cr_{0.1}$, $Gd_{0.8}Nd_{0.2}Si_{0.8}Mn_{0.1}Cr_{0.1}$, $Gd_{0.9}Nd_{0.1}Si_{0.8}Mn_{0.1}Cr_{0.1}$, $Ce_{0.1}Gd_{0.9}Si_{0.8}Mn_{0.1}Cr_{0.1}$, $Ce_{0.2}Gd_{0.8}Si_{0.8}Mn_{0.1}Cr_{0.1}$, $Ce_{0.3}Gd_{0.7}Si_{0.8}Mn_{0.1}Cr_{0.1}$, $Ce_{0.4}Gd_{0.6}Si_{0.8}Mn_{0.1}Cr_{0.1}$, $Ce_{0.5}Gd_{0.5}Si_{0.7}Mn_{0.1}Cr_{0.1}$, $Ce_{0.6}Gd_{0.4}Si_{0.8}Mn_{0.1}Cr_{0.1}$, $Ce_{0.7}Gd_{0.3}Si_{0.8}Mn_{0.1}Cr_{0.1}$, $Ce_{0.8}Gd_{0.2}Si_{0.8}Mn_{0.1}Cr_{0.1}$, $Ce_{0.9}Gd_{0.1}Si_{0.8}Mn_{0.1}Cr_{0.1}$.

In some embodiments, the magnetocaloric material comprises $(A_xB_{1-x})Si_{0.8}Mn_{0.05}Cr_{0.15}$ wherein A and B are selected from the group consisting of Ce, Nd, or Gd, wherein x is in the range of about 0 to about 1.0. In some embodiments, the material is $Ce_{1.0}Si_{0.8}Mn_{0.05}Cr_{0.15}$, $Nd_{1.0}Si_{0.8}Mn_{0.05}Cr_{0.15}$, $Gd_{1.0}Si_{0.8}Mn_{0.05}Cr_{0.15}$, $Ce_{0.1}Nd_{0.9}Si_{0.8}Mn_{0.05}Cr_{0.15}$, $Ce_{0.2}Nd_{0.8}Si_{0.8}Mn_{0.05}Cr_{0.15}$, $Ce_{0.3}Nd_{0.7}Si_{0.8}Mn_{0.05}Cr_{0.15}$, $Ce_{0.4}Nd_{0.6}Si_{0.8}Mn_{0.05}Cr_{0.15}$, $Ce_{0.5}Nd_{0.5}Si_{0.8}Mn_{0.05}Cr_{0.15}$, $Ce_{0.6}Nd_{0.4}Si_{0.8}Mn_{0.05}Cr_{0.15}$, $Ce_{0.7}Nd_{0.3}Si_{0.8}Mn_{0.05}Cr_{0.15}$, $Ce_{0.8}Nd_{0.2}Si_{0.8}Mn_{0.05}Cr_{0.15}$, $Ce_{0.9}Nd_{0.1}Si_{0.8}Mn_{0.05}Cr_{0.15}$, $Gd_{0.1}Nd_{0.9}Si_{0.8}Mn_{0.05}Cr_{0.15}$, $Gd_{0.2}Nd_{0.8}Si_{0.8}Mn_{0.05}Cr_{0.15}$, $Gd_{0.3}Nd_{0.7}Si_{0.8}Mn_{0.05}Cr_{0.15}$, $Gd_{0.4}Nd_{0.6}Si_{0.8}Mn_{0.05}Cr_{0.15}$, $Gd_{0.5}Nd_{0.5}Si_{0.8}Mn_{0.05}Cr_{0.15}$, $Gd_{0.6}Nd_{0.4}Si_{0.8}Mn_{0.05}Cr_{0.15}$, $Gd_{0.7}Nd_{0.3}Si_{0.8}Mn_{0.05}Cr_{0.15}$, $Gd_{0.8}Nd_{0.2}Si_{0.8}Mn_{0.05}Cr_{0.15}$, $Gd_{0.9}Nd_{0.1}Si_{0.8}Mn_{0.05}Cr_{0.15}$, $Ce_{0.1}Gd_{0.9}Si_{0.8}Mn_{0.05}Cr_{0.15}$, $Ce_{0.2}Gd_{0.8}Si_{0.8}Mn_{0.05}Cr_{0.15}$, $Ce_{0.3}Gd_{0.7}Si_{0.8}Mn_{0.05}Cr_{0.15}$, $Ce_{0.4}Gd_{0.6}Si_{0.8}Mn_{0.05}Cr_{0.15}$, $Ce_{0.5}Gd_{0.5}Si_{0.8}Mn_{0.05}Cr_{0.15}$, $Ce_{0.6}Gd_{0.4}Si_{0.8}Mn_{0.05}Cr_{0.15}$, $Ce_{0.7}Gd_{0.3}Si_{0.8}Mn_{0.05}Cr_{0.15}$, $Ce_{0.8}Gd_{0.2}Si_{0.8}Mn_{0.05}Cr_{0.15}$, $Ce_{0.9}Gd_{0.1}Si_{0.8}Mn_{0.05}Cr_{0.15}$.

In some embodiments, the magnetocaloric material comprises $(A_xB_{1-x})Si_{0.8}Mn_{0.15}Cr_{0.05}$ wherein A and B are selected from the group consisting of Ce, Nd, or Gd, wherein x is in the range of about 0 to about 1.0. In some embodiments, the material is $Ce_{1.0}Si_{0.8}Mn_{0.15}Cr_{0.05}$, $Nd_{1.0}Si_{0.8}Mn_{0.15}Cr_{0.05}$, $Gd_{1.0}Si_{0.8}Mn_{0.15}Cr_{0.05}$, $Ce_{0.1}Nd_{0.9}Si_{0.8}Mn_{0.15}Cr_{0.05}$, $Ce_{0.2}Nd_{0.8}Si_{0.8}Mn_{0.15}Cr_{0.05}$, $Ce_{0.3}Nd_{0.7}Si_{0.8}Mn_{0.15}Cr_{0.05}$, $Ce_{0.4}Nd_{0.6}Si_{0.8}Mn_{0.15}Cr_{0.05}$, $Ce_{0.5}Nd_{0.5}Si_{0.8}Mn_{0.15}Cr_{0.05}$, $Ce_{0.6}Nd_{0.4}Si_{0.8}Mn_{0.15}Cr_{0.05}$, $Ce_{0.7}Nd_{0.3}Si_{0.8}Mn_{0.15}Cr_{0.05}$, $Ce_{0.8}Nd_{0.2}Si_{0.8}Mn_{0.15}Cr_{0.05}$, $Ce_{0.9}Nd_{0.1}Si_{0.8}Mn_{0.15}Cr_{0.05}$, $Gd_{0.1}Nd_{0.9}Si_{0.8}Mn_{0.15}Cr_{0.05}$, $Gd_{0.2}Nd_{0.8}Si_{0.8}Mn_{0.15}Cr_{0.05}$, $Gd_{0.3}Nd_{0.7}Si_{0.8}Mn_{0.15}Cr_{0.05}$, $Gd_{0.4}Nd_{0.6}Si_{0.8}Mn_{0.15}Cr_{0.05}$, $Gd_{0.5}Nd_{0.5}Si_{0.8}Mn_{0.15}Cr_{0.05}$, $Gd_{0.6}Nd_{0.4}Si_{0.8}Mn_{0.15}Cr_{0.05}$, $Gd_{0.7}Nd_{0.3}Si_{0.8}Mn_{0.15}Cr_{0.05}$, $Gd_{0.8}Nd_{0.2}Si_{0.8}Mn_{0.15}Cr_{0.05}$, $Gd_{0.9}Nd_{0.1}Si_{0.8}Mn_{0.15}Cr_{0.05}$, $Ce_{0.1}Gd_{0.9}Si_{0.8}Mn_{0.15}Cr_{0.05}$, $Ce_{0.2}Gd_{0.8}Si_{0.8}Mn_{0.15}Cr_{0.05}$, $Ce_{0.3}Gd_{0.7}Si_{0.8}Mn_{0.15}Cr_{0.05}$, $Ce_{0.4}Gd_{0.6}Si_{0.8}Mn_{0.15}Cr_{0.05}$, $Ce_{0.5}Gd_{0.5}Si_{0.8}Mn_{0.15}Cr_{0.05}$, $Ce_{0.6}Gd_{0.4}Si_{0.8}Mn_{0.15}Cr_{0.05}$, $Ce_{0.7}Gd_{0.3}Si_{0.9}Mn_{0.15}Cr_{0.05}$, $Ce_{0.8}Gd_{0.2}Si_{0.8}Mn_{0.15}Cr_{0.05}$, $Ce_{0.9}Gd_{0.1}Si_{0.8}Mn_{0.15}Cr_{0.05}$.

In some embodiments, the magnetocaloric material comprises $(A_xB_{1-x})Si_{0.8}Cr_{0.1}E_{0.1}$ wherein A and B are selected from the group consisting of Ce, Nd, or Gd, wherein E is selected from the group consisting of Fe, Al, Ni, Co, Cu, or Zn, wherein x is in the range of about 0 to about 1.0. In some embodiments the material is $Ce_{1.0}Si_{0.8}Cr_{0.1}Fe_{0.1}$, $Nd_{1.0}Si_{0.8}Cr_{0.1}Fe_{0.1}$, $Gd_{1.0}Si_{0.8}Cr_{0.1}Fe_{0.1}$, $Ce_{0.1}Nd_{0.9}Si_{0.8}Cr_{0.1}Fe_{0.1}$, $Ce_{0.2}Nd_{0.8}Si_{0.8}Cr_{0.1}Fe_{0.1}$, $Ce_{0.3}Nd_{0.7}Si_{0.8}Cr_{0.1}Fe_{0.1}$, $Ce_{0.4}Nd_{0.6}Si_{0.8}Cr_{0.1}Fe_{0.1}$, $Ce_{0.5}Nd_{0.8}Si_{0.8}Cr_{0.1}Fe_{0.1}$, $Ce_{0.6}Nd_{0.4}Si_{0.8}Cr_{0.1}Fe_{0.1}$, $Ce_{0.7}Nd_{0.3}Si_{0.8}Cr_{0.1}Fe_{0.1}$, $Ce_{0.8}Nd_{0.2}Si_{0.8}Ce_{0.1}Fe_{0.1}$, $Ce_{0.9}Nd_{0.1}Si_{0.8}Cr_{0.1}Fe_{0.1}$, $Gd_{0.1}Nd_{0.9}Si_{0.8}Cr_{0.1}Fe_{0.1}$, $Gd_{0.2}Nd_{0.8}Si_{0.8}Cr_{0.1}Fe_{0.1}$, $Gd_{0.3}Nd_{0.7}Si_{0.8}Cr_{0.1}Fe_{0.1}$, $Gd_{0.4}Nd_{0.6}Si_{0.8}Cr_{0.1}Fe_{0.1}$, $Gd_{0.5}Nd_{0.8}Si_{0.8}Cr_{0.1}Fe_{0.1}$, $Gd_{0.6}Nd_{0.4}Si_{0.8}Cr_{0.1}Fe_{0.1}$, $Gd_{0.7}Nd_{0.3}Si_{0.8}Cr_{0.1}Fe_{0.1}$, $Gd_{0.8}Nd_{0.2}Si_{0.8}Ce_{0.1}Fe_{0.1}$, $Gd_{0.9}Nd_{0.1}Si_{0.8}Cr_{0.1}Fe_{0.1}$, $Ce_{0.1}Gd_{0.9}Si_{0.8}Cr_{0.1}Fe_{0.1}$, $Ce_{0.2}Gd_{0.8}Si_{0.8}Cr_{0.1}Fe_{0.1}$, $Ce_{0.3}Gd_{0.7}Si_{0.8}Cr_{0.1}Fe_{0.1}$, $Ce_{0.4}Gd_{0.6}Si_{0.8}Cr_{0.1}Fe_{0.1}$, $Ce_{0.5}Gd_{0.5}Si_{0.8}Cr_{0.1}Fe_{0.1}$, $Ce_{0.6}Gd_{0.4}Si_{0.8}Cr_{0.1}Fe_{0.1}$, $Ce_{0.7}Gd_{0.3}Si_{0.8}Cr_{0.1}Fe_{0.1}$, $Ce_{0.8}Gd_{0.2}Si_{0.8}Ce_{0.1}Fe_{0.1}$, $Ce_{0.9}Gd_{0.1}Si_{0.8}Cr_{0.1}Fe_{0.1}$, $Ce_{1.0}Si_{0.8}Cr_{0.1}Al_{0.1}$, $Nd_{1.0}Si_{0.8}Cr_{0.1}Al_{0.1}$, $Gd_{1.0}Si_{0.8}Cr_{0.1}Al_{0.1}$, $Ce_{0.1}Nd_{0.9}Si_{0.8}Cr_{0.1}Al_{0.1}$, $Ce_{0.2}Nd_{0.8}Si_{0.8}Cr_{0.1}Al_{0.1}$, $Ce_{0.3}Nd_{0.7}Si_{0.8}Cr_{0.1}Al_{0.1}$, $Ce_{0.4}Nd_{0.6}Si_{0.8}Cr_{0.1}Al_{0.1}$, $Ce_{0.5}Nd_{0.8}Si_{0.8}Cr_{0.1}Al_{0.1}$, $Ce_{0.6}Nd_{0.4}Si_{0.8}Cr_{0.1}Al_{0.1}$, $Ce_{0.7}Nd_{0.3}Si_{0.8}Cr_{0.1}Al_{0.1}$, $Ce_{0.8}Nd_{0.2}Si_{0.8}Ce_{0.1}Al_{0.1}$, $Ce_{0.9}Nd_{0.1}Si_{0.8}Cr_{0.1}Al_{0.1}$, $Gd_{0.1}Nd_{0.9}Si_{0.8}Cr_{0.1}Al_{0.1}$, $Gd_{0.2}Nd_{0.8}Si_{0.8}Cr_{0.1}Al_{0.1}$, $Gd_{0.3}Nd_{0.7}Si_{0.8}Cr_{0.1}Al_{0.1}$, $Gd_{0.4}Nd_{0.6}Si_{0.8}Cr_{0.1}Al_{0.1}$, $Gd_{0.5}Nd_{0.8}Si_{0.8}Cr_{0.1}Al_{0.1}$, $Gd_{0.6}Nd_{0.4}Si_{0.8}Cr_{0.1}Al_{0.1}$, $Gd_{0.7}Nd_{0.3}Si_{0.8}Cr_{0.1}Al_{0.1}$, $Gd_{0.8}Nd_{0.2}Si_{0.8}Ce_{0.1}Al_{0.1}$, $Gd_{0.9}Nd_{0.1}Si_{0.8}Cr_{0.1}Al_{0.1}$, $Ce_{0.1}Gd_{0.9}Si_{0.8}Cr_{0.1}Al_{0.1}$, $Ce_{0.2}Gd_{0.5}Si_{0.8}Cr_{0.1}Al_{0.1}$, $Ce_{0.3}Gd_{0.7}Si_{0.8}Cr_{0.1}Al_{0.1}$, $Ce_{0.4}Gd_{0.6}Si_{0.8}Cr_{0.1}Al_{0.1}$, $Ce_{0.5}Gd_{0.5}Si_{0.8}Cr_{0.1}Al_{0.1}$, $Ce_{0.6}Gd_{0.4}Si_{0.8}Cr_{0.1}Al_{0.1}$, $Ce_{0.7}Gd_{0.3}Si_{0.8}Cr_{0.1}Al_{0.1}$, $Ce_{0.8}Gd_{0.2}Si_{0.8}Ce_{0.1}Al_{0.1}$, $Ce_{0.9}Gd_{0.1}Si_{0.8}Cr_{0.1}Ale_{0.1}$, $Ce_{1.0}Si_{0.8}Cr_{0.1}Ni_{0.1}$, $Nd_{1.0}Si_{0.8}Cr_{0.1}Ni_{0.1}$, $Gd_{1.0}Si_{0.8}Cr_{0.1}Ni_{0.1}$, $Ce_{0.1}Nd_{0.9}Si_{0.8}Cr_{0.1}Ni_{0.1}$, $Ce_{0.2}Nd_{0.8}Si_{0.8}Cr_{0.1}Ni_{0.1}$, $Ce_{0.3}Nd_{0.7}Si_{0.8}Cr_{0.1}Ni_{0.1}$, $Ce_{0.4}Nd_{0.6}Si_{0.8}Cr_{0.1}Ni_{0.1}$, $Ce_{0.5}Nd_{0.8}Si_{0.8}Cr_{0.1}Ni_{0.1}$, $Ce_{0.6}Nd_{0.4}Si_{0.8}Cr_{0.1}Ni_{0.1}$, $Ce_{0.7}Nd_{0.3}Si_{0.8}Cr_{0.1}Ni_{0.1}$, $Ce_{0.8}Nd_{0.2}Si_{0.8}Ce_{0.1}Ni_{0.1}$, $Ce_{0.9}Nd_{0.1}Si_{0.8}Cr_{0.1}Ni_{0.1}$, $Gd_{0.1}Nd_{0.9}Si_{0.8}Cr_{0.1}$, $Ni_{0.1}$, $Gd_{0.2}Nd_{0.8}Si_{0.8}Cr_{0.1}Ni_{0.1}$, $Gd_{0.3}Nd_{0.7}Si_{0.8}Cr_{0.1}Ni_{0.1}$, $Gd_{0.4}Nd_{0.6}Si_{0.8}Cr_{0.1}Ni_{0.1}$,
$Gd_{0.6}Nd_{0.4}Si_{0.8}Cr_{0.1}Ni_{0.1}$,
$Gd_{0.8}Nd_{0.2}Si_{0.8}Ce_{0.1}Ni_{0.1}$,
$Ce_{0.1}Gd_{0.5}Si_{0.8}Cr_{0.1}Ni_{0.1}$,
$Ce_{0.3}Gd_{0.7}Si_{0.8}Cr_{0.1}Ni_{0.1}$,
$Ce_{0.5}Gd_{0.5}Si_{0.8}Cr_{0.6}Ni_{0.1}$,
$Ce_{0.7}Gd_{0.3}Si_{0.8}Cr_{0.1}Ni_{0.1}$,
$Ce_{0.9}Gd_{0.1}Si_{0.8}Cr_{0.1}Ni_{0.1}$,
$Nd_{1.0}Si_{0.8}Cr_{0.1}Co_{0.1}$,
$Ce_{0.1}Nd_{0.9}Si_{0.8}Cr_{0.1}Co_{0.1}$,
$Ce_{0.3}Nd_{0.7}Si_{0.8}Cr_{0.1}Co_{0.1}$,
$Ce_{0.5}Nd_{0.5}Si_{0.8}Cr_{0.1}Co_{0.1}$,
$Ce_{0.7}Nd_{0.3}Si_{0.8}Cr_{0.1}Co_{0.1}$,
$Ce_{0.9}Nd_{0.1}Si_{0.8}Cr_{0.1}Co_{0.1}$,
$Gd_{0.2}Nd_{0.8}Si_{0.8}Cr_{0.1}Co_{0.1}$,
$Gd_{0.4}Nd_{0.6}Si_{0.8}Cr_{0.1}Co_{0.1}$,
$Gd_{0.6}Nd_{0.4}Si_{0.8}Cr_{0.1}Co_{0.1}$,
$Gd_{0.8}Nd_{0.2}Si_{0.8}Ce_{0.1}Co_{0.1}$,
$Ce_{0.1}Gd_{0.5}Si_{0.8}Cr_{0.1}Co_{0.1}$,
$Ce_{0.3}Gd_{0.7}Si_{0.8}Cr_{0.1}Co_{0.1}$,
$Ce_{0.5}Gd_{0.5}Si_{0.8}Cr_{0.1}Co_{0.1}$,
$Ce_{0.7}Gd_{0.3}Si_{0.8}Cr_{0.1}Co_{0.1}$,
$Ce_{0.9}Gd_{0.1}Si_{0.8}Cr_{0.1}Co_{0.1}$,
$Nd_{1.0}Si_{0.8}Cr_{0.1}Cu_{0.1}$,
$Ce_{0.1}Nd_{0.8}Si_{0.8}Cr_{0.1}Cu_{0.1}$,
$Ce_{0.3}Nd_{0.7}Si_{0.8}Cr_{0.1}Cu_{0.1}$,
$Ce_{0.5}Nd_{0.5}Si_{0.8}Cr_{0.1}Cu_{0.1}$,
$Ce_{0.7}Nd_{0.3}Si_{0.8}Cr_{0.1}Cu_{0.1}$,
$Ce_{0.9}Nd_{0.1}Si_{0.8}Cr_{0.1}Cu_{0.1}$,
$Gd_{0.2}Nd_{0.8}Si_{0.8}Cr_{0.1}Cu_{0.1}$,
$Gd_{0.4}Nd_{0.6}Si_{0.8}Cr_{0.1}Cu_{0.1}$,
$Gd_{0.6}Nd_{0.4}Si_{0.8}Cr_{0.1}Cu_{0.1}$,
$Gd_{0.8}Nd_{0.2}Si_{0.8}Ce_{0.1}Cu_{0.1}$,
$Ce_{0.1}Gd_{0.9}Si_{0.8}Cr_{0.1}Cu_{0.1}$,
$Ce_{0.3}Gd_{0.7}Si_{0.8}Cr_{0.1}Cu_{0.1}$,
$Ce_{0.5}Gd_{0.5}Si_{0.8}Cr_{0.1}Cu_{0.1}$,
$Ce_{0.7}Gd_{0.3}Si_{0.8}Cr_{0.1}Cu_{0.1}$,
$Ce_{0.9}Gd_{0.1}Si_{0.8}Cr_{0.1}Cu_{0.1}$,
$Nd_{1.0}Si_{0.8}Cr_{0.1}Zn_{0.1}$,
$Ce_{0.1}Nd_{0.9}Si_{0.8}Cr_{0.1}Zn_{0.1}$,
$Ce_{0.3}Nd_{0.7}Si_{0.8}Cr_{0.1}Zn_{0.1}$,
$Ce_{0.5}Nd_{0.5}Si_{0.8}Cr_{0.1}Zn_{0.1}$,
$Ce_{0.7}Nd_{0.3}Si_{0.8}Cr_{0.1}Zn_{0.1}$,
$Ce_{0.9}Nd_{0.1}Si_{0.8}Cr_{0.1}Zn_{0.1}$,
$Gd_{0.2}Nd_{0.8}Si_{0.8}Cr_{0.1}Zn_{0.1}$,
$Gd_{0.4}Nd_{0.6}Si_{0.8}Cr_{0.1}Zn_{0.1}$,
$Gd_{0.6}Nd_{0.4}Si_{0.8}Cr_{0.1}Zn_{0.1}$,
$Gd_{0.8}Nd_{0.2}Si_{0.8}Ce_{0.1}Zn_{0.1}$,
$Ce_{0.1}Gd_{0.9}Si_{0.8}Cr_{0.1}Zn_{0.1}$,
$Ce_{0.3}Gd_{0.7}Si_{0.8}Cr_{0.1}Zn_{0.1}$,
$Ce_{0.5}Gd_{0.5}Si_{0.8}Cr_{0.1}Zn_{0.1}$,
$Ce_{0.7}Gd_{0.3}Si_{0.8}Cr_{0.1}Zn_{0.1}$,
$Ce_{0.9}Gd_{0.1}Si_{0.8}Cr_{0.1}Zn_{0.1}$.

$Gd_{0.5}Nd_{0.8}Si_{0.8}Cr_{0.1}Ni_{0.1}$,
$Gd_{0.7}Nd_{0.3}Si_{0.8}Cr_{0.1}Ni_{0.1}$,
$Gd_{0.9}Nd_{0.1}Si_{0.8}Cr_{0.1}Ni_{0.1}$,
$Ce_{0.2}Gd_{0.8}Si_{0.8}Cr_{0.1}Ni_{0.1}$,
$Ce_{0.4}Nd_{0.6}Si_{0.8}Cr_{0.1}Ni_{0.1}$,
$Ce_{0.6}Gd_{0.4}Si_{0.8}Cr_{0.1}Ni_{0.1}$,
$Ce_{0.8}Gd_{0.2}Si_{0.8}Ce_{0.1}Ni_{0.1}$,
$Ce_{1.0}Si_{0.8}Cr_{0.1}Co_{0.1}$,
$Gd_{1.0}Si_{0.8}Cr_{0.1}Co_{0.1}$,
$Ce_{0.2}Nd_{0.8}Si_{0.8}Cr_{0.1}Co_{0.1}$,
$Ce_{0.4}Nd_{0.6}Si_{0.8}Cr_{0.1}Co_{0.1}$,
$Ce_{0.6}Nd_{0.4}Si_{0.8}Cr_{0.1}Co_{0.1}$,
$Ce_{0.8}Nd_{0.2}Si_{0.8}Ce_{0.1}Co_{0.1}$,
$Gd_{0.1}Nd_{0.9}Si_{0.8}Cr_{0.1}Co_{0.1}$,
$Gd_{0.3}Nd_{0.7}Si_{0.8}Cr_{0.1}Co_{0.1}$,
$Gd_{0.5}Nd_{0.5}Si_{0.8}Cr_{0.1}Co_{0.1}$,
$Gd_{0.7}Nd_{0.3}Si_{0.8}Cr_{0.1}Co_{0.1}$,
$Gd_{0.9}Nd_{0.1}Si_{0.8}Cr_{0.1}Co_{0.1}$,
$Ce_{0.2}Gd_{0.5}Si_{0.8}Cr_{0.1}Co_{0.1}$,
$Ce_{0.4}Gd_{0.6}Si_{0.8}Cr_{0.1}Co_{0.1}$,
$Ce_{0.6}Gd_{0.4}Si_{0.8}Cr_{0.1}Co_{0.1}$,
$Ce_{0.8}Gd_{0.2}Si_{0.8}Ce_{0.1}Co_{0.1}$,
$Ce_{1.0}Si_{0.8}Cr_{0.1}Cu_{0.1}$,
$Gd_{1.0}Si_{0.8}Cr_{0.1}Cu_{0.1}$,
$Ce_{0.2}Nd_{0.8}Si_{0.8}Cr_{0.1}Cu_{0.1}$,
$Ce_{0.4}Nd_{0.6}Si_{0.8}Cr_{0.1}Cu_{0.1}$,
$Ce_{0.6}Nd_{0.4}Si_{0.8}Cr_{0.1}Cu_{0.1}$,
$Ce_{0.8}Nd_{0.2}Si_{0.8}Ce_{0.1}Cu_{0.1}$,
$Gd_{0.1}Nd_{0.9}Si_{0.8}Cr_{0.1}Cu_{0.1}$,
$Gd_{0.3}Nd_{0.7}Si_{0.8}Cr_{0.1}Cu_{0.1}$,
$Gd_{0.5}Nd_{0.5}Si_{0.8}Cr_{0.1}Cu_{0.1}$,
$Gd_{0.7}Nd_{0.3}Si_{0.8}Cr_{0.1}Cu_{0.1}$,
$Gd_{0.9}Nd_{0.1}Si_{0.8}Cr_{0.1}Cu_{0.1}$,
$Ce_{0.2}Gd_{0.5}Si_{0.8}Cr_{0.1}Cu_{0.1}$,
$Ce_{0.4}Gd_{0.6}Si_{0.8}Cr_{0.1}Cu_{0.1}$,
$Ce_{0.6}Gd_{0.4}Si_{0.8}Cr_{0.1}Cu_{0.1}$,
$Ce_{0.8}Gd_{0.2}Si_{0.8}Ce_{0.1}Cu_{0.1}$,
$Ce_{1.0}Si_{0.8}Cr_{0.1}Zn_{0.1}$,
$Gd_{1.0}Si_{0.8}Cr_{0.1}Zn_{0.1}$,
$Ce_{0.2}Nd_{0.8}Si_{0.8}Cr_{0.1}Zn_{0.1}$,
$Ce_{0.4}Nd_{0.6}Si_{0.8}Cr_{0.1}Zn_{0.1}$,
$Ce_{0.6}Nd_{0.4}Si_{0.8}Cr_{0.1}Zn_{0.1}$,
$Ce_{0.8}Nd_{0.2}Si_{0.8}Ce_{0.1}Zn_{0.1}$,
$Gd_{0.1}Nd_{0.9}Si_{0.8}Cr_{0.1}Zn_{0.1}$,
$Gd_{0.3}Nd_{0.7}Si_{0.8}Cr_{0.1}Zn_{0.1}$,
$Gd_{0.5}Nd_{0.5}Si_{0.8}Cr_{0.1}Zn_{0.1}$,
$Gd_{0.7}Nd_{0.3}Si_{0.8}Cr_{0.1}Zn_{0.1}$,
$Gd_{0.9}Nd_{0.1}Si_{0.8}Cr_{0.1}Zn_{0.1}$,
$Ce_{0.2}Gd_{0.5}Si_{0.8}Cr_{0.1}Zn_{0.1}$,
$Ce_{0.4}Gd_{0.6}Si_{0.8}Cr_{0.1}Zn_{0.1}$,
$Ce_{0.6}Gd_{0.4}Si_{0.8}Cr_{0.1}Zn_{0.1}$,
$Ce_{0.8}Gd_{0.2}Si_{0.8}Ce_{0.1}Zn_{0.1}$.

In some embodiments, a magnetocaloric material may comprise $Ce\,Si_y Al_{1-y}$ wherein y is greater than 0 and less than 1. In some embodiments the material is $Ce_{1.0}Si_{0.9}Al_{0.1}$, $Ce_{1.0}Si_{0.8}Al_{0.8}$, $Ce_{1.0}Si_{0.7}Al_{0.3}$, $Ce_{1.0}Si_{0.6}Al_{0.4}$, $Ce_{1.0}Si_{0.5}Al_{0.5}$, $Ce_{1.0}Si_{0.4}Al_{0.6}$, $Ce_{1.0}Si_{0.3}Al_{0.7}$, $Ce_{1.0}Si_{0.2}Al_{0.8}$, $Ce_{1.0}Si_{0.1}Al_{0.9}$, or any combination thereof.

Another embodiment is a magnetic refrigerator comprising the magnetocaloric material. In some embodiments, a magnetic refrigerator comprises a magnetocaloric material, wherein the magnetocaloric material comprises $(A_xB_{1-x}) Si_{1-y-z} (D_y E_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$. In some embodiments, a magnetic refrigerator comprises a magnetocaloric material, wherein the magnetocaloric material comprises $Ce\,Si_y Al_{1-y}$ wherein y is greater than 0 and less than 1.

Another embodiment is a method of manufacturing a heat pump, comprising fabricating at least one part of the heat pump from a magnetocaloric material. In some embodiments, a method of manufacturing a heat pump comprises fabricating at least one part of the heat pump from a magnetocaloric material, wherein the magnetocaloric material comprises $(A_xB_{1-x}) Si_{1-y-z} (D_y E_z)$ wherein A and B are selected from the group consisting of Ce, Nd, or Gd, wherein D is selected from the group consisting of Cr or Mn, and E is selected from the group consisting of Cr, Mn, Fe, Al, Ni, Co, Cu, or Zn, wherein x is in the range of about 0 to about 1.0, wherein y is in the range of about 0.05 to about 0.3, wherein z is in the range of about 0 to about 0.3, and wherein $0.05 \leq y+z \leq 0.3$. In some embodiments, a method of manufacturing a heat pump comprises fabricating at least one part of the heat pump from a magnetocaloric material, wherein the magnetocaloric material comprises $Ce\,Si_y Al_{1-y}$ wherein y is greater than 0 and less than 1.

The response temperature (curie temperature or transition temperature) of the magnetocaloric material may be adjusted with small changes in the composition of the material. In some embodiments, the response temperature of the magnetocaloric material is adjusted by changing the composition of the material. In some embodiments, the magnetocaloric material exhibits a magnetocaloric effect at any temperature in the range of about 1° K to about 350° K. In some embodiments, the magnetocaloric material exhibits a magnetocaloric effect at any temperature in the range of about 10° K to about 50° K. In some embodiments, the magnetocaloric material exhibits a magnetocaloric effect at any temperature in the range of about 50° K to about 1000° K. In some embodiments, the magnetocaloric material exhibits a magnetocaloric effect at any temperature in the range of about 100° K to about 350° K. In some embodiments, the magnetocaloric material exhibits a magnetocaloric effect at any temperature in the range of about 50° K to about 200° K. In some embodiments, the magnetocaloric nanomaterial exhibits a magnetocaloric effect at any temperature in the range of about 10° K to about 80° K.

Magnetocaloric materials can be synthesized using various methods, such as arc melting, induction melting, or any other type of metal melting process. In some embodiments, the magnetocaloric materials are synthesized using an arc melt furnace. In some embodiments, the magnetocaloric materials are synthesized using an induction melt furnace. In some embodiments, the magnetocaloric materials are synthesized using a rotating disk atomization furnace. In some embodiments, the magnetocaloric materials are synthesized using a levitation melt furnace.

Following synthesis of the magnetocaloric alloy, an annealing process may be used to homogenize the material. In some cases the anneal improves and/or shifts the magnetocaloric properties (ΔS or the curie temperature). Anneals can be performed in a variety of furnace types, including radiation furnaces, induction furnace, tube furnace, etc. The optimal anneal temperature and time may vary depending on the magnetocaloric material composition. In some embodiments, the anneal temperature is between about 700° C. and about 2000° C. In some embodiments, the anneal time is between about 30 min and about 6 weeks.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed example embodiments which follow.

EXAMPLES

The embodiments will be explained with respect to preferred embodiments which are not intended to limit the present invention. Further, in the present disclosure where conditions and/or structures are not specified, the skilled artisan in the art can readily provide such conditions and/or structures, in light of the teachings herein, as a matter of routine experimentation.

The object of this disclosure is to provide magnetocaloric materials useful for magnetic refrigeration applications.

Example 1

Figure 2:
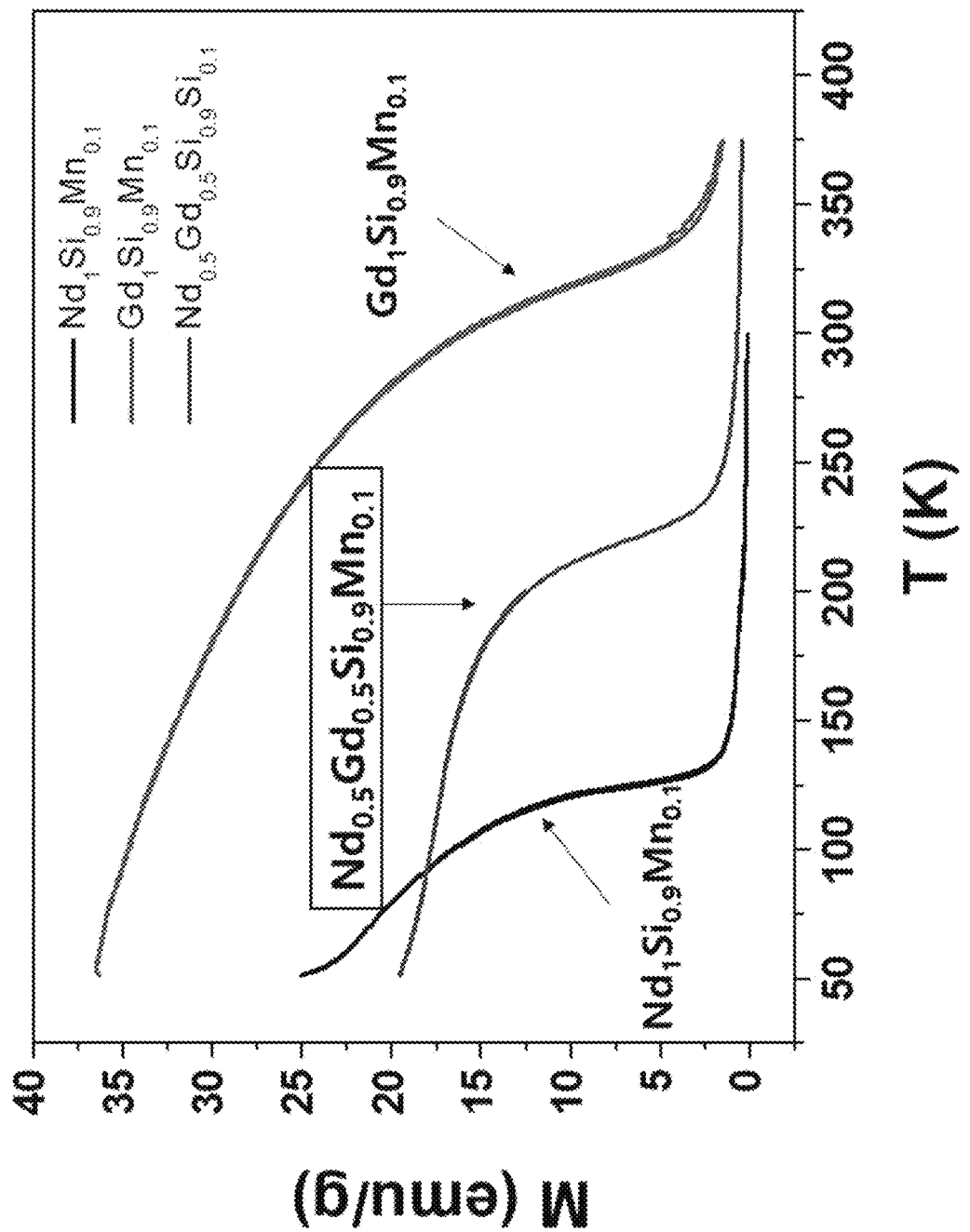
FIG. 2 illustrates the magnetization versus temperature for several of the disclosed alloys.

A $Nd_{1.0}Si_{0.9}Mn_{0.1}$ ingot was prepared by arc melting in an argon atmosphere. The ingot was measured as-cast. FIG. 1 shows a plot of $\Delta S$ vs temperature and FIG. 2 shows a plot of magnetization versus temperature for the $Nd_{1.0}Si_{0.9}Mn_{0.1}$ alloy with $2^{nd}$ order phase transition occurring near 125° K.

Example 2

A $Nd_{0.5}Gd_{0.5}Si_{0.9}Mn_{0.1}$ ingot was prepared by arc melting in an argon atmosphere. The ingot was measured as-cast. FIG. 2 shows a plot of magnetization versus temperature for the $Nd_{0.5}Gd_{0.5}Si_{0.9}Mn_{0.1}$ alloy with $2^{nd}$ order phase transition occurring near 225° K.

Example 3

A $Gd_{1.0}Si_{0.9}Mn_{0.1}$ ingot was prepared by arc melting in an argon atmosphere. The ingot was measured as-cast. FIG. 2 shows a plot of magnetization versus temperature for the $Gd_{1.0}Si_{0.9}Mn_{0.1}$ alloy with $2^{nd}$ order phase transition occurring near 125° K.

Example 4

Figure 3:
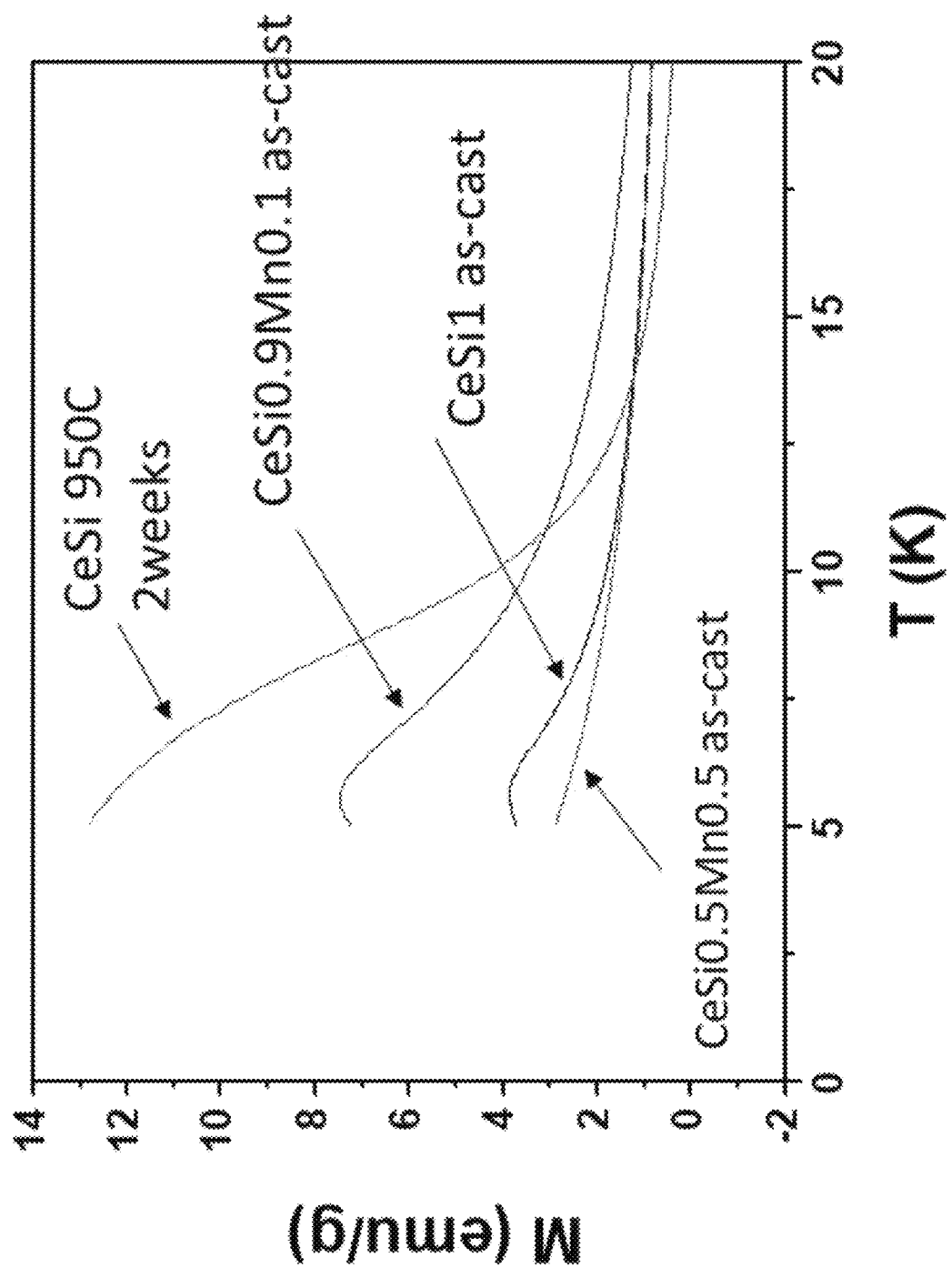
FIG. 3 illustrates the magnetization versus temperature for a $Ce_{1.0}Si_{0.9}Mn_{0.2}$ alloy.

A $Ce_{1.0}Si_{0.9}Mn_{0.1}$ ingot was prepared by arc melting in an argon atmosphere. The ingot was measured as-cast. FIG. 3 shows a plot of magnetization versus temperature for the $Ce_{1.0}Si_{0.9}Mn_{0.1}$ alloy with $2^{nd}$ order phase transition occurring near 7° K.

Example 5

Figure 4:
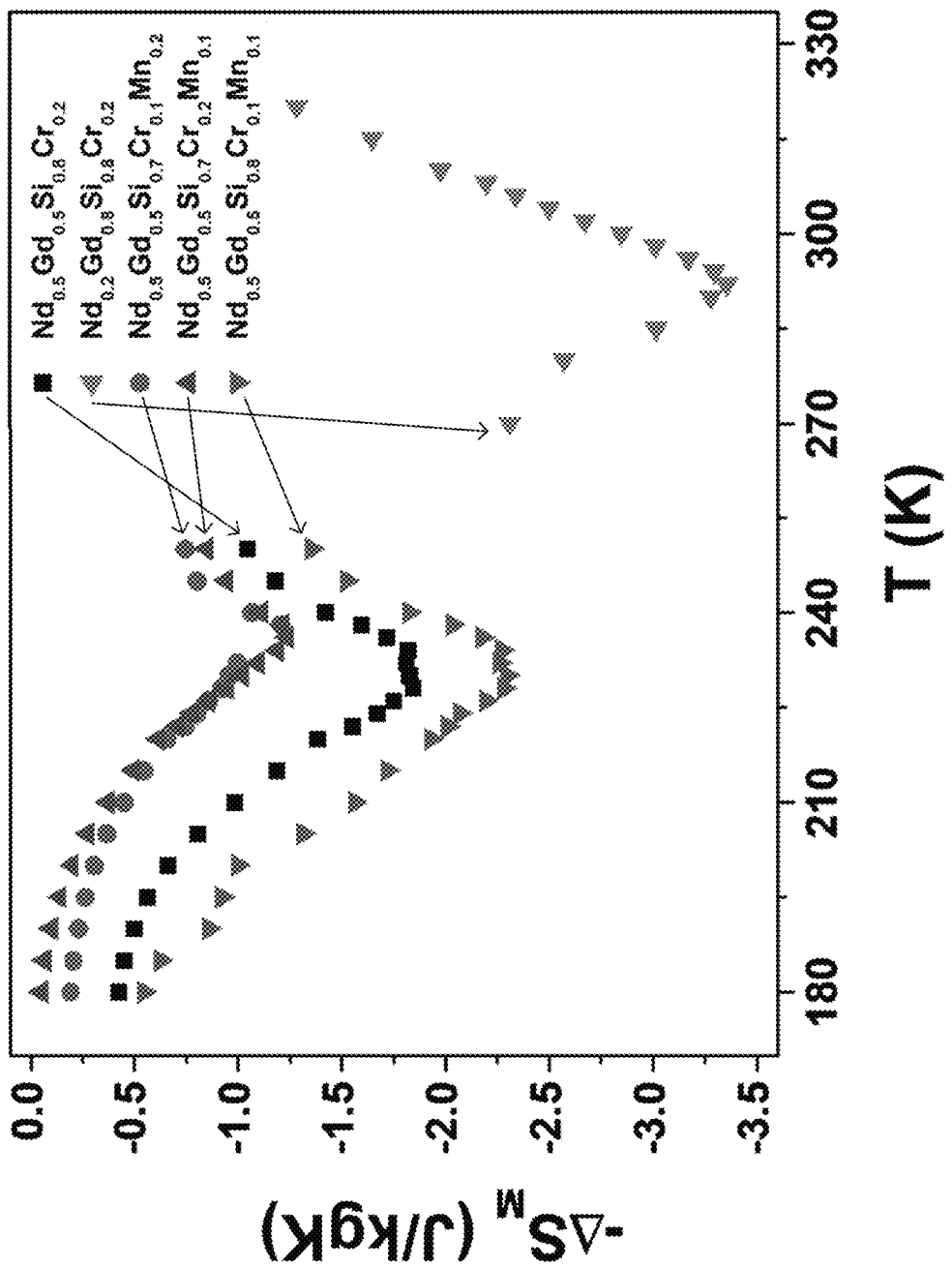
FIG. 4 illustrates the change in entropy versus temperature for several of the disclosed alloys.

A $Nd_{0.5}Gd_{0.5}Si_{0.9}Cr_{0.2}$ ingot was prepared by arc melting in an argon atmosphere. The ingot was measured as-cast. FIG. 4 shows a plot of $\Delta S$ versus temperature for the $Nd_{0.5}Gd_{0.5}Si_{0.8}Cr_{0.2}$ alloy with 2nd order phase transition occurring near 235° K.

Example 6

A $Nd_{0.5}Gd_{0.5}Si_{0.7}Mn_{0.1}Cr_{0.2}$ ingot was prepared by arc melting in an argon atmosphere. The ingot was measured as-cast. FIG. 4 shows a plot of $\Delta S$ versus temperature for the $Nd_{0.5}Gd_{0.5}Si_{0.7}Mn_{0.1}Cr_{0.2}$ alloy with $2^{nd}$ order phase transition occurring near 235° K.

Example 7

A $Nd_{0.5}Gd_{0.5}Si_{0.7}Mn_{0.2}Cr_{0.1}$ ingot was prepared by arc melting in an argon atmosphere. The ingot was measured as-cast. FIG. 4 shows a plot of $\Delta S$ versus temperature for the $Nd_{0.5}Gd_{0.5}Si_{0.7}Mn_{0.2}Cr_{0.1}$ alloy with $2^{nd}$ order phase transition occurring near 235° K.

Example 8

A $Nd_{0.5}Gd_{0.5}Si_{0.8}Mn_{0.1}Cr_{0.1}$ ingot was prepared by arc melting in an argon atmosphere. The ingot was measured as-cast. FIG. 4 shows a plot of $\Delta S$ versus temperature for the $Nd_{0.5}Gd_{0.5}Si_{0.8}Mn_{0.1}Cr_{0.1}$ alloy with $2^{nd}$ order phase transition occurring near 235° K. This data shows the optimal doping concentration of y+z=2, where both y and z are greater than 0.

Example 9

A $Nd_{0.2}Gd_{0.8}Si_{0.8}Cr_{0.2}$ ingot was prepared by arc melting in an argon atmosphere. The ingot was measured as-cast. FIG. 4 shows a plot of $\Delta S$ versus temperature for the $Nd_{0.2}Gd_{0.8}Si_{0.8}8Cr_{0.2}$ alloy with $2^{nd}$ order phase transition occurring near 293° K.

Example 10

Figure 5:
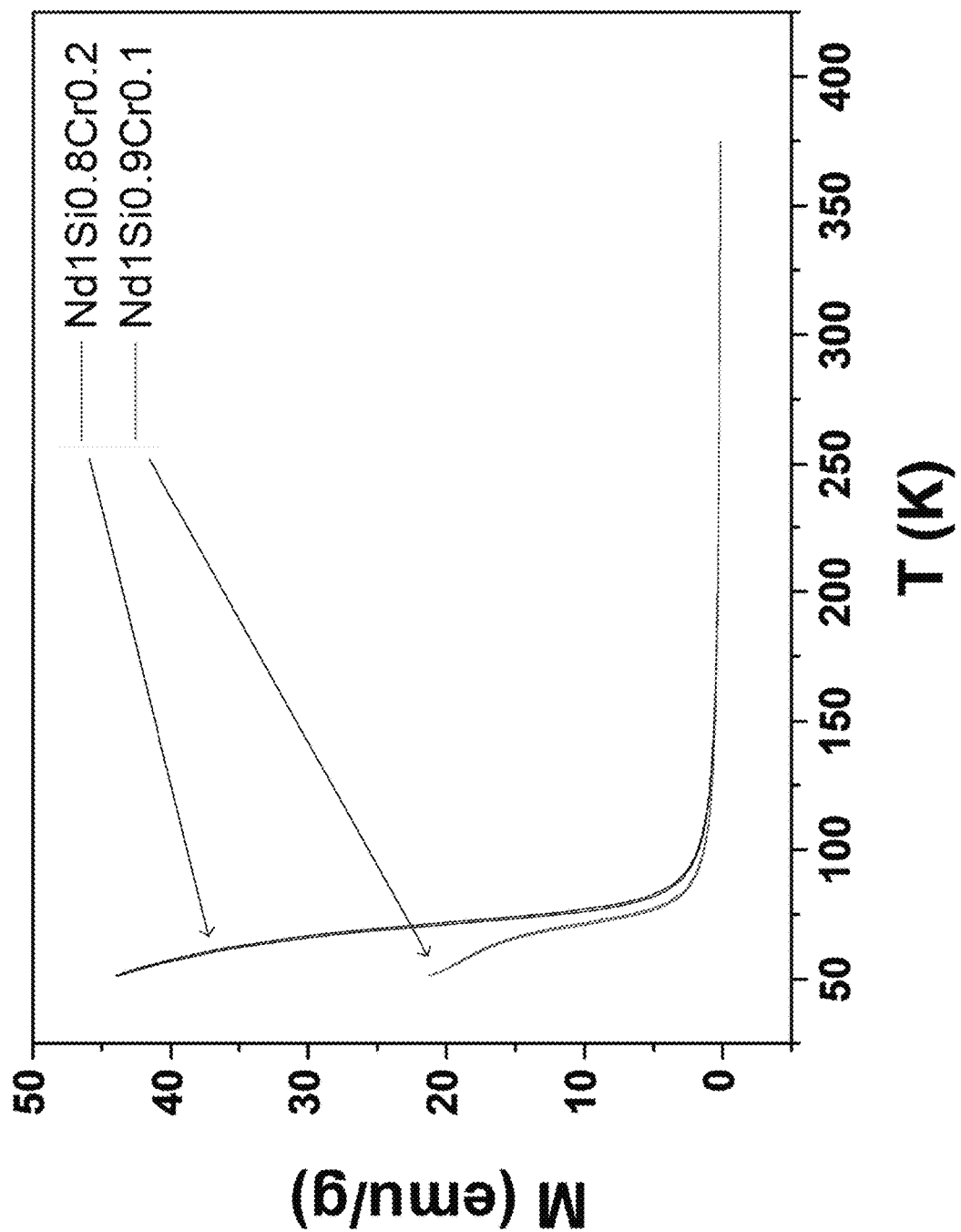
FIG. 5 illustrates the magnetization versus temperature for several of the disclosed alloys.

A $Nd_{1.0}Si_{0.9}Cr_{0.1}$ ingot was prepared by arc melting in an argon atmosphere. The ingot was measured as-cast. FIG. 5 shows a plot of magnetization versus temperature for the $Nd_{1.0}Si_{0.9}Cr_{0.1}$ alloy with $2^{nd}$ order phase transition occurring near 75° K.

Example 11

Figure 6:
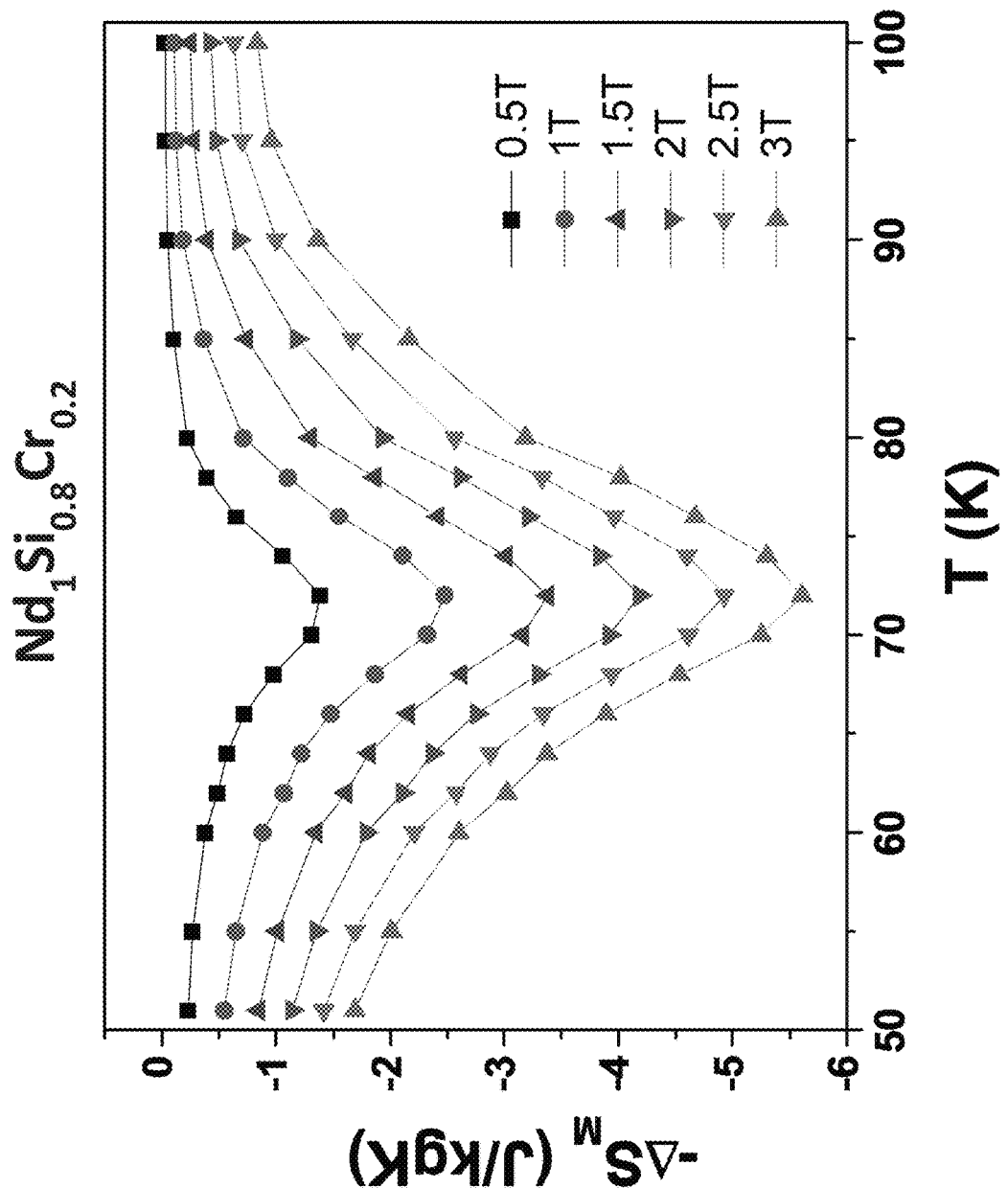
FIG. 6 illustrates the change in entropy versus temperature for a $Nd_{1.0}Si_{0.8}Cr_{0.2}$ alloy.

A $Nd_{1.0}Si_{0.8}Cr_{0.2}$ ingot was prepared by arc melting in an argon atmosphere. The ingot was measured as-cast. FIG. 6 shows a plot of $\Delta S$ vs temperature and FIG. 5 shows the magnetization versus temperature for the $Nd_{1.0}Si_{0.8}Cr_{0.2}$ alloy with $2^{nd}$ order phase transition occurring near 75° K.

Example 12

Figure 7:
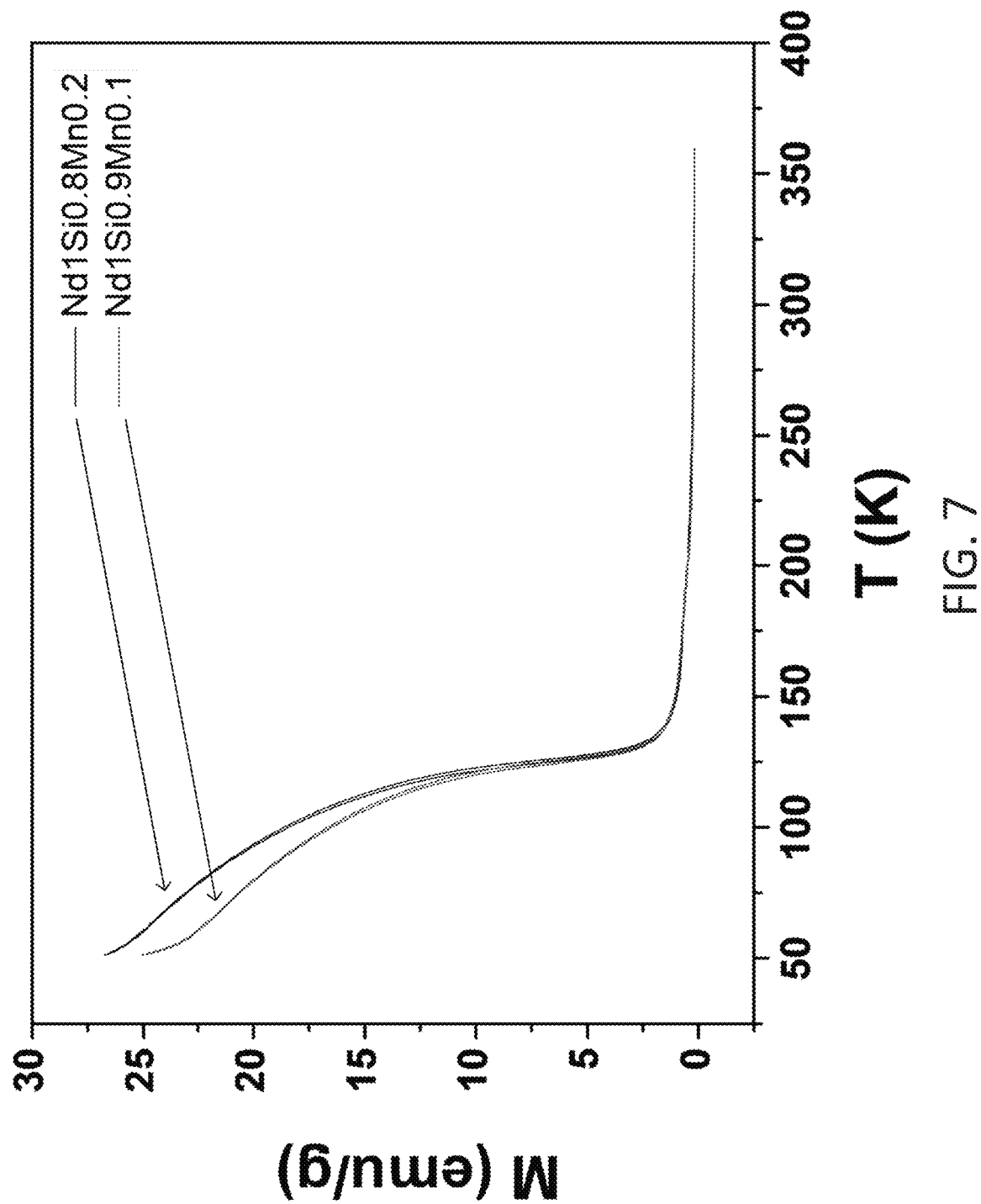
FIG. 7 illustrates the magnetization versus temperature for several of the disclosed alloys.

A $Nd_{1.0}Si_{0.9}Mn_{0.1}$ ingot was prepared by arc melting in an argon atmosphere. The ingot was measured as-cast. FIG. 7 shows a plot of magnetization versus temperature for the $Nd_{1.0}Si_{0.9}Mn_{0.1}$ alloy with $2^{nd}$ order phase transition occurring near 75° K.

Example 13

Figure 8:
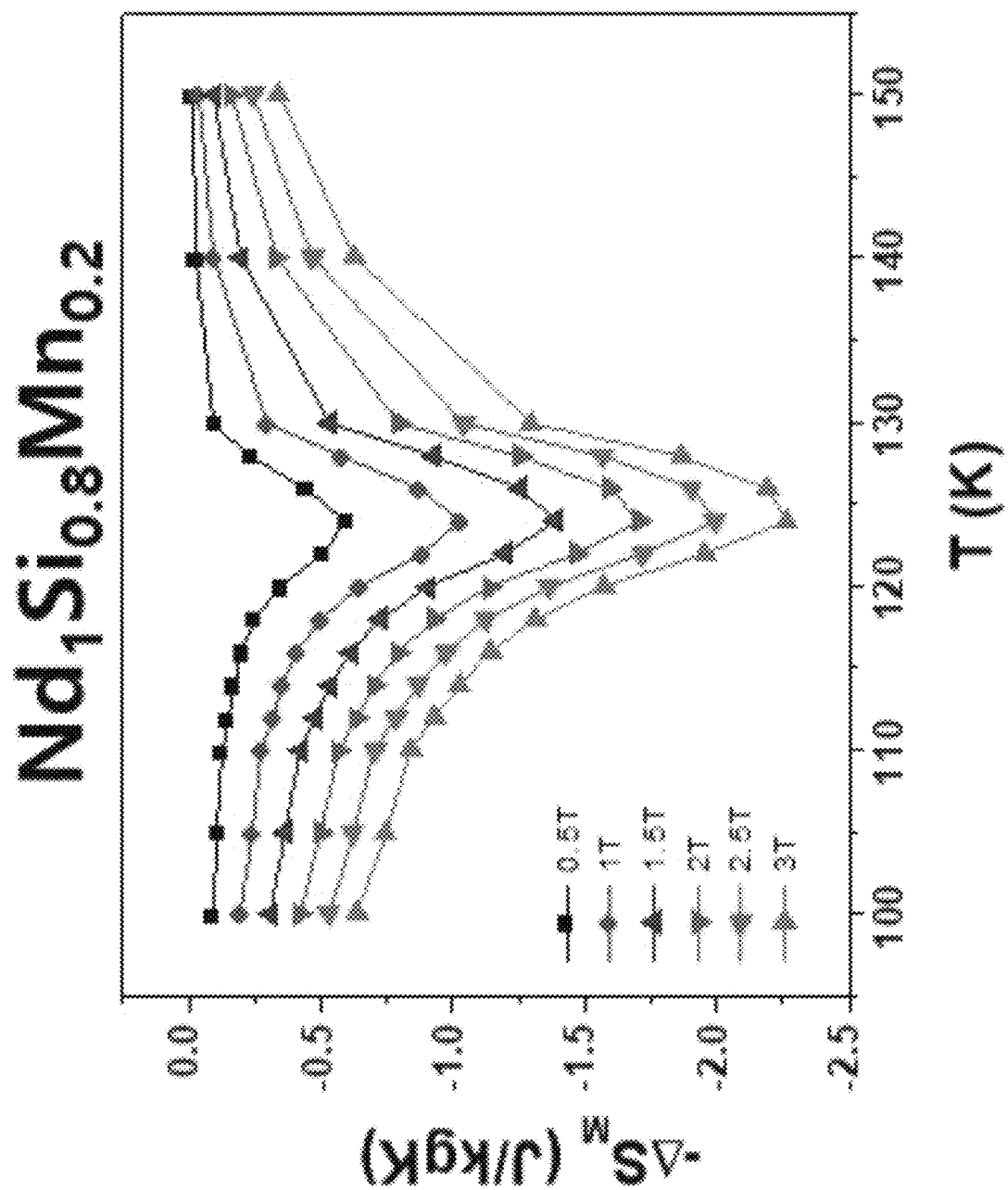
FIG. 8 illustrates the change in entropy versus temperature for a $Nd_{1.0}Si_{0.8}Mn_{0.2}$ alloy.

A $Nd_{1.0}Si_{0.8}Mn_{0.2}$ ingot was prepared by arc melting in an argon atmosphere. The ingot was measured as-cast. FIG. 8 shows a plot of $\Delta S$ vs temperature and FIG. 7 shows the magnetization versus temperature for the $Nd_{1.0}Si_{0.8}Mn_{0.2}$ alloy with $2^{nd}$ order phase transition occurring near 75° K.

Example 14

A $Gd_{1.0}Si_{0.95}Mn_{0.05}$ ingot was prepared by arc melting in an argon atmosphere. The ingot was measured as-cast. FIG.

9 shows a plot of magnetization versus temperature for the $Gd_{1.0}Si_{0.95}Mn_{0.05}$ alloy with $2^{nd}$ order phase transition occurring near 325° K.

Example 15

Figure 9:
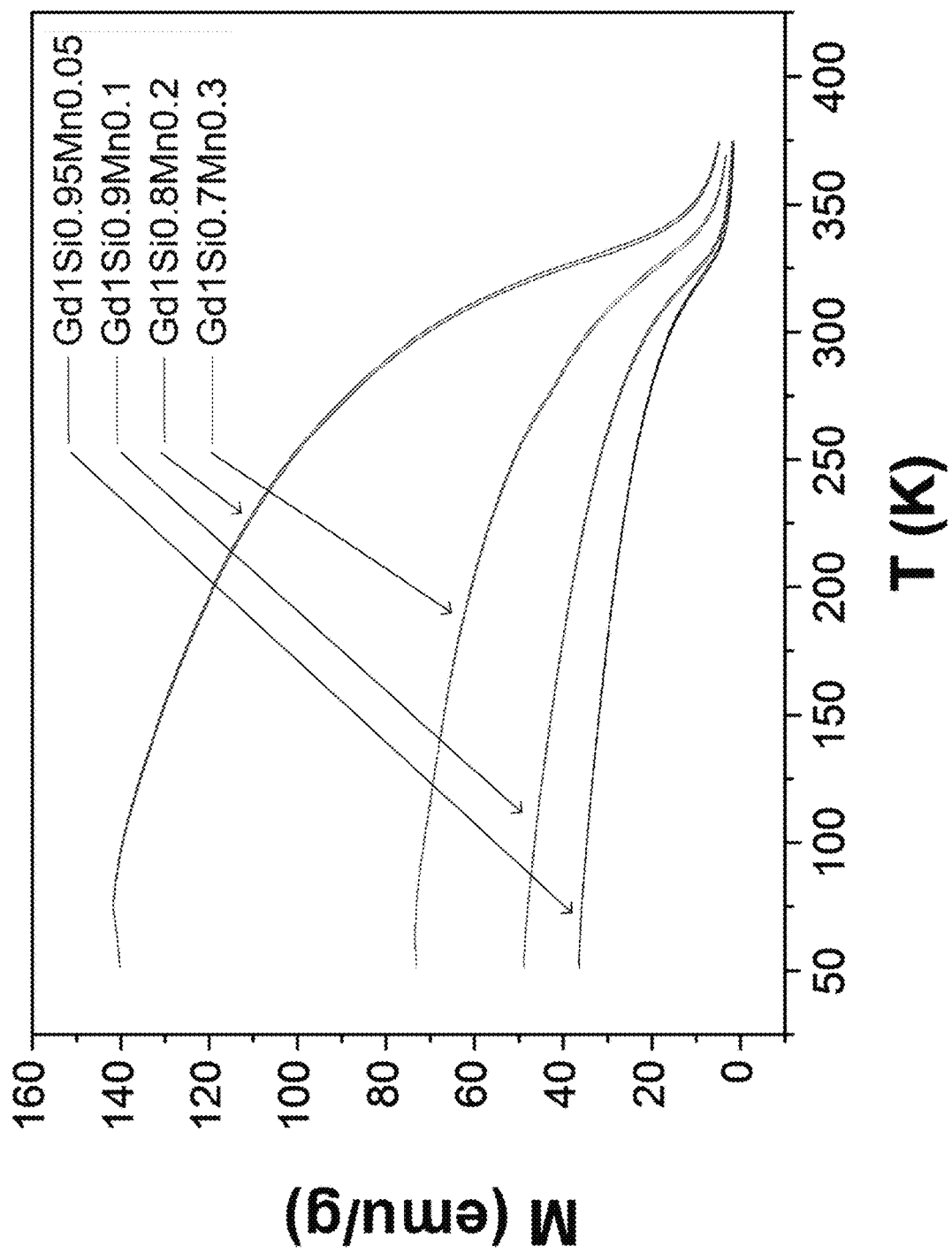
FIG. 9 illustrates the magnetization versus temperature for several of the disclosed alloys.

A $Gd_{1.0}Si_{0.9}Mn_{0.1}$ ingot was prepared by arc melting in an argon atmosphere. The ingot was measured as-cast. FIG. 9 shows a plot of magnetization versus temperature for the $Gd_{1.0}Si_{0.9}Mn_{0.1}$ alloy with $2^{nd}$ order phase transition occurring near 325° K.

Example 16

Figure 10:
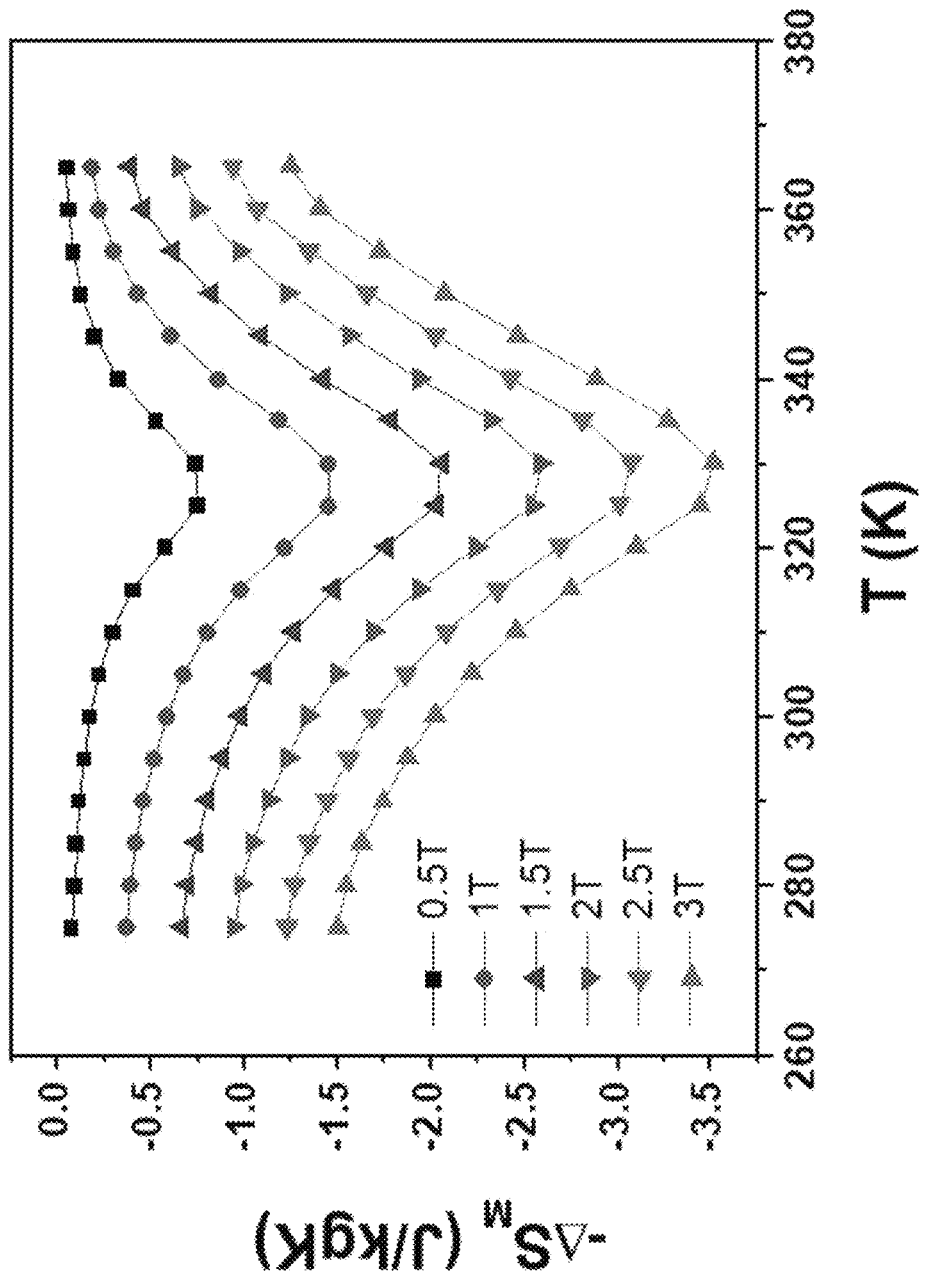
FIG. 10 illustrates the change in entropy versus temperature for a $Gd_{1.0}Si_{0.8}Mn_{0.2}$ alloy.

A $Gd_{1.0}Si_{0.8}Mn_{0.2}$ ingot was prepared by arc melting in an argon atmosphere. The ingot was measured as-cast. FIG. 10 shows a plot of $\Delta S$ vs temperature and FIG. 9 shows the magnetization versus temperature for the $Gd_{1.0}Si_{0.8}Mn_{0.2}$ alloy with $2^{nd}$ order phase transition occurring near 325° K.

Example 17

A $Gd_{1.0}Si_{0.7}Mn_{0.3}$ ingot was prepared by arc melting in an argon atmosphere. The ingot was measured as-cast. FIG. 9 shows a plot of magnetization versus temperature for the $Gd_{1.0}Si_{0.7}Mn_{0.3}$ alloy with $2^{nd}$ order phase transition occurring near 325° K.

Example 18

Figure 11:
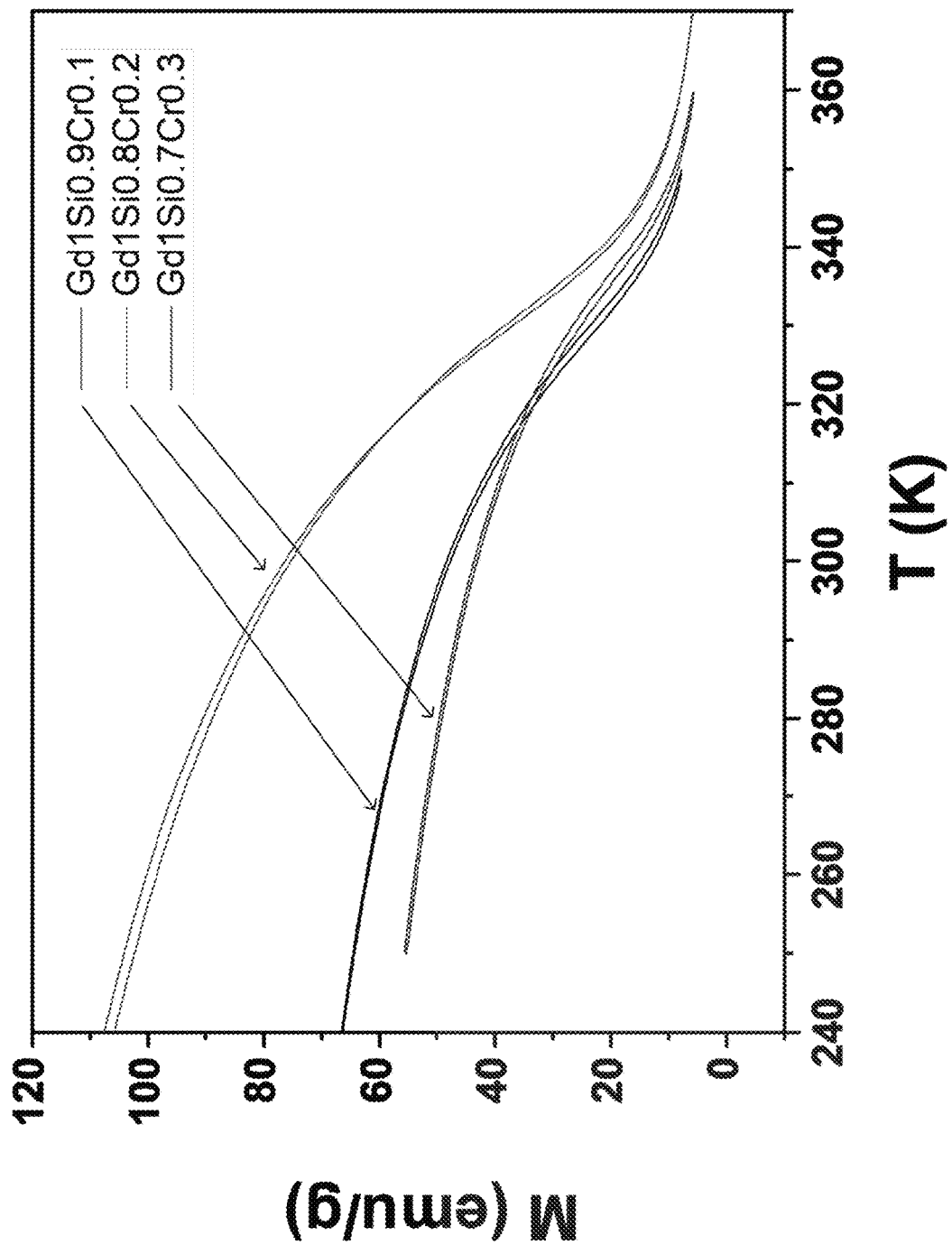
FIG. 11 illustrates the magnetization versus temperature for several of the disclosed alloys.

A $Gd_{1.0}Si_{0.9}Cr_{0.1}$ ingot was prepared by arc melting in an argon atmosphere. The ingot was measured as-cast. FIG. 11 shows a plot of magnetization versus temperature for the $Gd_{1.0}Si_{0.9}Cr_{0.1}$ alloy with $2^{nd}$ order phase transition occurring near 325° K.

Example 19

Figure 12:
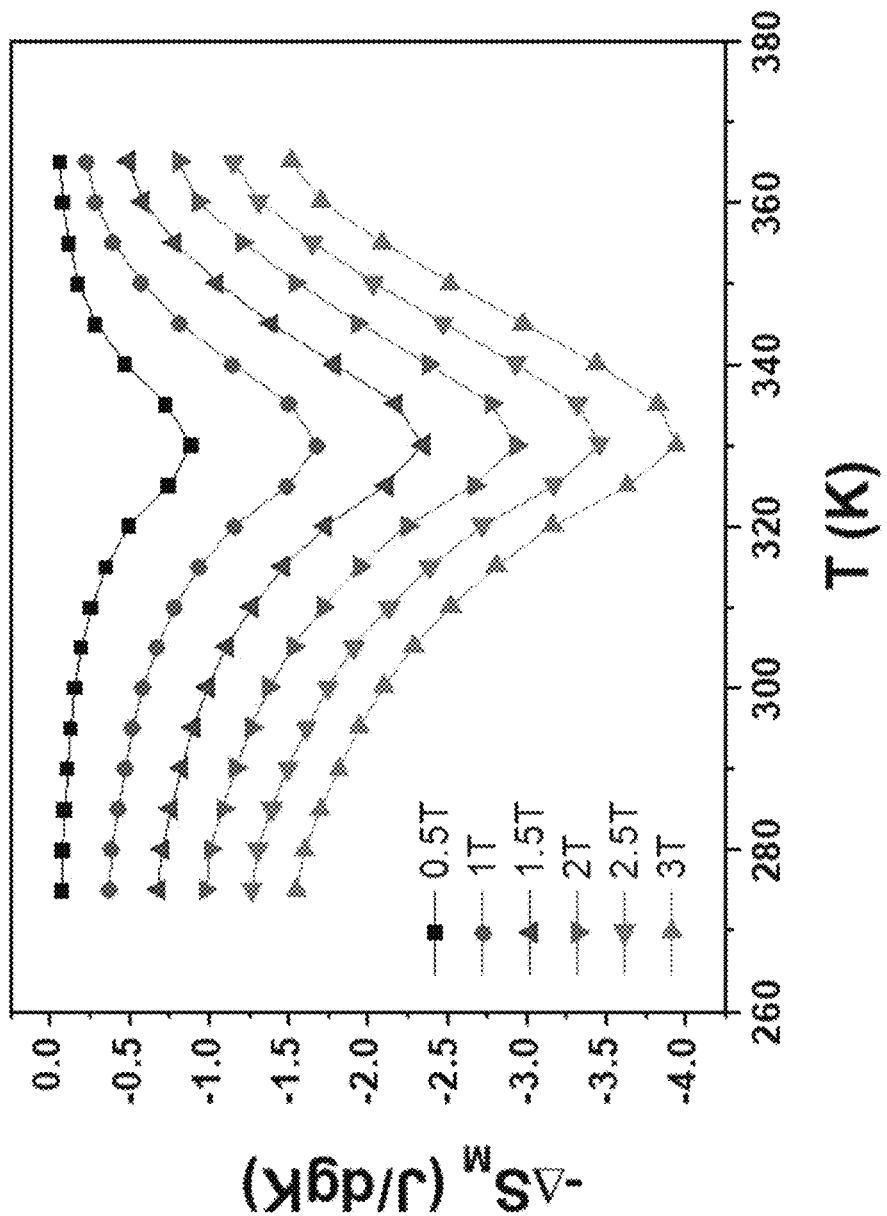
FIG. 12 illustrates the change in entropy versus temperature for a $Gd_{1.0}Si_{0.8}Cr_{0.2}$ alloy.

A $Gd_{1.0}Si_{0.8}Cr_{0.2}$ ingot was prepared by arc melting in an argon atmosphere. The ingot was measured as-cast. FIG. 12 shows a plot of $\Delta S$ vs temperature and FIG. 11 shows a plot of magnetization versus temperature for the $Gd_{1.0}Si_{0.8}Cr_{0.2}$ alloy with $2^{nd}$ order phase transition occurring near 325° K.

Example 20

A $Gd_{1.0}Si_{0.7}Cr_{0.3}$ ingot was prepared by arc melting in an argon atmosphere. The ingot was measured as-cast. FIG. 11 shows a plot of magnetization versus temperature for the $Gd_{1.0}Si_{0.7}Cr_{0.3}$ alloy with $2^{nd}$ order phase transition occurring near 325° K.

Example 21

Figure 13:
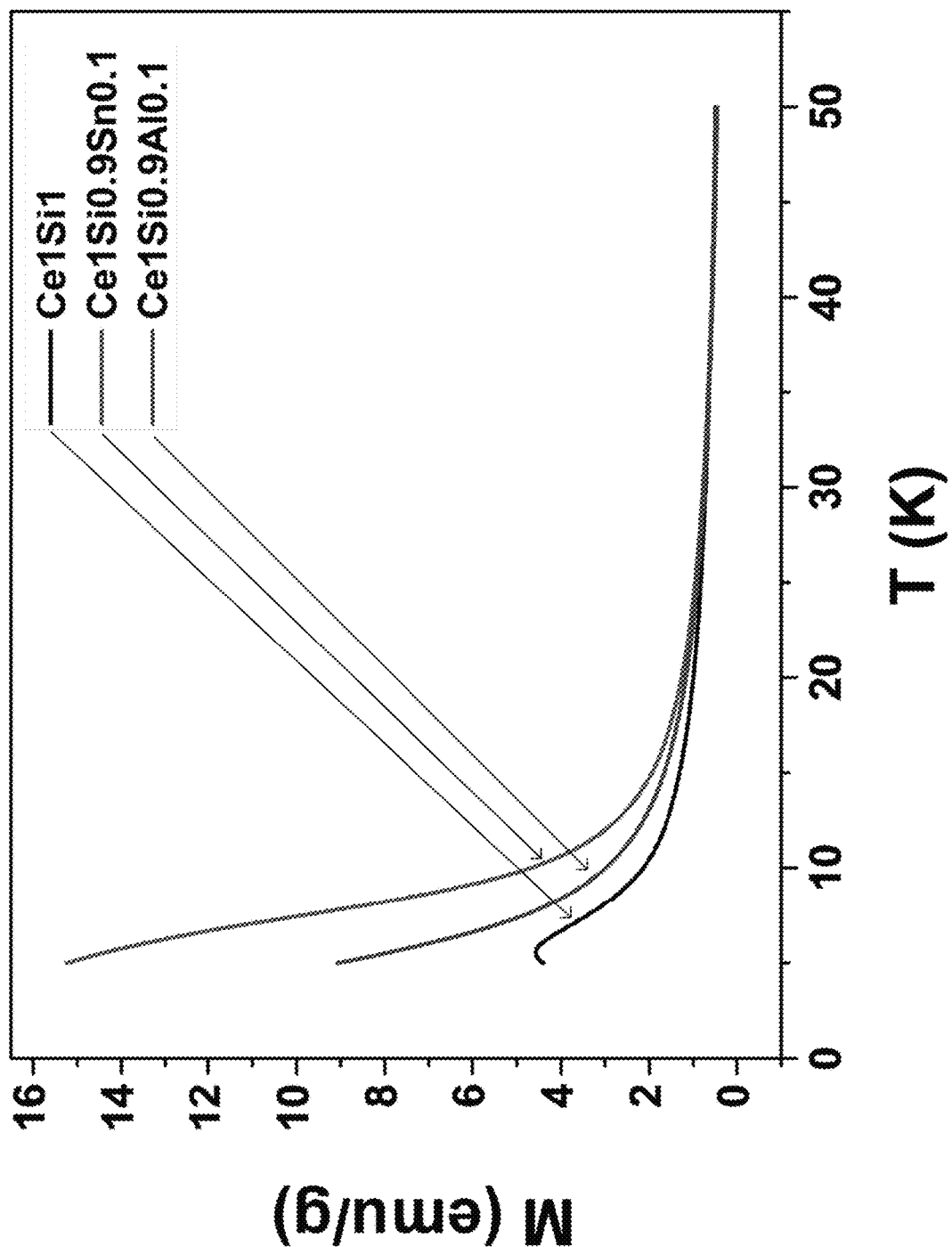
FIG. 13 illustrates the magnetization versus temperature for a $Ce_{1.0}Si_{0.9}Al_{0.1}$ alloy.

A $Ce_{1.0}Si_{0.9}Al_{0.1}$ ingot was prepared by are melting in an argon atmosphere. The ingot was measured as-cast. FIG. 13 shows a plot of magnetization versus temperature for the $Ce_{1.0}Si_{0.9}Al_{0.1}$ alloy with $2^{nd}$ order phase transition occurring near 7° K.

Example 22

Figure 14:
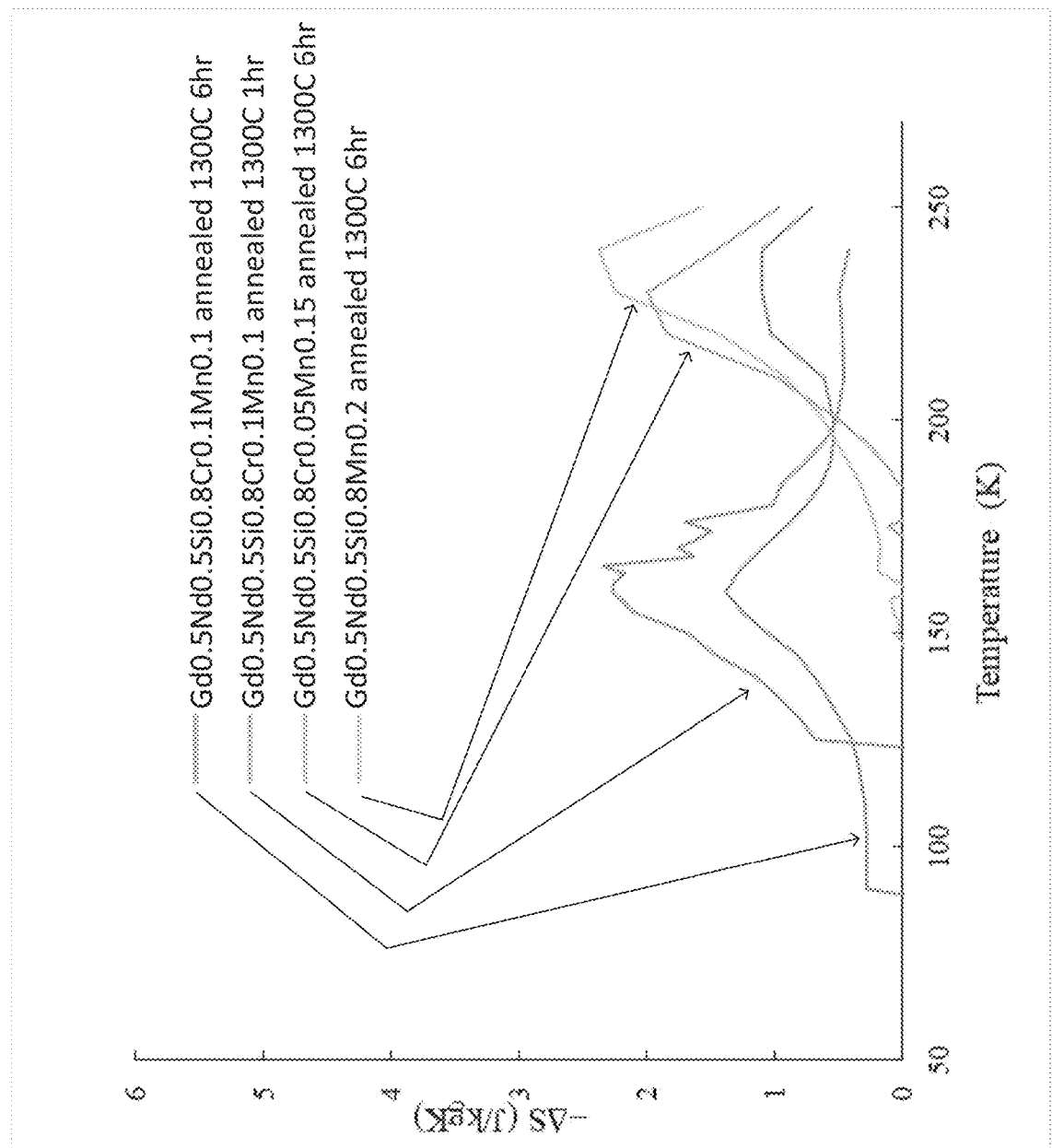
FIG. 14 illustrates the change in entropy versus temperature for several magnetocaloric alloys with different anneal processing.

A $Gd_{0.5}Nd_{0.5}Si_{0.8}Mn_{0.1}Cr_{0.1}$ ingot was prepared by arc melting in an argon atmosphere. The ingot was annealed in an induction furnace at 1300° C. under flowing argon for 1 hr. FIG. 14 shows a plot of $\Delta S$ under a 3T field versus temperature for the $Gd_{0.5}Nd_{0.5}Si_{0.8}Mn_{0.1}Cr_{0.1}$ alloy with phase transition occurring near 160° K.

Example 23

A $Gd_{0.5}Nd_{0.5}Si_{0.8}Mn_{0.1}Cr_{0.1}$ ingot was prepared by arc melting in an argon atmosphere. The ingot was annealed in an induction furnace at 1300° C. under flowing argon for 6 hrs. FIG. 14 shows a plot of $\Delta S$ under a 3T field versus temperature for the $Gd_{0.5}Nd_{0.5}Si_{0.8}Mn_{0.1}Cr_{0.1}$ alloy with dual phase transitions occurring near 160° K and 240° K.

Example 24

A $Gd_{0.5}Nd_{0.5}Si_{0.8}Mn_{0.1}Cr_{0.05}$ ingot was prepared by arc melting in an argon atmosphere. The ingot was annealed in an induction furnace at 1300° C. under flowing argon for 6 hrs. FIG. 14 shows a plot of $\Delta S$ under a 3T field versus temperature for the $Gd_{0.5}Nd_{0.5}Si_{0.8}Mn_{0.1}Cr_{0.05}$ alloy with phase transition occurring near 230° K.

Example 25

A $Gd_{0.5}Nd_{0.5}Si_{0.8}Mn_{0.2}$ ingot was prepared by arc melting in an argon atmosphere. The ingot was annealed in an induction furnace at 1300° C. under flowing argon for 6 hrs. FIG. 14 shows a plot of $\Delta S$ under a 3T field versus temperature for the $Gd_{0.5}Nd_{0.5}Si_{0.8}Mn_{0.2}$ alloy with phase transition occurring near 245° K.

Example 26

Figure 15:
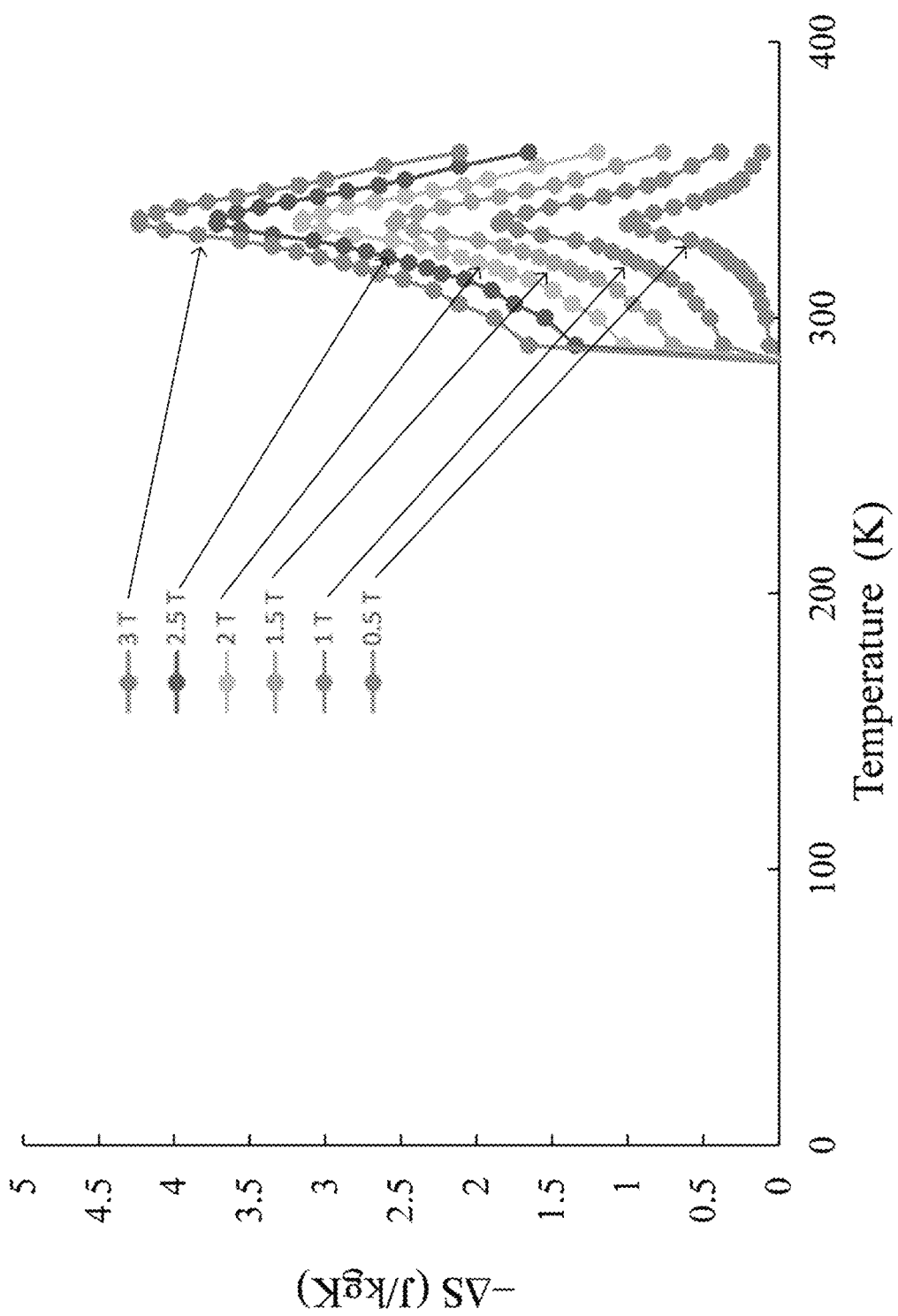
FIG. 15 illustrates the change in entropy versus temperature for a $Gd_{1.0}Si_{0.8}Cr_{0.2}$ alloy with a 2 hr 1400° C. anneal.

A $Gd_{1.0}Si_{0.8}Cr_{0.2}$ ingot was prepared by arc melting in an argon atmosphere. The ingot was annealed in an induction furnace at 1400° C. under flowing argon for 2 hrs. FIG. 15 shows a plot of $\Delta S$ versus temperature for the $Gd_{1.0}Si_{0.8}Cr_{0.2}$ alloy with phase transition occurring near 330° K.

Example 26

Figure 16:
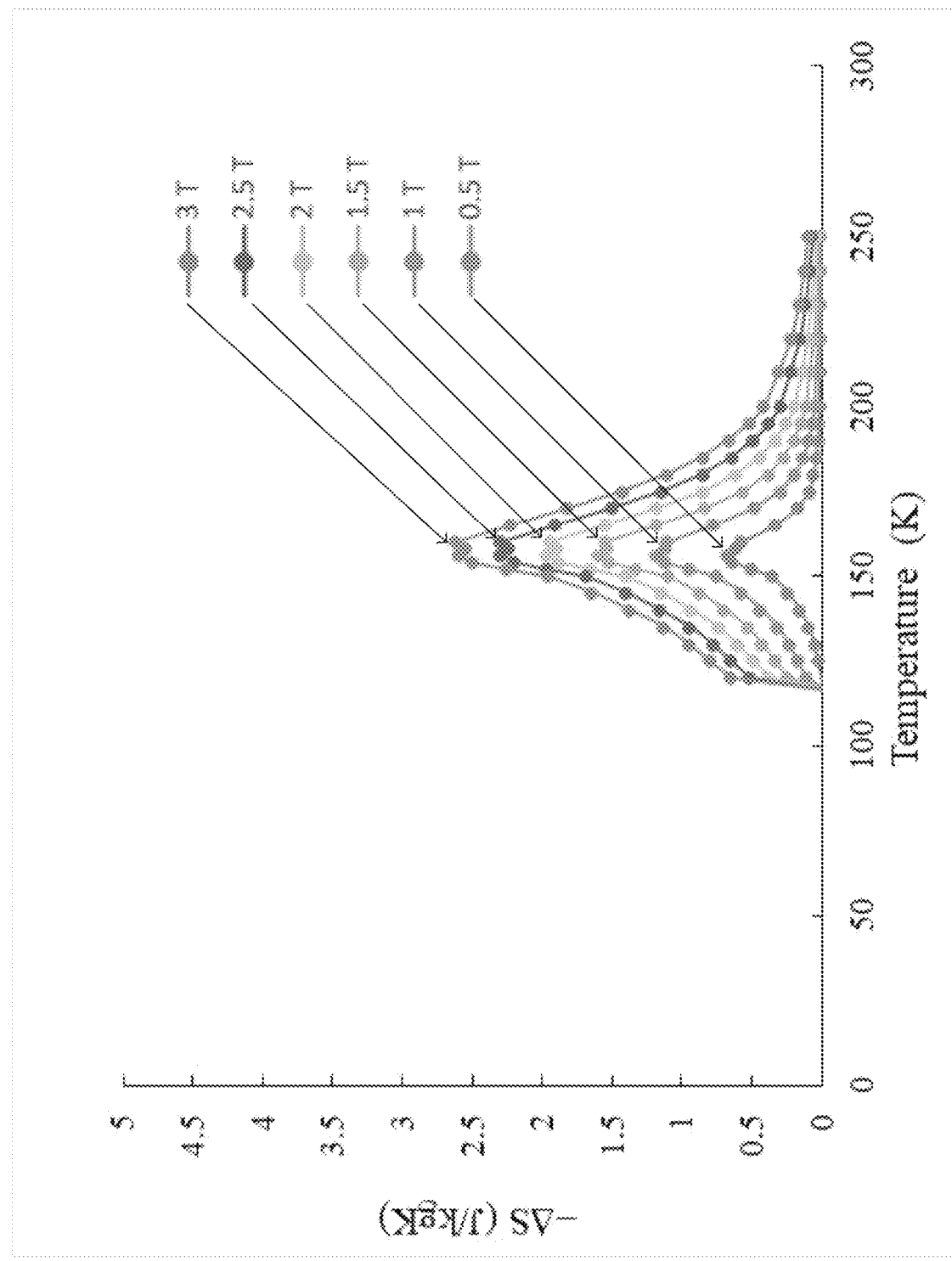
FIG. 16 illustrates the change in entropy versus temperature for a $Gd_{0.5}Nd_{0.5}Si_{0.8}Cr_{0.1}Co_{0.1}$ alloy with a 6 hr 1300° C. anneal.

A $Gd_{0.5}Nd_{0.5}Si_{0.8}Cr_{0.1}Co_{0.1}$ ingot was prepared by arc melting in an argon atmosphere. The ingot was annealed in an induction furnace at 1300° C. under flowing argon for 6 hrs. FIG. 16 shows a plot of $\Delta S$ versus temperature for the $Gd_{0.5}Nd_{0.5}Si_{0.8}Cr_{0.1}Co_{0.1}$ alloy with phase transition occurring near 160° K.

Example 27

Figure 17:
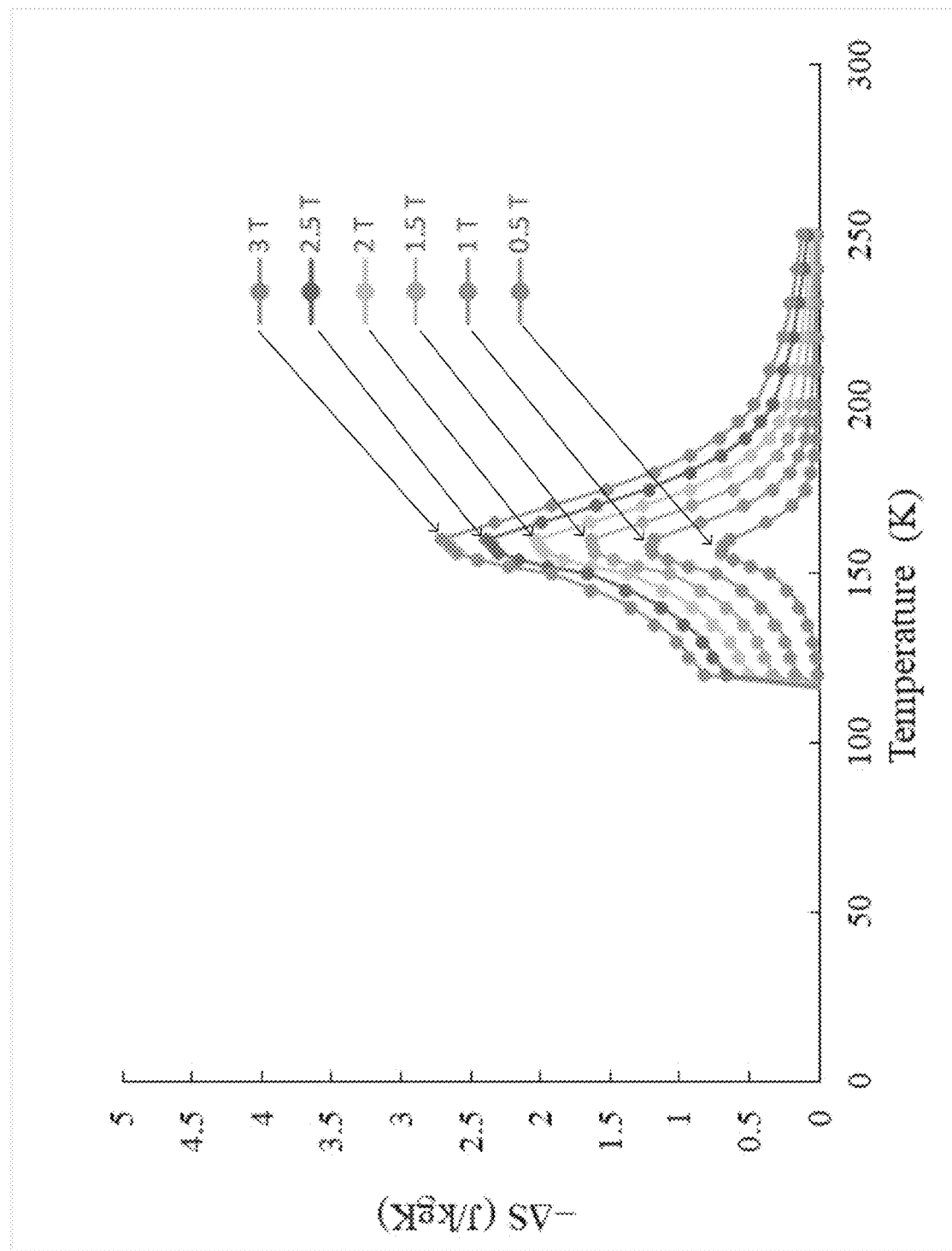
FIG. 17 illustrates the change in entropy versus temperature for a $Gd_{0.5}Nd_{0.5}Si_{0.8}Cr_{0.1}Ni_{0.1}$ alloy with a 6 hr 1300° C. anneal.

A $Gd_{0.5}Nd_{0.5}Si_{0.8}Cr_{0.1}Ni_{0.1}$ ingot was prepared by arc melting in an argon atmosphere. The ingot was annealed in an induction furnace at 1300° C. under flowing argon for 6 hrs. FIG. 17 shows a plot of $\Delta S$ versus temperature for the $Gd_{0.5}Nd_{0.5}Si_{0.8}Cr_{0.1}Ni_{0.1}$ alloy with phase transition occurring near 160° K.

Example 28

Figure 18:
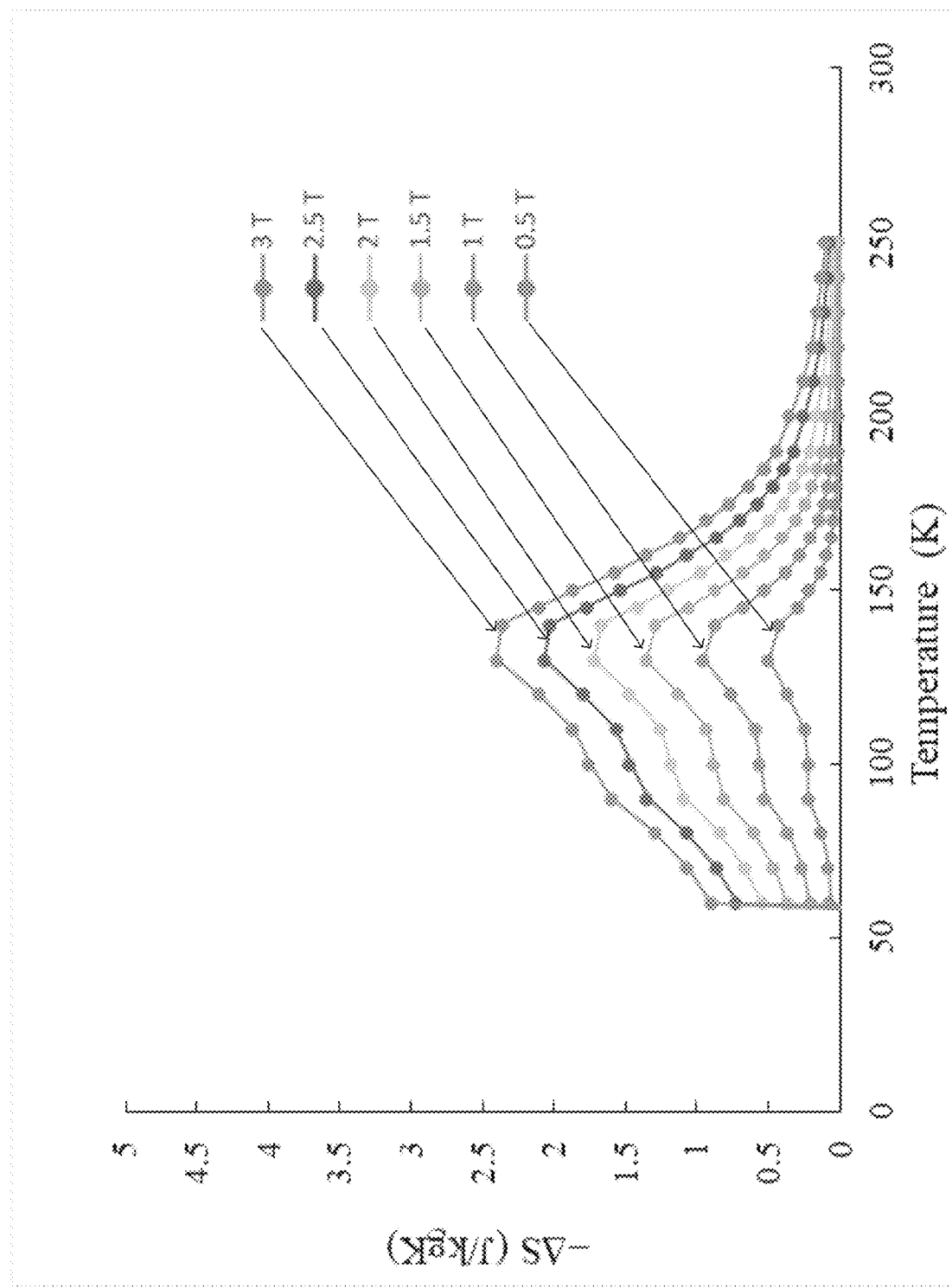
FIG. 18 illustrates the change in entropy versus temperature for a $Gd_{0.5}Ce_{0.5}Si_{0.8}Cr_{0.2}$ alloy with a 12 hr 1200° C. anneal.

A $Gd_{0.5}Ce_{0.5}Si_{0.8}Cr_{0.2}$ ingot was prepared by arc melting in an argon atmosphere. The ingot was annealed in an induction furnace at 1200° C. under flowing argon for 12 hrs. FIG. 18 shows a plot of $\Delta S$ versus temperature for the $Gd_{0.5}Ce_{0.5}Si_{0.8}Cr_{0.2}$ alloy with phase transition occurring near 125° K.

Example 29

Figure 19:
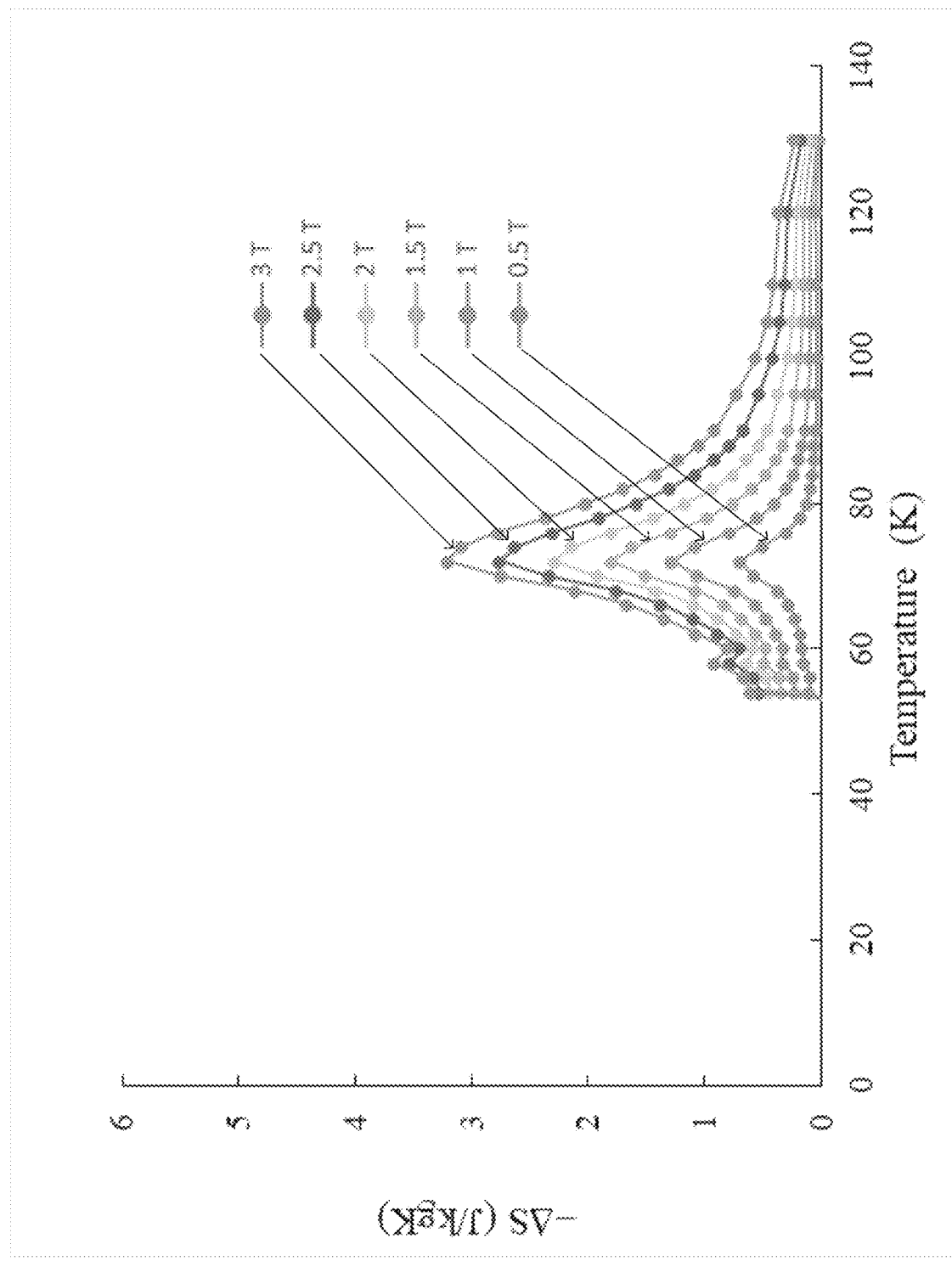
FIG. 19 illustrates the change in entropy versus temperature for a $Nd_{1.0}Si_{0.8}Cr_{0.1}Co_{0.1}$ alloy with a 12 hr 1200° C. anneal.

A $Nd_{1.0}Si_{0.8}Cr_{0.1}Co_{0.1}$ ingot was prepared by arc melting in an argon atmosphere. The ingot was annealed in an induction furnace at 1200° C. under flowing argon for 12 hrs. FIG. 19 shows a plot of ΔS versus temperature for the $Nd_{1.0}Si_{0.8}Cr_{0.1}Co_{0.1}$ alloy with phase transition occurring near 70° K.

Example 30

Figure 20:
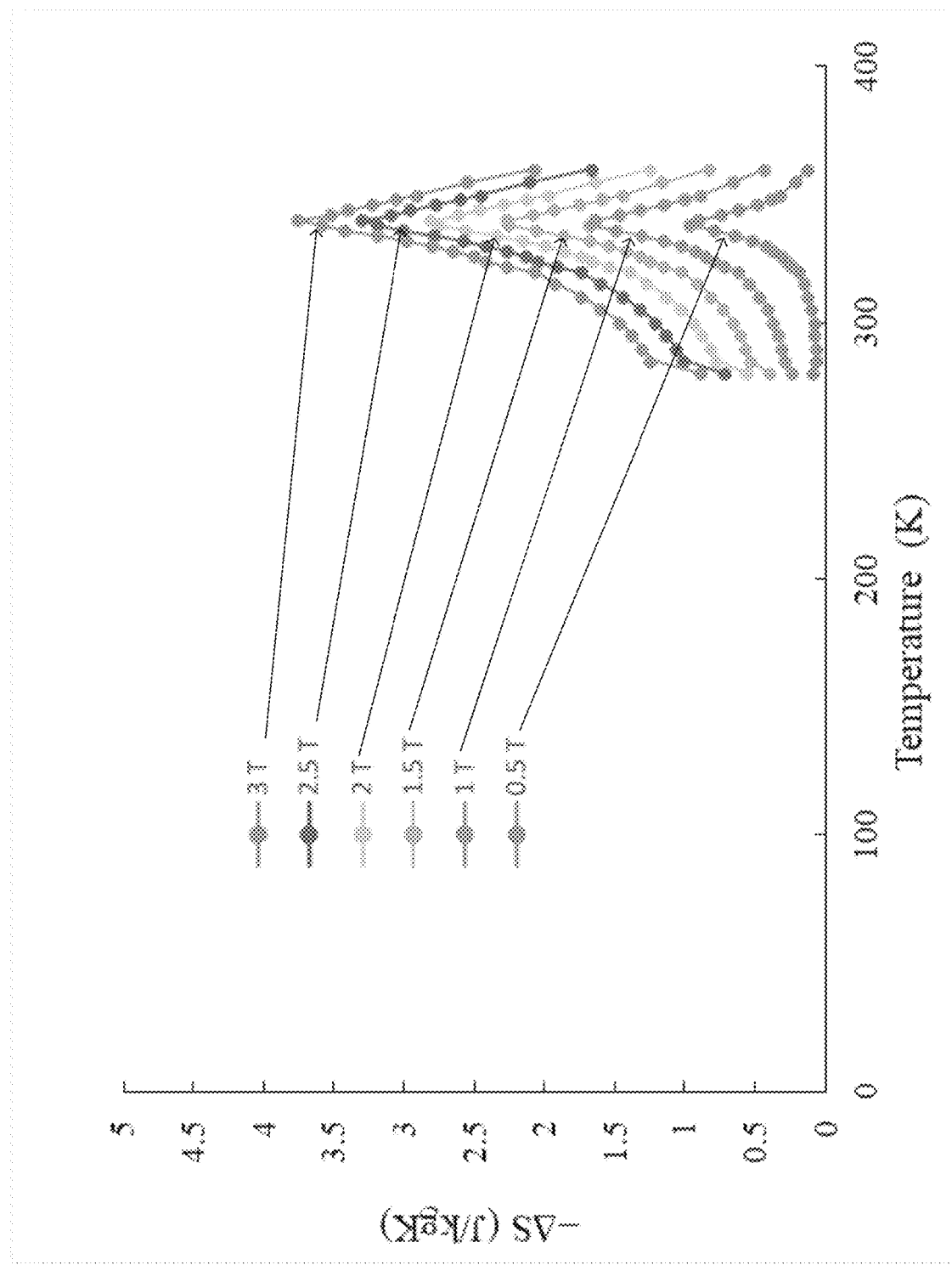
FIG. 20 illustrates the change in entropy versus temperature for a $Gd_{1.0}Si_{0.8}Cr_{0.2}$ alloy with a 4 week 1100° C. anneal.

A $Gd_{1.0}Si_{0.8}Cr_{0.2}$ ingot was prepared by arc melting in an argon atmosphere. The ingot was sealed in a quartz tube under argon and annealed in a radiation furnace at 1100° C. for 4 weeks. FIG. 20 shows plot of ΔS versus temperature for the $Gd_{1.0}Si_{0.8}Cr_{0.2}$ alloy with phase transition occurring near 340° K.

Example 31

An example magnetic refrigerator comprising the disclosed magnetocaloric material is made by the following steps 1) preparing the magnetocaloric material into thin plates or millimeter sized spherical balls, 2) placing the magnetocaloric material into a magnetic field, where the application of the magnetic field causes the material to heat up, 3) using a heat transfer fluid to remove the heat from the magnetocaloric material, 4) then removing the magnetic field causing the magnetocaloric material to cool down, 5) then exposing the cold magnetocaloric material to the desired refrigeration environment where heat from the refrigeration environment is transferred to the magnetocaloric material, 6) then repeating steps 1 to 5 to create a refrigeration cycle which maintains a desired cold temperature within the refrigeration environment.

Example 32

An example magnetic refrigerator comprising the disclosed magnetocaloric material is made by the following similar steps as in Example 13, except that a heat transfer fluid is used in step 5 to expose the cold magnetocaloric material to the desired refrigeration environment, where the heat from the refrigeration environment is transferred to the heat transfer fluid.

Example 33

An example heat pump comprising fabricating at least one part of the heat pump from a magnetocaloric material is made by incorporating at least one magnetocaloric material of the disclosed invention, at least one permanent magnet, and at least one mechanical movement system; wherein the magnetic field generated by the permanent magnet enables the magnetocaloric effect of the magnetocaloric material when at least one oscillation cycle is performed by the mechanical movement system, wherein a change in temperature of the magnetocaloric material occurs when the magnetocaloric material is moved into or out of a magnetic field; and wherein the mechanical movement system performs the at least one oscillation cycle by physically moving the permanent magnet, the magnetocaloric material, a magnet shielding material, or any combination thereof; and wherein the at least one oscillation cycle comprises exposing the magnetic field to the magnetocaloric material at a predefined magnetic field ramp-up speed, holding the magnetic field near or in contact with the magnetocaloric material for a specified contact holding time, removing the magnetic field from the magnetocaloric material at a predefined ramp-down speed, and holding the magnetic field away from the magnetocaloric material for a specified removed holding time; and wherein the at least one oscillation cycle is optimized to provide cooling on one side of the heat pump device.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A magnetocaloric material comprising:

$(A_x B_{1-x}) Si_{1-y-z} (D_y E_z)$, wherein A and B are selected from the group consisting of Ce, Nd, and Gd, wherein D is selected from the group consisting of Cr and Mn, wherein E is selected from the group consisting of Cr, Mn, Fe, Al, Ni, Co, Cu, and Zn, wherein x is in the range of 0 to 1.0, wherein y is in the range of about 0.05 to about 0.3, wherein z is in the range of 0 about 0.3, and wherein $0.05 \leq y+z \leq 0.3$.

2. The magnetocaloric material of claim 1, wherein y+z=0.2.

3. The magnetocaloric material of claim 2, wherein the material comprises:

$(A_x B_{1-x}) Si_{0.8}Mn_{0.2}$, wherein A and B are selected from the group consisting of Ce, Nd, and Gd, and wherein x is in the range of 0 to 1.0.

4. The magnetocaloric material of claim 3, wherein the material is $Ce_{1.0}Si_{0.8}Mn_{0.2}$, $Nd_{1.0}Si_{0.8}Mn_{0.2}$, $Gd_{1.0}Si_{0.8}Mn_{0.2}$, $Ce_{0.1}Nd_{0.9}Si_{0.8}Mn_{0.2}$, $Ce_{0.2}Nd_{0.8}Si_{0.8}Mn_{0.2}$, $Ce_{0.3}Nd_{0.7}Si_{0.8}Mn_{0.2}$, $Ce_{0.4}Nd_{0.6}Si_{0.8}Mn_{0.2}$, $Ce_{0.5}Nd_{0.5}Si_{0.8}Mn_{0.2}$, $Ce_{0.6}Nd_{0.4}Si_{0.8}Mn_{0.2}$, $Ce_{0.7}Nd_{0.3}Si_{0.8}Mn_{0.2}$, $Ce_{0.8}Nd_{0.2}Si_{0.8}Mn_{0.2}$, $Ce_{0.9}Nd_{0.1}Si_{0.8}Mn_{0.2}$, $Gd_{0.1}Nd_{0.9}Si_{0.8}Mn_{0.2}$, $Gd_{0.2}Nd_{0.8}Si_{0.8}Mn_{0.2}$, $Gd_{0.3}Nd_{0.7}Si_{0.8}Mn_{0.2}$, $Gd_{0.4}Nd_{0.6}Si_{0.8}Mn_{0.2}$, $Gd_{0.5}Nd_{0.5}Si_{0.8}Mn_{0.2}$, $Gd_{0.6}Nd_{0.4}Si_{0.8}Mn_{0.2}$, $Gd_{0.7}Nd_{0.3}Si_{0.8}Mn_{0.2}$, $Gd_{0.8}Nd_{0.2}Si_{0.8}Mn_{0.2}$, $Gd_{0.9}Nd_{0.1}Si_{0.8}Mn_{0.2}$, $Ce_{0.1}Gd_{0.9}Si_{0.8}Mn_{0.2}$, $Ce_{0.2}Gd_{0.8}Si_{0.8}Mn_{0.2}$, $Ce_{0.3}Gd_{0.7}Si_{0.8}Mn_{0.2}$, $Ce_{0.4}Gd_{0.6}Si_{0.8}Mn_{0.2}$, $Ce_{0.5}Gd_{0.5}Si_{0.8}Mn_{0.2}$, $Ce_{0.6}Gd_{0.4}Si_{0.8}Mn_{0.2}$, $Ce_{0.7}Gd_{0.3}Si_{0.8}Mn_{0.2}$, $Ce_{0.8}Gd_{0.2}Si_{0.8}Mn_{0.2}$, or $Ce_{0.9}Gd_{0.1}Si_{0.8}Mn_{0.2}$.

5. The magnetocaloric material of claim 2, wherein the material comprises:

$(A_x B_{1-x}) Si_{0.8}Cr_{0.2}$, wherein A and B are selected from the group consisting of Ce, Nd, and Gd, and wherein x is in the range of 0 to 1.0.

6. The magnetocaloric material of claim 5, wherein the material is $Ce_{1.0}Si_{0.8}Cr_{0.2}$, $Nd_{1.0}Si_{0.8}Cr_{0.2}$, $Gd_{1.0}Si_{0.8}Cr_{0.2}$, $Ce_{0.1}Nd_{0.9}Si_{0.8}Cr_{0.2}$, $Ce_{0.2}Nd_{0.8}Si_{0.8}Cr_{0.2}$, $Ce_{0.3}Nd_{0.7}Si_{0.8}Cr_{0.2}$, $Ce_{0.5}Nd_{0.5}Si_{0.8}Cr_{0.2}$, $Ce_{0.7}Nd_{0.3}Si_{0.8}Cr_{0.2}$, $Ce_{0.9}Nd_{0.1}Si_{0.8}Cr_{0.2}$, $Gd_{0.2}Nd_{0.8}Si_{0.8}Cr_{0.2}$, $Gd_{0.4}Nd_{0.6}Si_{0.8}Cr_{0.2}$, $Gd_{0.6}Nd_{0.4}Si_{0.8}Cr_{0.2}$, $Gd_{0.8}Nd_{0.2}Si_{0.8}Cr_{0.2}$, $Ce_{0.1}Gd_{0.9}Si_{0.8}Cr_{0.2}$, $Ce_{0.3}Gd_{0.7}Si_{0.8}Cr_{0.2}$, $Ce_{0.5}Gd_{0.5}Si_{0.8}Cr_{0.2}$, $Ce_{0.7}Gd_{0.3}Si_{0.8}Cr_{0.2}$, $Ce_{0.9}Gd_{0.1}Si_{0.8}Cr_{0.2}$, $Ce_{0.4}Nd_{0.6}Si_{0.8}Cr_{0.2}$, $Ce_{0.6}Nd_{0.4}Si_{0.8}Cr_{0.2}$, $Ce_{0.8}Nd_{0.2}Si_{0.8}Cr_{0.2}$, $Gd_{0.1}Nd_{0.9}Si_{0.8}Cr_{0.2}$, $Gd_{0.3}Nd_{0.7}Si_{0.8}Cr_{0.2}$, $Gd_{0.5}Nd_{0.5}Si_{0.8}Cr_{0.2}$, $Gd_{0.7}Nd_{0.3}Si_{0.8}Cr_{0.2}$, $Gd_{0.9}Nd_{0.1}Si_{0.8}Cr_{0.2}$, $Ce_{0.2}Gd_{0.8}Si_{0.8}Cr_{0.2}$, $Ce_{0.4}Gd_{0.6}Si_{0.8}Cr_{0.2}$, $Ce_{0.6}Gd_{0.4}Si_{0.8}Cr_{0.2}$, $Ce_{0.8}Gd_{0.2}Si_{0.8}Cr_{0.2}$, or $Ce_{0.9}Gd_{0.1}Si_{0.8}Cr_{0.2}$.

7. The magnetocaloric material of claim 2, wherein the material comprises:

$(A_x B_{1-x}) Si_{0.8}Mn_{0.1}Cr_{0.1}$, wherein A and B are selected from the group consisting of Ce, Nd, and Gd, and wherein x is in the range of 0 to 1.0.

8. The magnetocaloric material of claim 7, wherein the material is $Ce_{1.0}Si_{0.8}Mn_{0.1}Cr_{0.1}$, $Nd_{1.0}Si_{0.8}Mn_{0.1}Cr_{0.1}$, $Gd_{1.0}Si_{0.8}Mn_{0.1}Cr_{0.1}$, $Ce_{0.1}Nd_{0.9}Si_{0.8}Mn_{0.1}Cr_{0.1}$, $Ce_{0.2}Nd_{0.8}Si_{0.8}Mn_{0.1}Cr_{0.1}$, $Ce_{0.3}Nd_{0.7}Si_{0.8}Mn_{0.1}Cr_{0.1}$, $Ce_{0.4}Nd_{0.6}Si_{0.8}Mn_{0.1}Cr_{0.1}$, $Ce_{0.5}Nd_{0.5}Si_{0.8}Mn_{0.1}Cr_{0.1}$, $Ce_{0.6}Nd_{0.4}Si_{0.8}Mn_{0.1}Cr_{0.1}$, $Ce_{0.7}Nd_{0.3}Si_{0.8}Mn_{0.1}Cr_{0.1}$, $Ce_{0.8}Nd_{0.2}Si_{0.8}Mn_{0.1}Cr_{0.1}$, $Ce_{0.9}Nd_{0.1}Si_{0.8}Mn_{0.1}Cr_{0.1}$, $Gd_{0.1}Nd_{0.9}Si_{0.8}Mn_{0.1}Cr_{0.1}$, $Gd_{0.2}Nd_{0.8}Si_{0.8}Mn_{0.1}Cr_{0.1}$, $Gd_{0.3}Nd_{0.7}Si_{0.8}Mn_{0.1}Cr_{0.1}$, $Gd_{0.4}Nd_{0.6}Si_{0.8}Mn_{0.1}Cr_{0.1}$, $Gd_{0.5}Nd_{0.5}Si_{0.8}Mn_{0.1}Cr_{0.1}$, $Gd_{0.6}Nd_{0.4}Si_{0.8}Mn_{0.1}Cr_{0.1}$, $Gd_{0.7}Nd_{0.3}Si_{0.8}Mn_{0.1}Cr_{0.1}$, $Gd_{0.8}Nd_{0.2}Si_{0.8}Mn_{0.1}Cr_{0.1}$, $Gd_{0.9}Nd_{0.1}Si_{0.8}Mn_{0.1}Cr_{0.1}$, $Ce_{0.1}Gd_{0.9}Si_{0.8}Mn_{0.1}Cr_{0.1}$, $Ce_{0.2}Gd_{0.5}Si_{0.8}Mn_{0.1}Cr_{0.1}$, $Ce_{0.3}Gd_{0.7}Si_{0.8}Mn_{0.1}Cr_{0.1}$, $Ce_{0.4}Gd_{0.6}Si_{0.8}Mn_{0.1}Cr_{0.1}$, $Ce_{0.5}Gd_{0.5}Si_{0.8}Mn_{0.1}Cr_{0.1}$, $Ce_{0.6}Gd_{0.4}Si_{0.8}Mn_{0.1}Cr_{0.1}$, $Ce_{0.7}Gd_{0.3}Si_{0.8}Mn_{0.1}Cr_{0.1}$, $Ce_{0.8}Gd_{0.2}Si_{0.8}Mn_{0.1}Cr_{0.1}$, or $Ce_{0.9}Gd_{0.1}Si_{0.8}Mn_{0.1}Cr_{0.1}$.

9. The magnetocaloric material of claim 2, wherein the material comprises:

$(A_x B_{1-x}) Si_{0.8}Mn_{0.05}Cr_{0.15}$, wherein A and B are selected from the group consisting of Ce, Nd, and Gd, and wherein x is in the range of 0 to 1.0.

10. The magnetocaloric material of claim 9, wherein the material is $Ce_{1.0}Si_{0.8}Mn_{0.05}Cr_{0.15}$, $Nd_{1.0}Si_{0.8}Mn_{0.05}Cr_{0.15}$, $Gd_{1.0}Si_{0.8}Mn_{0.05}Cr_{0.15}$, $Ce_{0.1}Nd_{0.9}Si_{0.8}Mn_{0.05}Cr_{0.15}$, $Ce_{0.2}Nd_{0.8}Si_{0.8}Mn_{0.05}Cr_{0.15}$, $Ce_{0.3}Nd_{0.7}Si_{0.8}Mn_{0.05}Cr_{0.15}$, $Ce_{0.4}Nd_{0.6}Si_{0.8}Mn_{0.05}Cr_{0.15}$, $Ce_{0.5}Nd_{0.5}Si_{0.8}Mn_{0.05}Cr_{0.15}$, $Ce_{0.6}Nd_{0.4}Si_{0.8}Mn_{0.05}Cr_{0.15}$, $Ce_{0.7}Nd_{0.3}Si_{0.8}Mn_{0.05}Cr_{0.15}$, $Ce_{0.8}Nd_{0.2}Si_{0.8}Mn_{0.05}Cr_{0.15}$, $Ce_{0.9}Nd_{0.1}Si_{0.8}Mn_{0.05}Cr_{0.15}$, $Gd_{0.1}Nd_{0.9}Si_{0.8}Mn_{0.05}Cr_{0.15}$, $Gd_{0.2}Nd_{0.8}Si_{0.8}Mn_{0.05}Cr_{0.15}$, $Gd_{0.3}Nd_{0.7}Si_{0.8}Mn_{0.05}Cr_{0.15}$, $Gd_{0.4}Nd_{0.6}Si_{0.8}Mn_{0.05}Cr_{0.15}$, $Gd_{0.5}Nd_{0.5}Si_{0.9}Mn_{0.05}Cr_{0.15}$, $Gd_{0.6}Nd_{0.4}Si_{0.8}Mn_{0.05}Cr_{0.15}$, $Gd_{0.7}Nd_{0.3}Si_{0.8}Mn_{0.05}Cr_{0.15}$, $Gd_{0.8}Nd_{0.2}Si_{0.8}Mn_{0.05}Cr_{0.15}$, $Gd_{0.9}Nd_{0.1}Si_{0.8}Mn_{0.05}Cr_{0.15}$, $Ce_{0.1}Gd_{0.9}Si_{0.8}Mn_{0.05}Cr_{0.15}$, $Ce_{0.2}Gd_{0.9}Si_{0.8}Mn_{0.05}Cr_{0.15}$, $Ce_{0.3}Gd_{0.7}Si_{0.8}Mn_{0.05}Cr_{0.15}$, $Ce_{0.4}Gd_{0.6}Si_{0.8}Mn_{0.05}Cr_{0.15}$, $Ce_{0.5}Gd_{0.5}Si_{0.8}Mn_{0.05}Cr_{0.15}$, $Ce_{0.6}Gd_{0.4}Si_{0.8}Mn_{0.05}Cr_{0.15}$, $Ce_{0.7}Gd_{0.3}Si_{0.8}Mn_{0.05}Cr_{0.15}$, $Ce_{0.8}Gd_{0.2}Si_{0.8}Mn_{0.05}Cr_{0.15}$, $Ce_{0.9}Gd_{0.1}Si_{0.8}Mn_{0.05}Cr_{0.15}$.

11. The magnetocaloric material of claim 2, wherein the material comprises:

$(A_x B_{1-x}) Si_{0.8}Mn_{0.15}Cr_{0.05}$, wherein A and B are selected from the group consisting of Ce, Nd, and Gd, and wherein x is in the range of 0 to 1.0.

12. The magnetocaloric material of claim 11, wherein the material is $Ce_{1.0}Si_{0.8}Mn_{0.15}Cr_{0.05}$, $Nd_{1.0}Si_{0.8}Mn_{0.15}Cr_{0.05}$, $Gd_{1.0}Si_{0.8}Mn_{0.15}Cr_{0.05}$, $Ce_{0.1}Nd_{0.9}Si_{0.8}Mn_{0.15}Cr_{0.05}$, $Ce_{0.2}Nd_{0.8}Si_{0.8}Mn_{0.15}Cr_{0.05}$, $Ce_{0.3}Nd_{0.7}Si_{0.8}Mn_{0.15}Cr_{0.05}$, $Ce_{0.4}Nd_{0.6}Si_{0.8}Mn_{0.15}Cr_{0.05}$, $Ce_{0.5}Nd_{0.5}Si_{0.8}Mn_{0.15}Cr_{0.05}$, $Ce_{0.6}Nd_{0.4}Si_{0.8}Mn_{0.15}Cr_{0.05}$, $Ce_{0.7}Nd_{0.3}Si_{0.8}Mn_{0.15}Cr_{0.05}$, $Ce_{0.8}Nd_{0.2}Si_{0.8}Mn_{0.15}Cr_{0.05}$, $Ce_{0.9}Nd_{0.1}Si_{0.8}Mn_{0.15}Cr_{0.05}$, $Gd_{0.1}Nd_{0.9}Si_{0.8}Mn_{0.15}Cr_{0.05}$, $Gd_{0.2}Nd_{0.8}Si_{0.8}Mn_{0.15}Cr_{0.05}$, $Gd_{0.3}Nd_{0.7}Si_{0.8}Mn_{0.15}Cr_{0.05}$, $Gd_{0.4}Nd_{0.6}Si_{0.8}Mn_{0.15}Cr_{0.05}$, $Gd_{0.5}Nd_{0.5}Si_{0.8}Mn_{0.15}Cr_{0.05}$, $Gd_{0.6}Nd_{0.4}Si_{0.8}Mn_{0.15}Cr_{0.05}$, $Gd_{0.7}Nd_{0.3}Si_{0.8}Mn_{0.15}Cr_{0.05}$, $Gd_{0.8}Nd_{0.2}Si_{0.8}Mn_{0.15}Cr_{0.05}$, $Gd_{0.9}Nd_{0.1}Si_{0.8}Mn_{0.15}Cr_{0.05}$, $Ce_{0.1}Gd_{0.9}Si_{0.8}Mn_{0.15}Cr_{0.05}$, $Ce_{0.2}Gd_{0.8}Si_{0.8}Mn_{0.15}Cr_{0.05}$, $Ce_{0.3}Gd_{0.7}Si_{0.8}Mn_{0.15}Cr_{0.05}$, $Ce_{0.4}Gd_{0.6}Si_{0.8}Mn_{0.15}Cr_{0.05}$, $Ce_{0.5}Gd_{0.5}Si_{0.8}Mn_{0.15}Cr_{0.05}$, $Ce_{0.6}Gd_{0.4}Si_{0.8}Mn_{0.15}Cr_{0.05}$, $Ce_{0.7}Gd_{0.3}Si_{0.9}Mn_{0.15}Cr_{0.05}$, $Ce_{0.8}Gd_{0.2}Si_{0.8}Mn_{0.15}Cr_{0.05}$, or $Ce_{0.9}Gd_{0.1}Si_{0.8}Mn_{0.15}Cr_{0.05}$.

13. The magnetocaloric material of claim 2, wherein the material comprises:

$(A_x B_{1-x}) Si_{0.8}Cr_{0.1}E_{0.1}$, wherein A and B are selected from the group consisting of Ce, Nd, and Gd, wherein E is selected from the group consisting of Fe, Al, Ni, Co, Cu, and Zn, and wherein x is in the range of 0 to 1.0.

14. The magnetocaloric material of claim 13, wherein the material is $Ce_{1.0}Si_{0.8}Cr_{0.1}Fe_{0.1}$, $Nd_{1.0}Si_{0.8}Cr_{0.1}Fe_{0.1}$, $Gd_{1.0}Si_{0.8}Cr_{0.1}Fe_{0.1}$, $Ce_{0.1}Nd_{0.9}Si_{0.8}Cr_{0.1}Fe_{0.1}$, $Ce_{0.2}Nd_{0.8}Si_{0.8}Cr_{0.1}Fe_{0.1}$, $Ce_{0.3}Nd_{0.7}Si_{0.8}Cr_{0.1}Fe_{0.1}$, $Ce_{0.4}Nd_{0.6}Si_{0.8}Cr_{0.1}Fe_{0.1}$, $Ce_{0.5}Nd_{0.8}Si_{0.8}Cr_{0.1}Fe_{0.1}$, $Ce_{0.6}Nd_{0.4}Si_{0.8}Cr_{0.1}Fe_{0.1}$, $Ce_{0.7}Nd_{0.3}Si_{0.8}Cr_{0.1}Fe_{0.1}$, $Ce_{0.8}Nd_{0.2}Si_{0.8}Ce_{0.1}Fe_{0.1}$, $Ce_{0.9}Nd_{0.1}Si_{0.8}Cr_{0.1}Fe_{0.1}$, $Gd_{0.1}Nd_{0.9}Si_{0.8}Cr_{0.1}Fe_{0.1}$, $Gd_{0.2}Nd_{0.8}Si_{0.8}Cr_{0.1}Fe_{0.1}$, $Gd_{0.3}Nd_{0.7}Si_{0.8}Cr_{0.1}Fe_{0.1}$, $Gd_{0.4}Nd_{0.6}Si_{0.8}Cr_{0.1}Fe_{0.1}$, $Gd_{0.5}Nd_{0.8}Si_{0.8}Cr_{0.1}Fe_{0.1}$, $Gd_{0.6}Nd_{0.4}Si_{0.8}Cr_{0.1}Fe_{0.1}$, $Gd_{0.7}Nd_{0.3}Si_{0.8}Cr_{0.1}Fe_{0.1}$, $Gd_{0.8}Nd_{0.2}Si_{0.8}Ce_{0.1}Fe_{0.1}$, $Gd_{0.9}Nd_{0.1}Si_{0.8}Cr_{0.1}Fe_{0.1}$, $Ce_{0.1}Gd_{0.9}Si_{0.8}Cr_{0.1}Fe_{0.1}$, $Ce_{0.2}Gd_{0.8}Si_{0.8}Cr_{0.1}Fe_{0.1}$, $Ce_{0.3}Gd_{0.7}Si_{0.8}Cr_{0.1}Fe_{0.1}$, $Ce_{0.4}Gd_{0.6}Si_{0.8}Cr_{0.1}Fe_{0.1}$, $Ce_{0.5}Gd_{0.5}Si_{0.8}Cr_{0.1}Fe_{0.1}$, $Ce_{0.6}Gd_{0.4}Si_{0.8}Cr_{0.1}Fe_{0.1}$, $Ce_{0.7}Gd_{0.3}Si_{0.8}Cr_{0.1}Fe_{0.1}$, $Ce_{0.8}Gd_{0.2}Si_{0.8}Ce_{0.1}Fe_{0.1}$, $Ce_{0.9}Gd_{0.1}Si_{0.8}Cr_{0.1}Fe_{0.1}$, $Ce_{1.0}Si_{0.8}Cr_{0.1}Al_{0.1}$, $Nd_{1.0}Si_{0.8}Cr_{0.1}Al_{0.1}$, $Gd_{1.0}Si_{0.8}Cr_{0.1}Al_{0.1}$, $Ce_{0.1}Nd_{0.9}Si_{0.8}Cr_{0.1}Al_{0.1}$, $Ce_{0.2}Nd_{0.8}Si_{0.8}Cr_{0.1}Al_{0.1}$, $Ce_{0.3}Nd_{0.7}Si_{0.8}Cr_{0.1}Al_{0.1}$, $Ce_{0.4}Nd_{0.6}Si_{0.8}Cr_{0.1}Al_{0.1}$, $Ce_{0.5}Nd_{0.8}Si_{0.8}Cr_{0.1}Al_{0.1}$, $Ce_{0.6}Nd_{0.4}Si_{0.8}Cr_{0.1}Al_{0.1}$, $Ce_{0.7}Nd_{0.3}Si_{0.8}Cr_{0.1}Al_{0.1}$, $Ce_{0.8}Nd_{0.2}Si_{0.8}Ce_{0.1}Al_{0.1}$, $Ce_{0.9}Nd_{0.1}Si_{0.8}Cr_{0.1}Al_{0.1}$, $Gd_{0.1}Nd_{0.9}Si_{0.8}Cr_{0.1}Al_{0.1}$, $Gd_{0.2}Nd_{0.8}Si_{0.8}Cr_{0.1}Al_{0.1}$, $Gd_{0.3}Nd_{0.7}Si_{0.8}Cr_{0.1}Al_{0.1}$, $Gd_{0.4}Nd_{0.6}Si_{0.8}Cr_{0.1}Al_{0.1}$, $Gd_{0.5}Nd_{0.8}Si_{0.8}Cr_{0.1}Al_{0.1}$, $Gd_{0.6}Nd_{0.4}Si_{0.8}Cr_{0.1}Al_{0.1}$, $Gd_{0.7}Nd_{0.3}Si_{0.8}Cr_{0.1}Al_{0.1}$, $Gd_{0.8}Nd_{0.2}Si_{0.8}$ $Ce_{0.1}Al_{0.1}$, $Gd_{0.9}Nd_{0.1}Si_{0.8}Cr_{0.1}Al_{0.1}$, $Ce_{0.1}Gd_{0.9}Si_{0.8}Cr_{0.1}Al_{0.1}$, $Ce_{0.2}Gd_{0.8}Si_{0.8}Cr_{0.1}Al_{0.1}$, $Ce_{0.3}Gd_{0.7}Si_{0.8}Cr_{0.1}Al_{0.1}$, $Ce_{0.4}Gd_{0.6}Si_{0.8}Cr_{0.1}Al_{0.1}$, $Ce_{0.5}Gd_{0.5}Si_{0.8}Cr_{0.1}Al_{0.1}$, $Ce_{0.6}Gd_{0.4}Si_{0.8}Cr_{0.1}Al_{0.1}$, $Ce_{0.7}Gd_{0.3}Si_{0.8}Cr_{0.1}Al_{0.1}$, $Ce_{0.8}Gd_{0.2}Si_{0.8}Ce_{0.1}Al_{0.1}$, $Ce_{0.9}Gd_{0.1}Si_{0.8}Cr_{0.1}Ale_{0.1}$, $Ce_{1.0}Si_{0.8}Cr_{0.1}Ni_{0.1}$, $Nd_{1.0}Si_{0.8}Cr_{0.1}Ni_{0.1}$, $Gd_{1.0}Si_{0.8}Cr_{0.1}Ni_{0.1}$, $Ce_{0.1}Nd_{0.9}Si_{0.8}Cr_{0.1}Ni_{0.1}$, $Ce_{0.2}Nd_{0.8}Si_{0.8}Cr_{0.1}Ni_{0.1}$, $Ce_{0.3}Nd_{0.7}Si_{0.8}Cr_{0.1}Ni_{0.1}$, $Ce_{0.4}Nd_{0.6}Si_{0.8}Cr_{0.1}Ni_{0.1}$, $Ce_{0.5}Nd_{0.5}Si_{0.8}Cr_{0.1}Ni_{0.1}$, $Ce_{0.6}Nd_{0.4}Si_{0.8}Cr_{0.1}Ni_{0.1}$, $Ce_{0.7}Nd_{0.3}Si_{0.8}Cr_{0.1}Ni_{0.1}$, $Ce_{0.8}Nd_{0.2}Si_{0.8}Ce_{0.1}Ni_{0.1}$, $Ce_{0.9}Nd_{0.1}Si_{0.8}Cr_{0.1}Ni_{0.1}$, $Gd_{0.1}Nd_{0.9}Si_{0.8}Cr_{0.1}$, $Ni_{0.1}$, $Gd_{0.2}Nd_{0.8}Si_{0.8}Cr_{0.1}Ni_{0.1}$, $Gd_{0.3}Nd_{0.7}Si_{0.8}Cr_{0.1}Ni_{0.1}$, $Gd_{0.4}Nd_{0.6}Si_{0.8}Cr_{0.1}Ni_{0.1}$, $Gd_{0.5}Nd_{0.5}Si_{0.8}Cr_{0.1}Ni_{0.1}$, $Gd_{0.6}Nd_{0.4}Si_{0.8}Cr_{0.1}Ni_{0.1}$, $Gd_{0.7}Nd_{0.3}Si_{0.8}Cr_{0.1}Ni_{0.1}$, $Gd_{0.8}Nd_{0.2}Si_{0.8}Ce_{0.1}Ni_{0.1}$, $Gd_{0.9}Nd_{0.1}Si_{0.8}Cr_{0.1}Ni_{0.1}$, $Ce_{0.1}Gd_{0.5}Si_{0.8}Cr_{0.1}Ni_{0.1}$, $Ce_{0.2}Gd_{0.8}Si_{0.8}Cr_{0.1}Ni_{0.1}$, $Ce_{0.3}Gd_{0.7}Si_{0.8}Cr_{0.1}Ni_{0.1}$, $Ce_{0.4}Gd_{0.6}Si_{0.8}Cr_{0.1}Ni_{0.1}$, $Ce_{0.5}Gd_{0.5}Si_{0.8}Cr_{0.1}Ni_{0.1}$, $Ce_{0.6}Gd_{0.4}Si_{0.8}Cr_{0.1}Ni_{0.1}$, $Ce_{0.7}Gd_{0.3}Si_{0.8}Cr_{0.1}Ni_{0.1}$, $Ce_{0.8}Gd_{0.2}Si_{0.8}Ce_{0.1}Ni_{0.1}$, $Ce_{0.9}Gd_{0.1}Si_{0.8}Cr_{0.1}Ni_{0.1}$, $Ce_{1.0}Si_{0.8}Cr_{0.1}Co_{0.1}$,
$Gd_{1.0}Si_{0.8}Cr_{0.1}Co_{0.1}$,
$Ce_{0.2}Nd_{0.8}Si_{0.8}Cr_{0.1}Co_{0.1}$,
$Ce_{0.4}Nd_{0.6}Si_{0.8}Cr_{0.1}Co_{0.1}$,
$Ce_{0.6}Nd_{0.4}Si_{0.8}Cr_{0.1}Co_{0.1}$,
$Ce_{0.8}Nd_{0.2}Si_{0.8}Ce_{0.1}Co_{0.1}$,
$Gd_{0.1}Nd_{0.9}Si_{0.8}Cr_{0.1}Co_{0.1}$,
$Gd_{0.3}Nd_{0.7}Si_{0.8}Cr_{0.1}Co_{0.1}$,
$Gd_{0.5}Nd_{0.2}Si_{0.8}Cr_{0.1}Co_{0.1}$,
$Gd_{0.7}Nd_{0.3}Si_{0.8}Cr_{0.1}Co_{0.1}$,
$Gd_{0.9}Nd_{0.1}Si_{0.8}Cr_{0.1}Co_{0.1}$,
$Ce_{0.2}Gd_{0.5}Si_{0.8}Cr_{0.1}Co_{0.1}$,
$Ce_{0.4}Gd_{0.6}Si_{0.8}Cr_{0.1}Co_{0.1}$,
$Ce_{0.6}Gd_{0.4}Si_{0.8}Cr_{0.1}Co_{0.1}$,
$Ce_{0.8}Gd_{0.2}Si_{0.8}Ce_{0.1}Co_{0.1}$,
$Ce_{1.0}Si_{0.8}Cr_{0.1}Cu_{0.1}$,
$Gd_{1.0}Si_{0.8}Cr_{0.1}Cu_{0.1}$,
$Ce_{0.2}Nd_{0.8}Si_{0.8}Cr_{0.1}Cu_{0.1}$,
$Ce_{0.4}Nd_{0.6}Si_{0.8}Cr_{0.1}Cu_{0.1}$,
$Ce_{0.6}Nd_{0.4}Si_{0.8}Cr_{0.1}Cu_{0.1}$,
$Ce_{0.8}Nd_{0.2}Si_{0.8}Ce_{0.1}Cu_{0.1}$,
$Gd_{0.1}Nd_{0.9}Si_{0.8}Cr_{0.1}Cu_{0.1}$,
$Gd_{0.3}Nd_{0.7}Si_{0.8}Cr_{0.1}Cu_{0.1}$,
$Gd_{0.5}Nd_{0.8}Si_{0.8}Cr_{0.1}Cu_{0.1}$,
$Gd_{0.7}Nd_{0.3}Si_{0.8}Cr_{0.1}Cu_{0.1}$,
$Gd_{0.9}Nd_{0.1}Si_{0.8}Cr_{0.1}Cu_{0.1}$,
$Ce_{0.2}Gd_{0.5}Si_{0.8}Cr_{0.1}Cu_{0.1}$,
$Ce_{0.4}Gd_{0.6}Si_{0.8}Cr_{0.1}Cu_{0.1}$,
$Ce_{0.6}Gd_{0.4}Si_{0.8}Cr_{0.1}Cu_{0.1}$,
$Ce_{0.8}Gd_{0.2}Si_{0.8}Ce_{0.1}Cu_{0.1}$,
$Ce_{1.0}Si_{0.8}Cr_{0.1}Zn_{0.1}$,
$Gd_{1.0}Si_{0.8}Cr_{0.1}Zn_{0.1}$,
$Ce_{0.2}Nd_{0.8}Si_{0.8}Cr_{0.1}Zn_{0.1}$,
$Ce_{0.4}Nd_{0.6}Si_{0.8}Cr_{0.1}Zn_{0.1}$,
$Ce_{0.6}Nd_{0.4}Si_{0.8}Cr_{0.1}Zn_{0.1}$,
$Nd_{1.0}Si_{0.8}Cr_{0.1}Co_{0.1}$,
$Ce_{0.1}Nd_{0.9}Si_{0.8}Cr_{0.1}Co_{0.1}$,
$Ce_{0.3}Nd_{0.7}Si_{0.8}Cr_{0.1}Co_{0.1}$,
$Ce_{0.5}Nd_{0.8}Si_{0.8}Cr_{0.1}Co_{0.1}$,
$Ce_{0.7}Nd_{0.3}Si_{0.8}Cr_{0.1}Co_{0.1}$,
$Ce_{0.9}Nd_{0.1}Si_{0.8}Cr_{0.1}Co_{0.1}$,
$Gd_{0.2}Nd_{0.8}Si_{0.8}Cr_{0.1}Co_{0.1}$,
$Gd_{0.4}Nd_{0.6}Si_{0.8}Cr_{0.1}Co_{0.1}$,
$Gd_{0.6}Nd_{0.4}Si_{0.8}Cr_{0.1}Co_{0.1}$,
$Gd_{0.8}Nd_{0.2}Si_{0.8}Ce_{0.1}Co_{0.1}$,
$Ce_{0.1}Gd_{0.5}Si_{0.8}Cr_{0.1}Co_{0.1}$,
$Ce_{0.3}Gd_{0.7}Si_{0.8}Cr_{0.1}Co_{0.1}$,
$Ce_{0.5}Gd_{0.5}Si_{0.8}Cr_{0.1}Co_{0.1}$,
$Ce_{0.7}Gd_{0.3}Si_{0.8}Cr_{0.1}Co_{0.1}$,
$Ce_{0.9}Gd_{0.1}Si_{0.8}Cr_{0.1}Co_{0.1}$,
$Nd_{1.0}Si_{0.8}Cr_{0.1}Cu_{0.1}$,
$Ce_{0.1}Nd_{0.8}Si_{0.8}Cr_{0.1}Cu_{0.1}$,
$Ce_{0.3}Nd_{0.7}Si_{0.8}Cr_{0.1}Cu_{0.1}$,
$Ce_{0.5}Nd_{0.8}Si_{0.8}Cr_{0.1}Cu_{0.1}$,
$Ce_{0.7}Nd_{0.3}Si_{0.8}Cr_{0.1}Cu_{0.1}$,
$Ce_{0.9}Nd_{0.1}Si_{0.8}Cr_{0.1}Cu_{0.1}$,
$Gd_{0.2}Nd_{0.8}Si_{0.8}Cr_{0.1}Cu_{0.1}$,
$Gd_{0.4}Nd_{0.6}Si_{0.8}Cr_{0.1}Cu_{0.1}$,
$Gd_{0.6}Nd_{0.4}Si_{0.8}Cr_{0.1}Cu_{0.1}$,
$Gd_{0.8}Nd_{0.2}Si_{0.8}Ce_{0.1}Cu_{0.1}$,
$Ce_{0.1}Gd_{0.9}Si_{0.8}Cr_{0.1}Cu_{0.1}$,
$Ce_{0.3}Gd_{0.7}Si_{0.8}Cr_{0.1}Cu_{0.1}$,
$Ce_{0.5}Gd_{0.5}Si_{0.8}Cr_{0.1}Cu_{0.1}$,
$Ce_{0.7}Gd_{0.3}Si_{0.8}Cr_{0.1}Cu_{0.1}$,
$Ce_{0.9}Gd_{0.1}Si_{0.8}Cr_{0.1}Cu_{0.1}$,
$Nd_{1.0}Si_{0.8}Cr_{0.1}Zn_{0.1}$,
$Ce_{0.1}Nd_{0.9}Si_{0.8}Cr_{0.1}Zn_{0.1}$,
$Ce_{0.3}Nd_{0.7}Si_{0.8}Cr_{0.1}Zn_{0.1}$,
$Ce_{0.5}Nd_{0.8}Si_{0.8}Cr_{0.1}Zn_{0.1}$,
$Ce_{0.7}Nd_{0.3}Si_{0.8}Cr_{0.1}Zn_{0.1}$,
$Ce_{0.8}Nd_{0.2}Si_{0.8}Ce_{0.1}Zn_{0.1}$,
$Gd_{0.1}Nd_{0.9}Si_{0.8}Cr_{0.1}Zn_{0.1}$,
$Gd_{0.3}Nd_{0.7}Si_{0.8}Cr_{0.1}Zn_{0.1}$,
$Gd_{0.5}Nd_{0.8}Si_{0.8}Cr_{0.1}Zn_{0.1}$,
$Gd_{0.7}Nd_{0.3}Si_{0.8}Cr_{0.1}Zn_{0.1}$,
$Gd_{0.9}Nd_{0.1}Si_{0.8}Cr_{0.8}Zn_{0.1}$,
$Ce_{0.2}Gd_{0.5}Si_{0.8}Cr_{0.1}Zn_{0.1}$,
$Ce_{0.4}Gd_{0.6}Si_{0.8}Cr_{0.1}Zn_{0.1}$,
$Ce_{0.6}Gd_{0.4}Si_{0.8}Cr_{0.1}Zn_{0.1}$,
$Ce_{0.8}Gd_{0.2}Si_{0.8}Ce_{0.1}Zn_{0.1}$,
$Ce_{0.9}Nd_{0.1}Si_{0.8}Cr_{0.1}Zn_{0.1}$,
$Gd_{0.2}Nd_{0.8}Si_{0.8}Cr_{0.1}Zn_{0.1}$,
$Gd_{0.4}Nd_{0.6}Si_{0.8}Cr_{0.1}Zn_{0.1}$,
$Gd_{0.6}Nd_{0.4}Si_{0.8}Cr_{0.1}Zn_{0.1}$,
$Gd_{0.8}Nd_{0.2}Si_{0.8}Ce_{0.1}Zn_{0.1}$,
$Ce_{0.1}Gd_{0.9}Si_{0.8}Cr_{0.1}Zn_{0.1}$,
$Ce_{0.3}Gd_{0.7}Si_{0.8}Cr_{0.1}Zn_{0.1}$,
$Ce_{0.5}Gd_{0.5}Si_{0.8}Cr_{0.1}Zn_{0.1}$,
$Ce_{0.7}Gd_{0.3}Si_{0.8}Cr_{0.1}Zn_{0.1}$,
$Ce_{0.9}Gd_{0.1}Si_{0.8}Cr_{0.1}Zn_{0.1}$.

15. A magnetic refrigerator, comprising the magnetocaloric material of claim 1.

16. A method of manufacturing a heat pump, comprising fabricating at least one part of the heat pump from a magnetocaloric material of comprising $(A_x B_{1-x}) Si_{1-y-x}(D_y E_z)$, wherein A and B are selected from the group consisting of Ce, Nd, and Gd, wherein D is selected from the group consisting of Cr and Mn, wherein E is selected from the group consisting of Cr, Mn, Fe, Al, Ni, Co, Cu, and Zn, wherein x is in the range of 0 to 1.0, wherein y is in the range of about 0.05 to about 0.3, wherein z is in the range of 0 to about 0.3, and wherein $0.05 \leq y+z \leq 0.3$.

17. The magnetic refrigerator of claim 15, wherein y+z=0.2.

18. The magnetic refrigerator of claim 15 wherein the material comprises:

$(A_x B_{1-x}) Si_{0.8}Mn_{0.2}$, wherein A and B are selected from the group consisting of Ce, Nd, and Gd, and wherein x is in the range of 0 to 1.0.

* * * * *

UNITED STATES PATENT AND TRADEMARK OFFICE
CERTIFICATE OF CORRECTION

PATENT NO. : 11,728,074 B2
APPLICATION NO. : 16/969858
DATED : August 15, 2023
INVENTOR(S) : Robin Ihnfeldt It is certified that error appears in the above-identified patent and that said Letters Patent is hereby corrected as shown below:

In the Specification

Column 3, Line 11, delete "$Nd_{0.8}$" and insert -- $Nd_{0.5}$ --.

Column 3, Line 29, delete "$Nd_{0.8}$" and insert -- $Nd_{0.5}$ --.

Column 3, Line 32, delete "$Gd_{0.5}$" and insert -- $Gd_{0.8}$ --.

Column 3, Line 52, delete "$Gd_{0.5}$" and insert -- $Gd_{0.8}$ --.

Column 4, Line 1, delete "$Si_{0.9}$" and insert -- $Si_{0.8}$ --.

Column 4, Line 4, delete "$Gd_{0.9}$" and insert -- $Gd_{0.8}$ --

Column 4, Line 16, delete "$Si_{0.7}$" and insert -- $Si_{0.8}$ --.

Column 4, Line 16, delete "$Si_{0.7}$" and insert -- $Si_{0.8}$ --.

Column 4, Line 17, delete "$Nd_{0.4}$" and insert -- $Nd_{0.5}$ --.

Column 4, Line 18, delete "$Ce_{0.5}$" and insert -- $Ce_{0.8}$ --.

Column 4, Line 20, delete "$Nd_{0.5}$" and insert -- $Nd_{0.8}$ --.

Column 4, Line 21, delete "$Gd_{0.8}$" and insert -- $Gd_{0.5}$ --.

Column 4, Line 21, delete "$Si_{0.7}$" and insert -- $Si_{0.8}$ --.

Column 4, Line 27, delete "$Si_{0.9}$" and insert -- $Si_{0.8}$ --.

Signed and Sealed this
Seventh Day of November, 2023

Katherine Kelly Vidal
*Director of the United States Patent and Trademark Office*

CERTIFICATE OF CORRECTION (continued)
U.S. Pat. No. 11,728,074 B2

Column 4, Line 38, delete "$Nd_{0.8}$" and insert -- $Nd_{0.5}$ --.

Column 4, Line 42, delete "$Nd_{0.8}$" and insert -- $Nd_{0.5}$ --.

Column 4, Line 53, delete "$Nd_{0.8}$" and insert -- $Nd_{0.5}$ --.

Column 4, Line 57, delete "$Nd_{0.8}$" and insert -- $Nd_{0.5}$ --.

Column 4, Line 64, delete "$Ale_{0.1}$," and insert -- $Al_{0.1}$, --.

Column 5, Line 3, delete "$Cr_{0.1}$, $Ni_{0.1}$," and insert -- $Cr_{0.1}Ni_{0.1}$, --.

Column 5, Line 5, delete "$Nd_{0.8}$" and insert -- $Nd_{0.5}$ --.

Column 5, Line 8, delete "$Gd_{0.5}$" and insert -- $Gd_{0.9}$ --.

Column 5, Line 16, delete "$Nd_{0.8}$" and insert -- $Nd_{0.5}$ --.

Column 5, Line 20, delete "$Gd_{0.8}Nd_{0.2}$" and insert -- $Gd_{0.5}Nd_{0.5}$ --.

Column 5, Line 23, delete "$Gd_{0.5}$" and insert -- $Gd_{0.9}$ --.

Column 5, Line 23, delete "$Gd_{0.5}$" and insert -- $Gd_{0.8}$ --.

Column 5, Line 29, delete "$Nd_{0.8}$" and insert -- $Nd_{0.9}$ --.

Column 5, Line 31, delete "$Nd_{0.8}$" and insert -- $Nd_{0.5}$ --.

Column 5, Line 35, delete "$Nd_{0.8}$" and insert -- $Nd_{0.5}$ --.

Column 5, Line 38, delete "$Gd_{0.5}$" and insert -- $Gd_{0.8}$ --.

Column 5, Line 46, delete "$Nd_{0.8}$" and insert -- $Nd_{0.5}$ --.

Column 5, Line 50, delete "$Nd_{0.8}$" and insert -- $Nd_{0.5}$ --.

Column 5, Line 52, delete "$Cr_{0.8}$" and insert -- $Cr_{0.1}$ --.

Column 5, Line 53, delete "$Gd_{0.5}$" and insert -- $Gd_{0.8}$ --.

Column 6, Line 65, delete "$Mn_{0.2}$" and insert -- $Mn_{0.1}$ --.

Column 9, Line 21, delete "$Nd_{0.8}$" and insert -- $Nd_{0.5}$ --.

Column 9, Line 25, delete "$Nd_{0.8}$" and insert -- $Nd_{0.5}$ --.

CERTIFICATE OF CORRECTION (continued)
U.S. Pat. No. 11,728,074 B2

Column 9, Line 28, delete "$Gd_{0.5}$" and insert -- $Gd_{0.8}$ --.

Column 9, Line 40, delete "$Nd_{0.8}$" and insert -- $Nd_{0.5}$ --.

Column 9, Line 45, delete "$Nd_{0.8}$" and insert -- $Nd_{0.5}$ --.

Column 9, Line 49, delete "$Si_{0.7}$" and insert -- $Si_{0.8}$ --.

Column 10, Line 2, delete "$Gd_{0.8}$" and insert -- $Gd_{0.5}$ --

Column 10, Line 23, delete "$Si_{0.9}$" and insert -- $Si_{0.8}$ --.

Column 10, Line 34, delete "$Nd_{0.8}$" and insert -- $Nd_{0.5}$ --.

Column 10, Line 38, delete "$Nd_{0.8}$" and insert -- $Nd_{0.5}$ --.

Column 10, Line 49, delete "$Nd_{0.8}$" and insert -- $Nd_{0.5}$ --.

Column 10, Line 53, delete "$Nd_{0.8}$" and insert -- $Nd_{0.5}$ --.

Column 10, Line 56, delete "$Gd_{0.5}$" and insert -- $Gd_{0.8}$ --.

Column 10, Line 60, delete "$Ale_{0.1}$," and insert -- $Al_{0.1}$, --.

Column 10, Line 64, delete "$Nd_{0.8}$" and insert -- $Nd_{0.5}$ --.

Column 10, Line 66, delete "$Cr_{0.1}\ Ni_{0.1}$," and insert -- $Cr_{0.1}Ni_{0.1}$, --.

Column 11, Line 1, delete "$Nd_{0.8}$" and insert -- $Nd_{0.5}$ --.

Column 11, Line 4, delete "$Gd_{0.5}$" and insert -- $Gd_{0.9}$ --.

Column 11, Line 6, delete "$Cr_{0.6}$" and insert -- $Cr_{0.1}$ --.

Column 11, Line 12, delete "$Nd_{0.8}$" and insert -- $Nd_{0.5}$ --.

Column 11, Line 19, delete "$Gd_{0.5}$" and insert -- $Gd_{0.9}$ --.

Column 11, Line 19, delete "$Gd_{0.5}$" and insert -- $Gd_{0.8}$ --.

Column 11, Line 25, delete "$Nd_{0.8}$" and insert -- $Nd_{0.9}$ --.

Column 11, Line 27, delete "$Nd_{0.8}$" and insert -- $Nd_{0.5}$ --.

Column 11, Line 31, delete "$Nd_{0.8}$" and insert -- $Nd_{0.5}$ --.

CERTIFICATE OF CORRECTION (continued)
U.S. Pat. No. 11,728,074 B2

Column 11, Line 34, delete "$Gd_{0.5}$" and insert -- $Gd_{0.8}$ --.

Column 11, Line 42, delete "$Nd_{0.8}$" and insert -- $Nd_{0.5}$ --.

Column 11, Line 46, delete "$Nd_{0.8}$" and insert -- $Nd_{0.5}$ --.

Column 11, Line 49, delete "$Gd_{0.8}$" and insert -- $Gd_{0.8}$ --.

Column 13, Line 66, delete "$Si_{0.8}$" and insert -- $Si_{0.9}$ --.

Column 16, Line 14, delete "$Mn_{0.1}$" and insert -- $Mn_{0.15}$ --.

Column 16, Line 18, delete "$Mn_{0.1}$" and insert -- $Mn_{0.15}$ --.

In the Claims

Column 18, Line 23, Claim 1, delete "$Si_{1-y-z,}$" and insert -- $Si_{1-y-z}$ --.

Column 18, Line 52, Claim 4, delete "$Nd_{0.8}$" and insert -- $Nd_{0.5}$ --.

Column 19, Line 6, Claim 6, delete "$Nd_{0.8}$" and insert -- $Nd_{0.5}$ --.

Column 19, Line 9, Claim 6, delete "$Gd_{0.5}$" and insert -- $Gd_{0.8}$ --.

Column 19, Line 32, Claim 8, delete "$Gd_{0.5}$" and insert -- $Gd_{0.8}$ --.

Column 19, Line 51, Claim 10, delete "$Si_{0.9}$" and insert -- $Si_{0.8}$ --.

Column 19, Line 54, Claim 10, delete "$Gd_{0.9}$" and insert -- $Gd_{0.8}$ --.

Column 19, Line 57, Claim 10, after "$Cr_{0.15}$," insert -- or --.

Column 20, Line 11, Claim 12, delete "$Si_{0.9}$" and insert -- $Si_{0.8}$ --.

Column 20, Line 26, Claim 14, delete "$Nd_{0.8}$" and insert -- $Nd_{0.5}$ --.

Column 20, Line 31, Claim 14, delete "$Nd_{0.8}$" and insert -- $Nd_{0.5}$ --.

Column 20, Line 41, Claim 14, delete "$Nd_{0.8}$" and insert -- $Nd_{0.5}$ --.

Column 20, Line 46, Claim 14, delete "$Nd_{0.8}$" and insert -- $Nd_{0.5}$ --.

Column 20, Line 47, Claim 14, delete "$Si_{0.8}\ Ce_{0.1}$" and insert -- $Si_{0.8}Ce_{0.1}$ --.

Column 20, Line 52, Claim 14, delete "$Ale_{0.1,}$" and insert -- $Al_{0.1,}$ --.

CERTIFICATE OF CORRECTION (continued)
U.S. Pat. No. 11,728,074 B2

Column 20, Line 59, Claim 14, delete "$Cr_{0.1}, Ni_{0.1},$" and insert -- $Cr_{0.1}Ni_{0.1},$ --.

Column 20, Line 61, Claim 14, delete "$Nd_{0.8}$" and insert -- $Nd_{0.5}$ --.

Column 20, Line 63, Claim 14, delete "$Gd_{0.5}$" and insert -- $Gd_{0.9}$ --.

Column 21, Line 4, Claim 14, delete "$Nd_{0.8}$" and insert -- $Nd_{0.5}$ --.

Column 21, Line 9 (approx.), Claim 14, delete "$Gd_{0.8}Nd_{0.2}$" and insert -- $Gd_{0.8}Nd_{0.5}$ --.

Column 21, Line 11 (approx.), Claim 14, delete "$Gd_{0.5}$" and insert -- $Gd_{0.9}$ --.

Column 21, Line 12 (approx.), Claim 14, delete "$Gd_{0.5}$" and insert -- $Gd_{0.8}$ --.

Column 21, Line 17 (approx.), Claim 14, delete "$Nd_{0.8}$" and insert -- $Nd_{0.9}$ --.

Column 21, Line 19 (approx.), Claim 14, delete "$Nd_{0.8}$" and insert -- $Nd_{0.5}$ --.

Column 21, Line 24 (approx.), Claim 14, delete "$Nd_{0.8}$" and insert -- $Nd_{0.5}$ --.

Column 21, Line 27 (approx.), Claim 14, delete "$Gd_{0.5}$" and insert -- $Gd_{0.8}$ --.

Column 21, Line 34 (approx.), Claim 14, delete "$Nd_{0.8}$" and insert -- $Nd_{0.5}$ --.

Column 22, Line 4, Claim 14, delete "$Nd_{0.8}$" and insert -- $Nd_{0.5}$ --.

Column 22, Line 6, Claim 14, delete "$Cr_{0.8}$" and insert -- $Cr_{0.1}$ --.

Column 22, Line 7, Claim 14, delete "$Gd_{0.5}$" and insert -- $Gd_{0.8}$ --.

Column 22, Line 10, Claim 14, after "$Zn_{0.1},$" insert -- or --.

Column 22, Line 15, Claim 16, delete "$Si_{1-y-x}$" and insert -- $Si_{1-y-z}$ --.